INTEGRATED TWO- AND FOUR-WIRE TELEPHONE SWITCHING SYSTEM

Filed Aug. 29, 1961

INVENTORS J. W. GORGAS
G. A. HURST
J. S. PFROMMER
W. H. SCHEER

BY John C Albrecht
ATTORNEY

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 3

INTEGRATED TWO- AND FOUR-WIRE TELEPHONE SWITCHING SYSTEM

Filed Aug. 29, 1961 38 Sheets-Sheet 4

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 5

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 6

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 9

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 10

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 13

INTEGRATED TWO- AND FOUR-WIRE TELEPHONE SWITCHING SYSTEM

Filed Aug. 29, 1961 38 Sheets-Sheet 18

Sept. 22, 1964 J. W. GORGAS ET AL 3,150,236

INTEGRATED TWO- AND FOUR-WIRE TELEPHONE SWITCHING SYSTEM

Filed Aug. 29, 1961 38 Sheets-Sheet 20

INTEGRATED TWO- AND FOUR-WIRE TELEPHONE SWITCHING SYSTEM

Filed Aug. 29, 1961 38 Sheets-Sheet 21

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 22

INTEGRATED TWO- AND FOUR-WIRE TELEPHONE SWITCHING SYSTEM

Filed Aug. 29, 1961 38 Sheets-Sheet 23

INTEGRATED TWO- AND FOUR-WIRE TELEPHONE SWITCHING SYSTEM

Filed Aug. 29, 1961 38 Sheets-Sheet 28

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 32

Sept. 22, 1964 J. W. GORGAS ETAL 3,150,236

INTEGRATED TWO- AND FOUR-WIRE TELEPHONE SWITCHING SYSTEM

Filed Aug. 29, 1961 38 Sheets-Sheet 38

United States Patent Office 3,150,236

Patented Sept. 22, 1964

3,150,236

INTEGRATED TWO- AND FOUR-WIRE TELEPHONE SWITCHING SYSTEM

John W. Gorgas, Hollis, and George A. Hurst, White Plains, N.Y., John S. Pfrommer, New Shrewsbury, N.J., and William H. Scheer, Granville, Ohio, assignors to Bell Telephone Laboratories, Incorporated, New York, N.Y., a corporation of New York Filed Aug. 29, 1961, Ser. No. 134,633

15 Claims. (Cl. 179—18)

This invention relates generally to automatic switching systems and more particularly to integrated voice and high speed data switching systems wherein two-wire and four-wire transmission facilities are terminated in a common switching center and controlled by a common control circuit.

Voice and low speed data communications networks generally utilize two-wire trunks as transmission facilities. However, in complex long distance voice communication networks, four-wire trunks are introduced as individual segments of an over-all transmission path. These four-wire trunks provide communication paths of greater transmission efficiency and higher fidelity.

It is desirable in high speed data communication systems to employ four-wire station-to-station connections. High speed data is presently transmitted over four-wire private lines connected either directly from the transmitting station to the receiving station, or through manual switching centers provided for high speed data communication networks. Low speed data and voice communications are presently handled over circuits containing both two-wire and four-wire trunks which in combination are not suitable for high speed data transmission. Separate switching centers are currently provided for two-wire and four-wire trunk facilities. The two-wire switching centers are used as originating and terminating switching centers, and the four-wire switching centers are used as intermediate toll switching centers. The four-wire switching centers are located at widely dispersed locations where they serve as toll centers for a large number of two-wire switching centers.

As the demand for high speed data communication increases, it is highly probable that customers located a considerable distance from the four-wire switching centers may require four-wire station transmission facilities. It would be highly desirable to terminate and switch these four-wire facilities at the local two-wire switching centers which are close to the customer and which currently serve the customer for voice and low speed data communications.

The advent of an increased demand for four-wire high speed data trunks does not decrease the probable demand for low speed data and voice communication facilities. Efficient use of four-wire trunks cannot be attained when these trunks are used exclusively for data communications with no provision for their use for voice communications.

It is, therefore, a general object of this invention to integrate the termination, switching, and control of voice, low speed data and high speed data transmission facilities in a common switching center.

Certain large private communications networks, such as military networks and those provided for large decentralized businesses, have requirements for all three types of communication, i.e., high speed data, low speed data and voice. Furthermore, the completion of certain calls in such private systems may be of greater urgency than the completion of other calls.

It is, therefore, another object of this invention to ascertain the type of communication, i.e., high speed data, voice, urgent, etc., represented by a particular call, to connect the calling line to an appropriate grade of trunk in accordance therewith and to give an urgent call special consideration and assistance in its completion.

These and other objects of this invention are attained in one specific illustrative embodiment in which a switching center comprises a two-wire switching network in which two-wire lines and two-wire trunks are terminated, a four-wire switching network in which four-wire lines and four-wire trunks are terminated, intertrain trunks connecting the two-wire and four-wire networks, a common control circuit which controls the establishment of connections within both the two-wire and four-wire networks, and call data recording equipment common to both networks. In one illustrative embodiment of this invention the stations served by the four-wire network may be high speed data communication terminals, low speed data communication terminals, or voice communication stations; and the stations served by the two-wire network may be low speed data communication terminals or voice communication stations. The common control circuit of this system, as is usual in such systems, is called the marker, and the recorder controller circuit of the call data recording equipment in this system, as is usual in such systems, is called the transverter.

In order to better illustrate the operation of a switching system in accordance with the present invention, in one specific embodiment three identical switching centers, Nos. 1, 2, and 3, are interconnected by four-wire interoffice trunks. A local four-wire call, originated by a four-wire station and directed to a four-wire station both of which are served by switching center No. 1, is completed, under the control of the marker, within the four-wire network of switching center 1. A local two-wire call, originated by a two-wire station and directed to a two-wire station both of which are served by switching center 1, is completed, under the control of the marker, within the two-wire network of switching center 1. These calls are known as intraoffice calls.

A four-wire interoffice call, originated by a four-wire station served by switching center 1 and directed to a four-wire station served by switching center 3, is completed through an interoffice trunk connecting switching centers 1 and 3 by establishing a connection, under the control of the marker of switching center 1, in the four-wire network of switching center 1 from the calling station to the interoffice trunk, and by the establishment of a connection, under the control of the marker of switching center 3, in the four-wire network of switching center 3 from the interoffice trunk to the called station.

The above-described four-wire interoffice call could also have been completed over an interoffice trunk connecting switching centers 1 and 2 and another interoffice trunk connecting switching centers 2 and 3. This type of call is known as a tandem or through-switched call at switching center 2 where the call is switched through the switching center rather than terminating or originating thereat. The tandem operation of switching center 2 would require the establishment of a connection, under the control of the marker of switching center 2, in the four-wire network of switching center 2 from the interoffice trunk connecting switching centers 1 and 2 to the interoffice trunk connecting switching centers 2 and 3. This tandem connection would be in addition to the previously described originating and terminating connections established in the four-wire networks of switching centers 1 and 3, respectively.

A two-wire interoffice call, originated by a two-wire station served by switching center 1 and directed to a two-wire station served by switching center 3, is completed by the establishment of a connection, under the control of the marker of switching center 1, in the two-wire network of switching center 1 from the calling station to an intertrain trunk; the establishment of a connection, under the control of the marker of switching center 1, in the four-wire network of switching center 1 from the intertrain trunk to a four-wire interoffice trunk connecting switching centers 1 and 3; the establishment of a connection, under the control of the marker of switching center 3, in the four-wire network of switching center 3 from the interoffice trunk to an intertrain trunk; and the establishment of a connection, under the control of the marker of switching center 3, in the two-wire network of switching center 3 from the intertrain trunk to the called station. This call could also have been switched on a tandem basis through switching center 2 in a manner similar to the above-described four-wire interoffice call.

The urgency of completing a call will vary depending upon the nature of the particular call being made. When originating a call requiring special attention, a station customer prefixes the usual digits of the directory number of the called station with a control digit, which indicates the degree of priority he desires the call to receive. This control digit is recognized by the marker, which provides special types of treatment for varying degrees of priority as indicated by the dialed control digit. The marker also ascertains whether or not the particular station making the call is entitled to the degree of priority requested by the station customer, and it will not grant a higher priority to the call than that to which the station is entitled. The calling station customer may also indicate, by means of the control digit prefix, the type of communication, i.e., high speed data, low speed data or voice communication, which is represented by the call he is making. The marker ascertains whether or not the particular calling station is capable of originating the type of communication indicated by the control digit. Upon ascertaining that the calling station can originate the indicated type of communication, the marker controls the appropriate network in establishing a connection from the calling station to the required grade of trunk facility.

Heretofore, as previously indicated, separate switching centers have been provided for two-wire and four-wire facilities. In the switching system of the present invention the two-wire switching networks and four-wire switching networks are integrated into a single switching center in which two-wire station lines, four-wire station lines, two-wire trunks, and four-wire trunks are advantageously terminated and controlled.

In accordance with a primary feature of this invention the same common control circuit controls the interconnection of two-wire and four-wire, voice and high speed data lines and trunks which terminate at an integrated switching center.

In accordance with another feature of this invention the common control circuit ascertains from signals generated from a calling station the degree of priority desired by the calling customer, and further ascertains whether or not the calling station is entitled to the requested degree of priority.

An urgent call, for which the calling customer has requested priority treatment, may encounter a situation in which all trunks to the remote switching center serving the called station are in use. When such a situation arises it is not desirable merely to indicate to the calling customer that this condition exists and to preclude him from completing his high priority call.

Therefore, in accordance with another feature of this invention, a priority call is not dismissed upon a failure to locate a trunk to the desired destination, but is held until a trunk to the called location is available for use.

In accordance with another feature of this invention a monitoring circuit is employed which monitors all groups of trunks which may be used to complete a particular priority call when all of the trunks within these groups are busy. The monitoring circuit, upon detecting that one of the trunks within these groups has become idle, causes the automatic completion of the priority call.

In accordance with another feature of this invention the monitoring circuit periodically causes new attempts to be made to complete a priority call whether or not an idle trunk has been detected.

The ability of the system of the present invention to hold a priority call until a trunk is available may create a blockage within the switching center if too many priority calls are allowed to be held at one time.

Therefore, in accordance with another feature of this invention the call holding feature is canceled with regard to newly originated calls when a predetermined number of priority calls are being held awaiting the detection of an idle trunk.

In accordance with this invention trunks which pass priority traffic are terminated in the automatic switching network and at a manually operated switchboard to facilitate direct connection to an operator from a trunk when difficulty is encountered in completing a call.

In accordance with a further feature of this invention a priority call directed to a called station which fails to answer within a prescribed period of time is automatically diverted, by way of the trunk appearance, to an operator's position at the switching center serving the called station.

In accordance with another feature of this invention a priority call directed to a busy station is automatically diverted, by way of the trunk appearance, to an operator's position at the switching center serving the called station.

Most modern switching systems provide means for recording data peretaining to originating calls either for billing purposes or for traffic analyses.

In accordance with another feature of this invention a common recorder controller circuit receives and converts call information, including the calling station directory number, for calls originated from both the two-wire stations and from the four-wire stations and causes this data to be recorded.

In accordance with a further feature of this invention the recorder controller circuit ascertains the identifying number of a trunk over which a through-switched call enters a tandem switching center and causes this identifying trunk number to be recorded in addition to other call data pertaining to the tandem call.

The above and other objects and features of this invention will be more readily understood from the following description when read with respect to the drawing, in which.

INDEX

Figure 1:
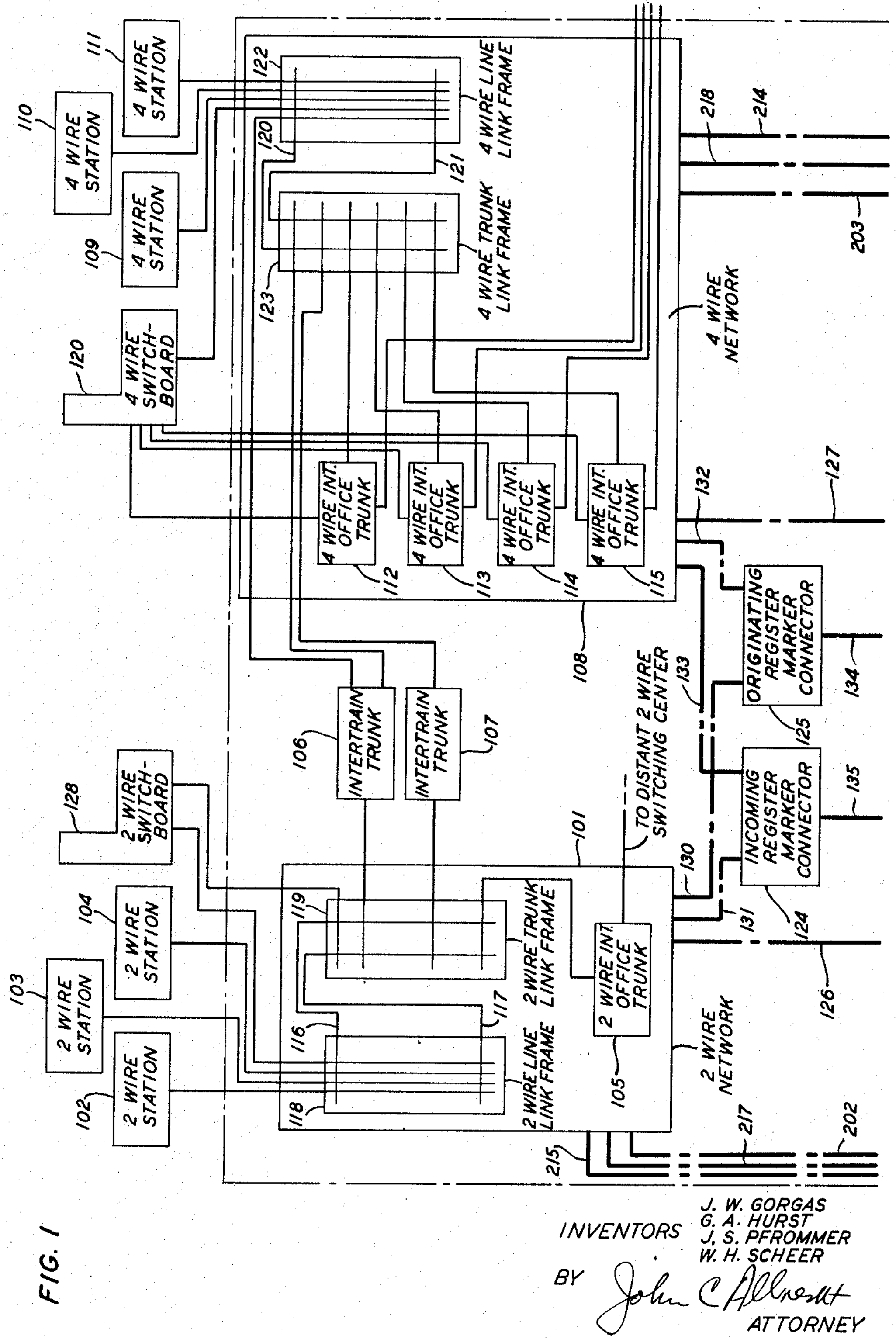
FIGS. 1 through 4 are a general block diagram of a switching system in accordance with one specific illustrative embodiment of this invention.

| | Column |
|---|---|
| General Description | 5 |
| Detailed Description | 8 |
| Component Designations | 8 |
| Four-Wire Interoffice Call | 9 |
| Originating Portion | 9 |
| Nonpriority—Voice Grade | 9 |
| Priority—Special Grade | 21 |
| Priority—Camp-on | 24 |
| Trunk Available | 31 |
| Periodic Marker Reseizure | 31 |
| Call Data Recording | 32 |
| Tandem Portion | 38 |
| Priority—Special Grade | 38 |
| Priority—Camp-on | 43 |
| Limitation of Registers in Camp-on | 45 |
| Call Data Recording | 46 |
| Terminating Portion | 51 |
| Priority—Voice Grade | 51 |
| Called Station Busy | 52 |
| Called Station Idle | 57 |
| Fails to Answer | 57 |
| Operator Flash | 59 |
| Disconnection | 60 |
| Nonpriority—Voice Grade | 60 |
| Operator Flash | 60 |
| Crossover Call | 61 |
| Originating Portion | 61 |
| Call Data Recording | 64 |
| Terminating Portion | 65 |
| Dialtone Connection | 66 |
| Intraoffice Calls | 68 |
| Conclusion | 68 |

GENERAL DESCRIPTION

The three switching centers shown in FIGS. 1 through 4 are those previously referred to as switching centers 1, 2, and 3. Switching centers 2 and 3 are identical to switching center 1 although the details thereof are abbreviated in the drawing.

Switching center 1 contains a two-wire network 101 providing terminations for two-wire stations 102, 103, and 104 and two-wire trunks such as 105. Further terminations are provided in the two-wire network 101 for intertrain trunks 106 and 107 which connect the two-wire network 101 to the four-wire network 108 of switching center 1.

The four-wire network 108 of switching center 1 provides terminations for four-wire stations 109, 110, and 111, and four-wire interoffice trunks 112, 113, 114, and 115. Further terminations are provided in the four-wire network 108 for intertrain trunks 106 and 107.

The trunks and stations terminated in the two-wire network 101 are interconnectable through links, such as 116 and 117, between two-wire line link frame 118 and two-wire trunk link frame 119. The four-wire stations and four-wire trunks which terminate in four-wire network 108 are interconnectable through links, such as 120 and 121, between four-wire line link frame 122 and four-wire trunk link frame 123. The establishment of connections within two-wire network 101 and four-wire network 108 are controlled by marker 201 over control cables 202 and 203, respectively. The marker 201 receives call information from the networks 101 and 108, through incoming register marker connector 124, originating register marker connector 125, or directly from the networks 101 and 108 over control cables 126 and 127, respectively. Included in the call information is information as to which network requires the establishment of a connection therein. The marker 201 then controls the appropriate network 101 or 108 in completing the desired connection.

Also included in the information passed by the networks to the marker 201 is the degree of priority which a calling station, such as 109, has requested. Upon ascertaining that station 109 is entitled to the requested degree of priority, the marker 201 controls the appropriate network 108 in initiating special handling of the call within network 108 to assist and insure its completion. These special call treatments are controlled from the marker 201 by camp-on control 204 and priority control 205.

The switching circuitry of the two-wire network 101, the four-wire network 108, the incoming register marker connector 124, the originating register marker connector 125, and the marker 201 is substantially similar to that disclosed in Patent 2,585,904 of February 19, 1952, to A. J. Busch. However, certain advantageous departures have been made from the Busch disclosure to achieve the objects of this invention and these departures are later described herein.

As previously stated, switching centers 2 and 3 are identical to switching center 1. Switching centers 1 and 2 are connected by four-wire interoffice trunks 112 and 113; switching centers 1 and 3 are connected by four-wire interoffice trunks 114 and 115; and switching centers 2 and 3 are connected by four-wire interoffice trunks 301 and 302. An interoffice call originating in switching center 1 and directed to switching center 3 may be switched on a tandem basis through switching center 2. This type of call is described in Patent 2,587,817 of March 4, 1952, to A. J. Busch and Henry J. Michael. The switching operations involved in a tandem or intertoll call in the system of the present invention are similar to those described in the patent to Busch et al. However, certain advantageous departures have been made from the Busch et al. disclosure to achieve the objects of this invention and these departures are later described herein.

An intraoffice call originating from a two-wire station 102 of switching center 1 and directed to a two-wire station 103 served by switching center 1 concerns only connections made within the two-wire network 101 of switching center 1. Similarly, an intraoffice call originated by a four-wire station 109 of switching center 1 and directed to a four-wire station 110 served by switching center 1 concerns only connections established within the four-wire network 108 of switching center 1.

A call originated by a four-wire station 109 served by switching center 1 and directed to a four-wire station 401 served by switching center 3 may represent either an interoffice call or a tandem call depending upon which interoffice trunks are used in establishing the connection. If trunks such as 114 or 115 between switching center 1 and switching center 3 are used, the interoffice call involves the establishment of connections within the four-wire network 108 of switching center 1 and the four-wire network 405 of switching center 3. However, if the call is switched through switching center 2 to reach switching center 3 the call is of the tandem type and involves the establishment of connections within the four-wire network 108 of switching center 1, the four-wire network 303 of switching center 2 and the four-wire network 405 of switching center 3.

A call originated by a two-wire station 102 served by switching center 1 and directed to a two-wire station 403 served by switching center 3 concerns the establishment of connections in the two-wire network 101 of switching center 1, the four-wire network 108 of switching center 1, the four-wire network 405 of switching center 3 and the two-wire network 406 of switching center 3. This type of call is designated "crossover traffic" and may also be switched on a tandem basis at switching center 2.

The above-described plurality of types of calls which may be made in this switching system demonstrates the flexibilty with which two-wire and four-wire stations may be interconnected, thereby permitting the most efficient use of transmission facilities for low speed data, high speed data and voice communications.

Figure 2:
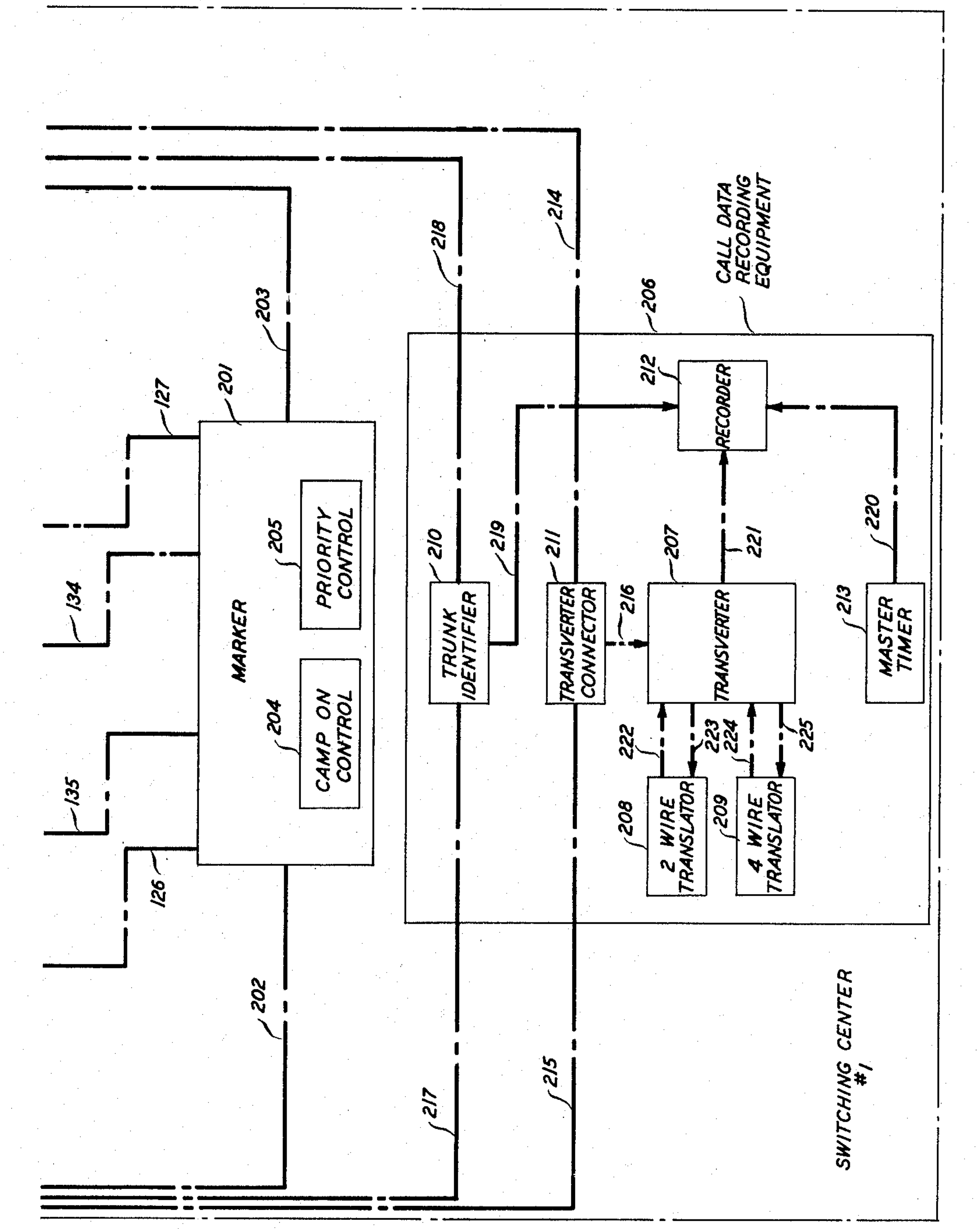

Most modern switching systems include means for recording call data pertaining to calls originating in a switching center. An example of such a system is disclosed in Patent 2,599,358 of June 3, 1952, to Harold D. Cahill, Warren W. Carpenter and Thomas L. Dimond. The call data recording circuitry shown in FIG. 2 is substantially similar to that disclosed in the Cahill et al. patent. However, advantageous departures have been made from the Cahill disclosure to enable the call data recording system of the present invention to perform new functions which will be hereinbelow described.

When an indication is received by the marker 201 that a record is to be made of a particular call, the call data recording equipment 206 is signalled to make such a record. The transverter 207 receives information over cable 216, through transverter connector 211 and over cable 215 or 214 as to the network, two-wire 101 or four-wire 108, in which the call has originated. In addition the transverter 207 receives from the appropriate network 101 or 108 other information concerning the call. This information includes the equipment location of the calling station. The transverter 207 utilizes an appropriate translator, two-wire 208 or four-wire 209 depending upon which network, 101 or 108, has originated the call, to ascertain the directory number of the calling station. Further, the transverter 207 receives a representation of the control digit, which indicates the degree of priority assigned to the call.

The trunk identifier 210 receives from the appropriate network the identification of the trunk used to complete the call. The transverter 207 then selects a recorder 212 and controls it in making a suitable record which includes, among other data, the calling station directory number, the control digit, the identification of the trunk used to complete the call and the called line directory number. Two subsequent entries are made by the recorder 212; the first when the called station answers, and the second when either the called or the calling station disconnects.

In the event of a tandem call the directory number of the calling station is not available to the call data recording equipment 206 located at a tandem switching center. In the system of the present invention, when a call record is desired at a tandem switching center, the transverter 207 receives an indication from the marker 201, through the appropriate network 101 or 108, that a record is desired of a through-switched tandem call. The transverter 207 then receives from the marker 201, through the appropriate network, the identity of the trunk over which the call entered the tandem switching center. The transverter 207 controls a selected recorder 212, at the tandem switching center, in recording the identification of the incoming trunk in place of a calling station directory number. It is to be noted that a comparison of the trunk identification and time included in the record made at the originating switching center with the trunk identification and time included in the record made at the tandem switching center may serve to identify the calling line directory number for record purposes, if such information is desired for a particular call.

Figure 5:
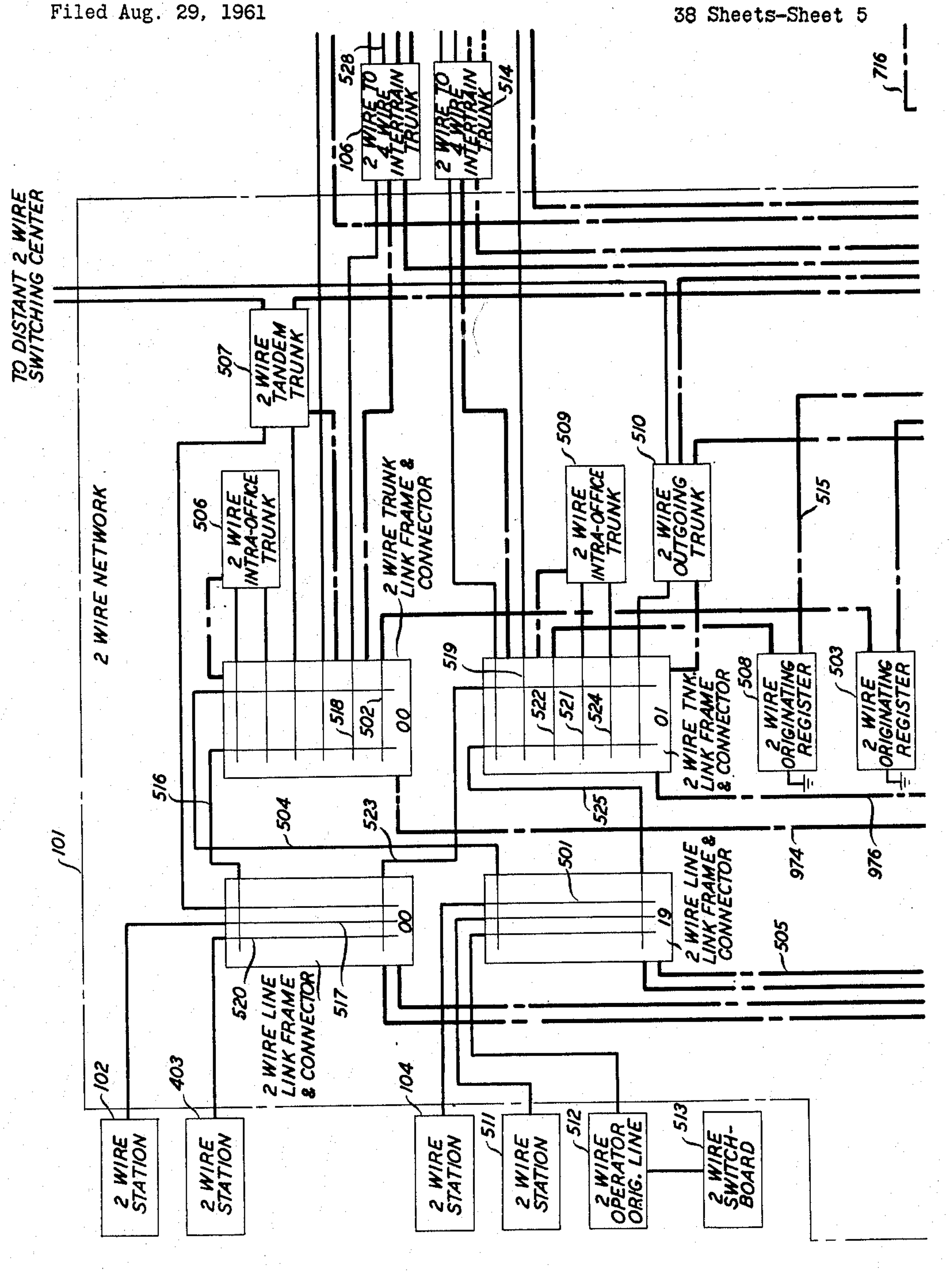
FIGS. 5 through 10 are a block diagram of the general components of the switching center shown in FIGS. 1 and 2.
Figure 6:
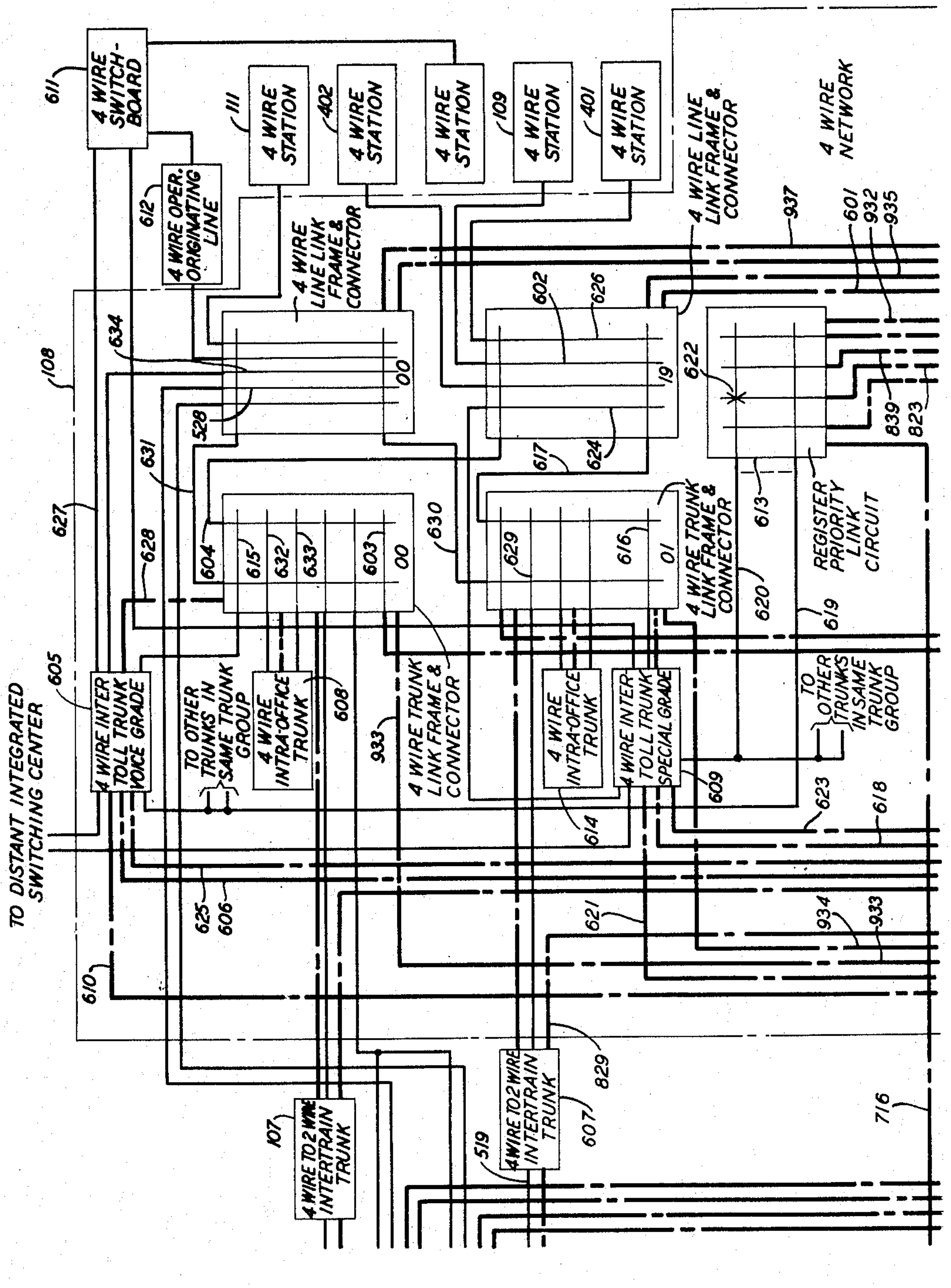
Figure 7:
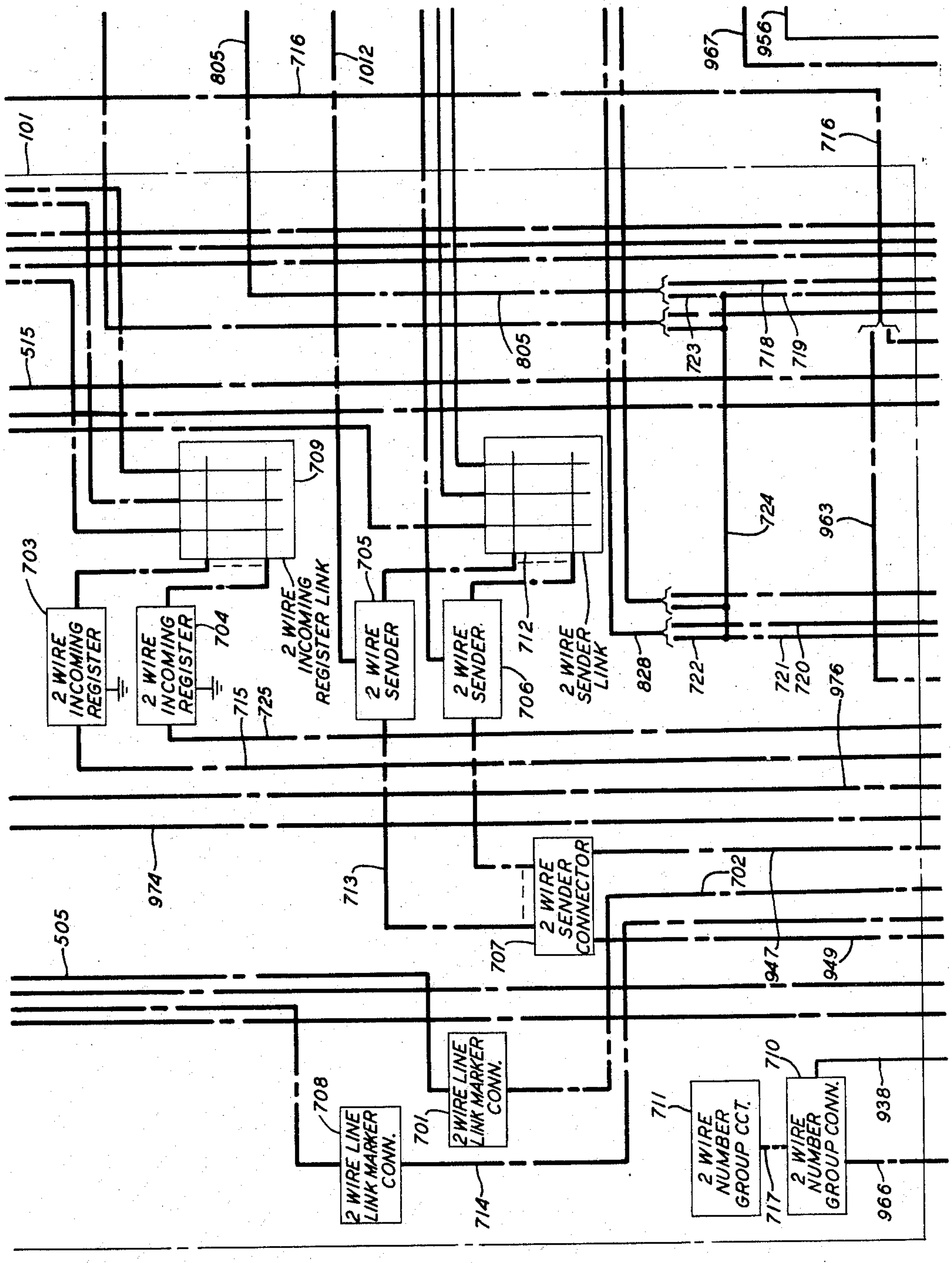
Figure 8:
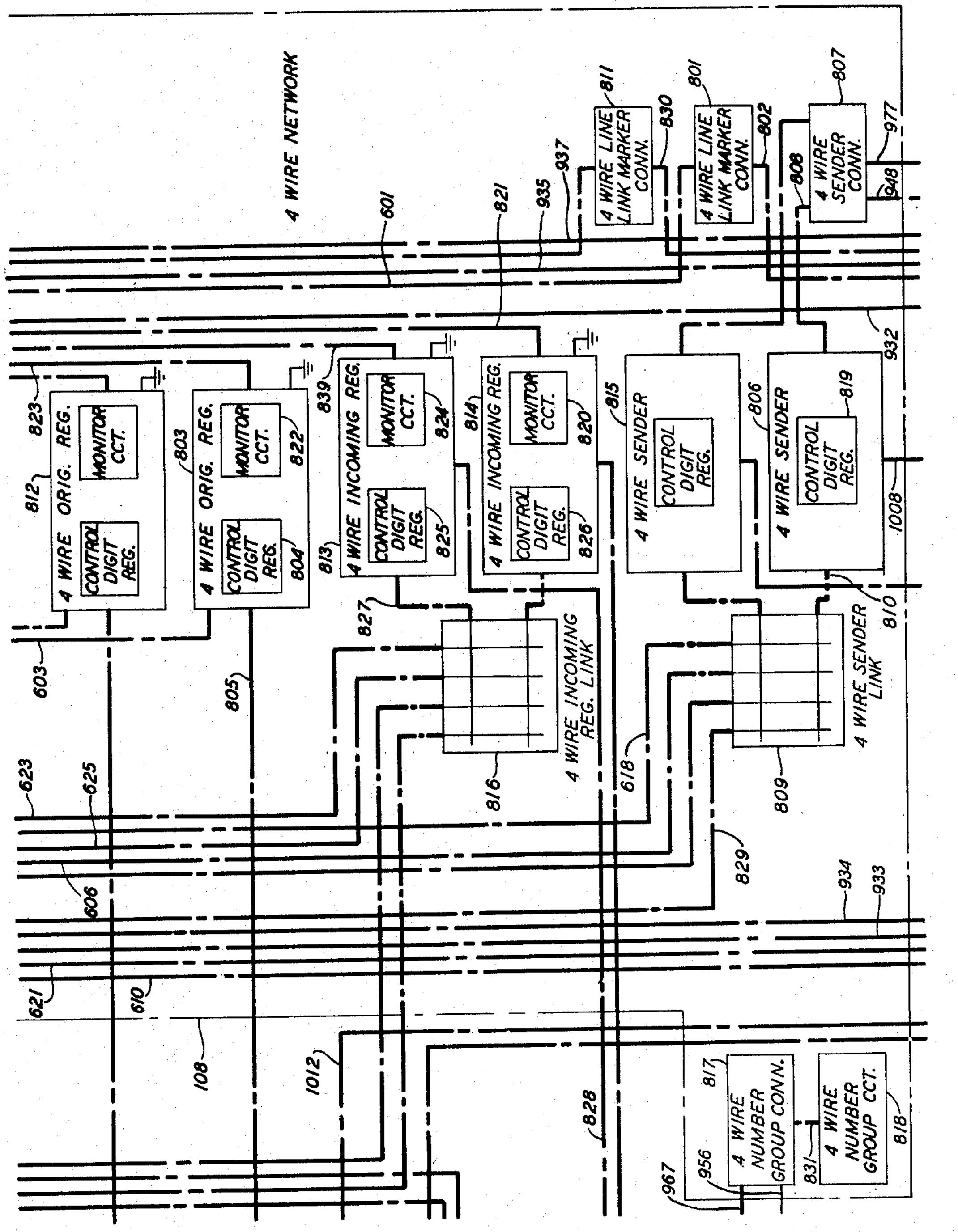
Figure 9:
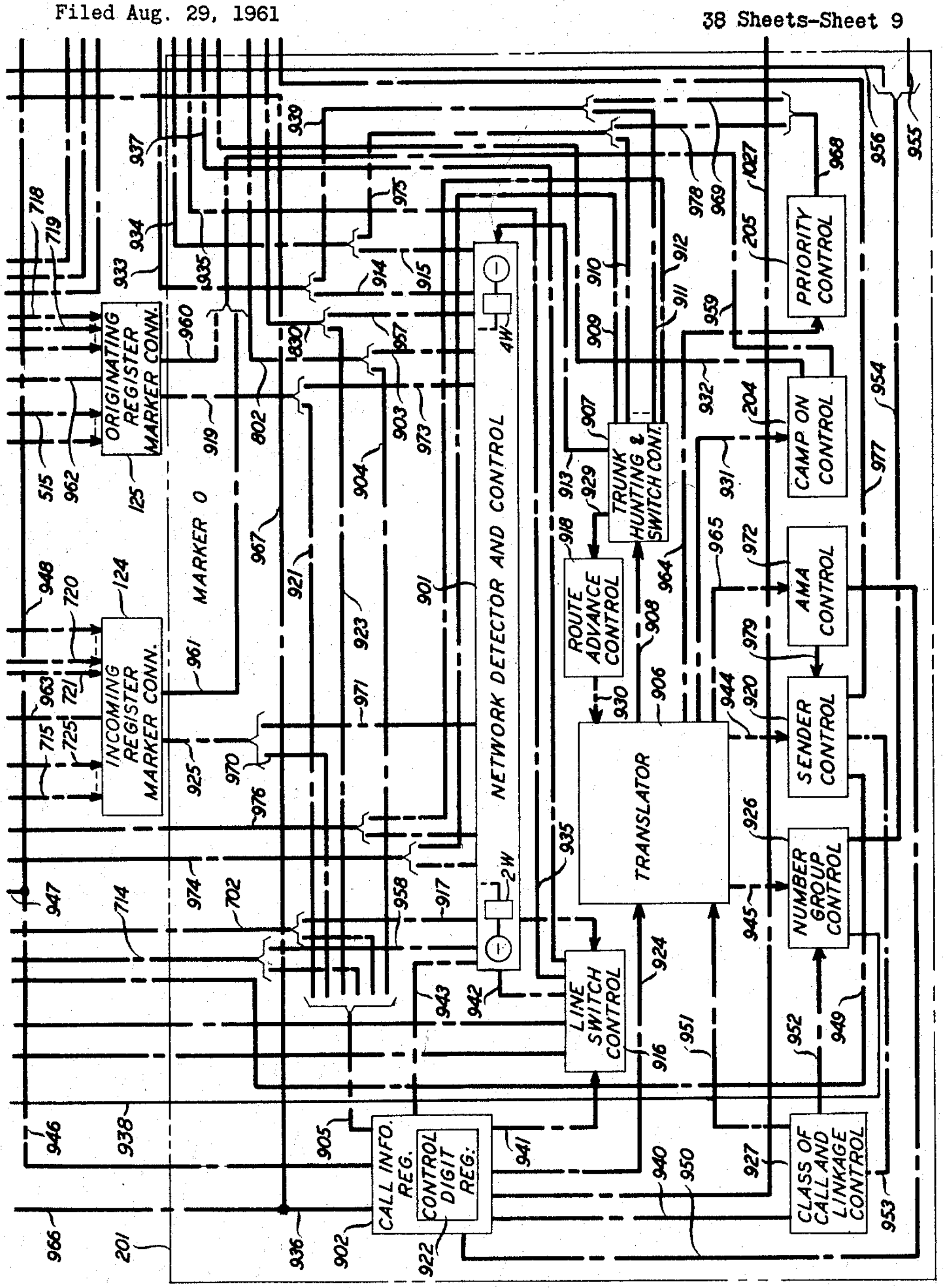
Figure 10:
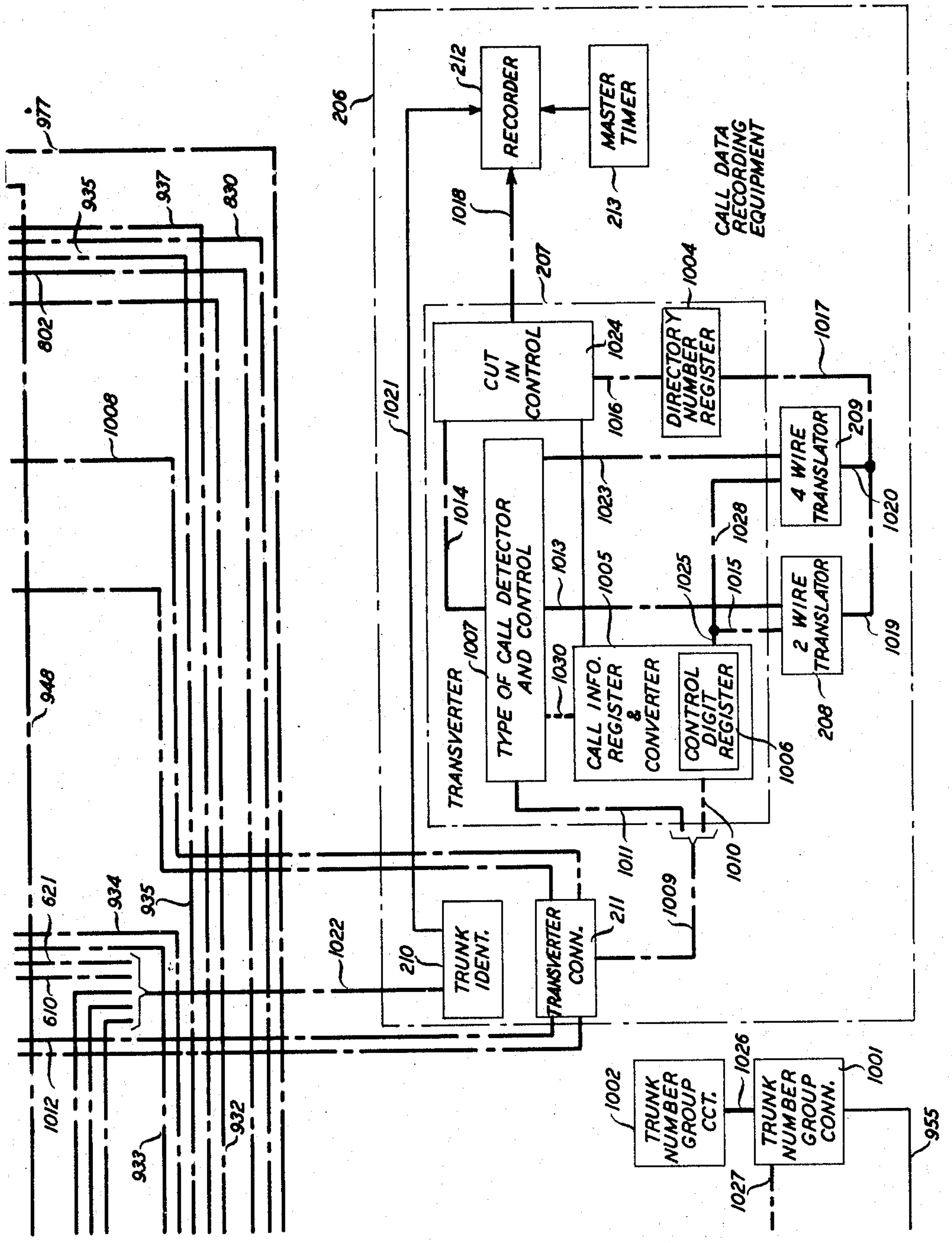

The equipment components of the two-wire network 101, the four-wire network 108, the marker 201 and the call data recording equipment 206 are shown in block diagram form on FIGS. 5 through 10. FIGS. 5 and 7 show the two-wire network 101; FIGS. 6 and 8 show the four-wire network 108; FIG. 9 shows the marker 201; and FIG. 10 shows the call data recording equipment 206. The aforementioned Patents 2,585,904, 2,587,817 and 2,599,358 are to be considered as incorporated herein by reference to complete the disclosure of elements and portions thereof which are shown only in block diagram in this portion of the drawing. It is believed that an understanding of the present invention can best be obtained without consulting a vast amount of circuit details which are not necessary to comprehend the invention but which form a part of the complete crossbar telephone system which is incorporated in the illustrative embodiment of this invention.

The circuitry of the two-wire network 101 and its operation with the marker 201 and call data recording equipment 206 are generally similar to that described in Patents 2,585,904, 2,587,817 and 2,599,358. However, advantageous improvements have been made in the two-wire network 101, the marker 201 and the transverter 207 to enable their joint operation with the networks 101 and 108.

The four-wire network 108 and its operation with the marker 201 and call data recording equipment 206 are also generally similar to that of the switching system disclosed in Patents 2,585,904, 2,587,817 and 2,599,358. However, a number of improvements have been made in the four-wire network 108 which will be described in detail below. This description will be more readily understood if read with reference to the block diagram of FIGS. 5 through 10 as supplemented by specific circuit details shown in the subsequent figures of the drawing.

DETAILED DESCRIPTION

Relay, Cable, Lead and Circuit Component Designations

For purposes of clarity and ease of reference certain standard designation methods have been used in the drawing to which the following description refers.

Figure 17:
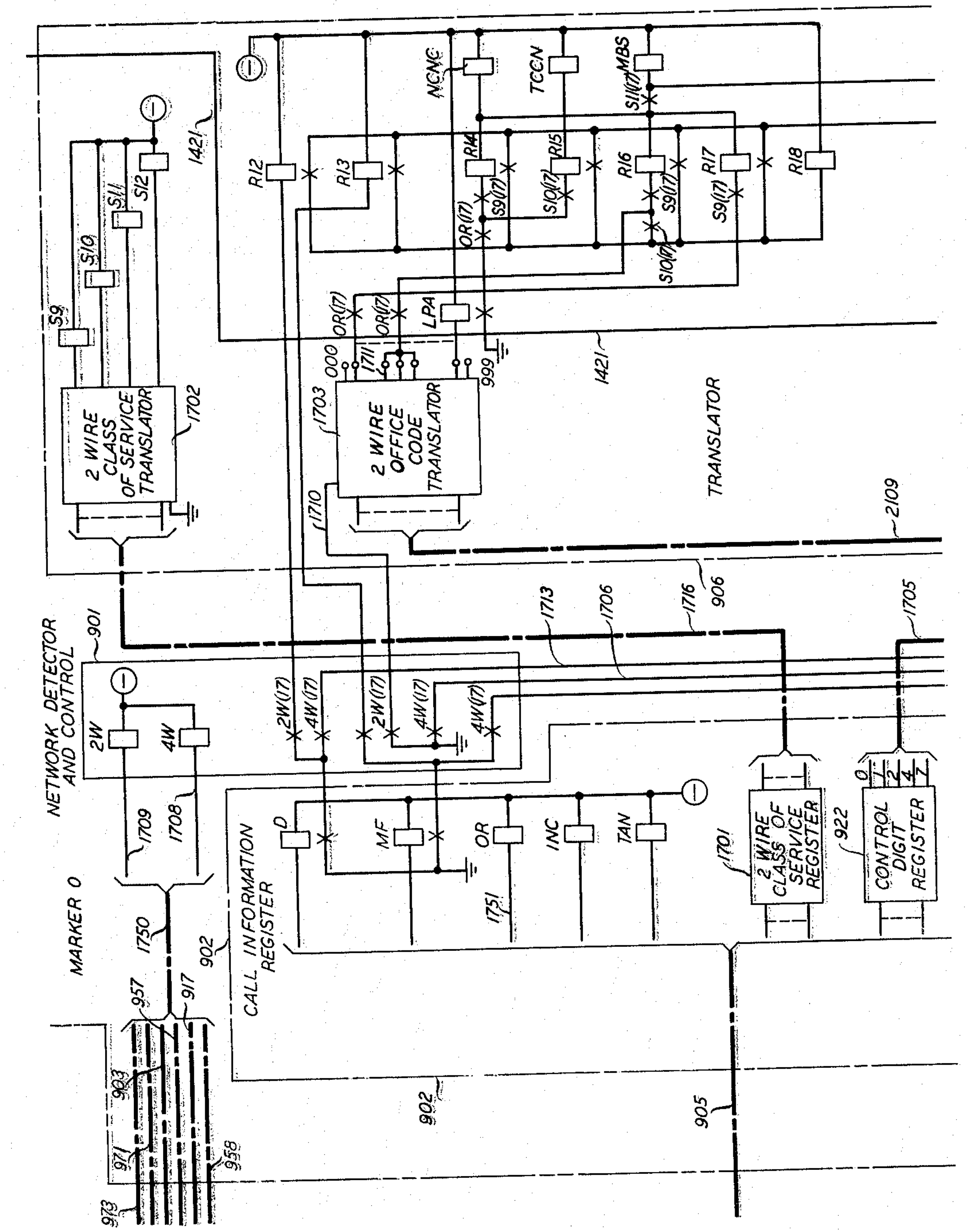
Figure 18:
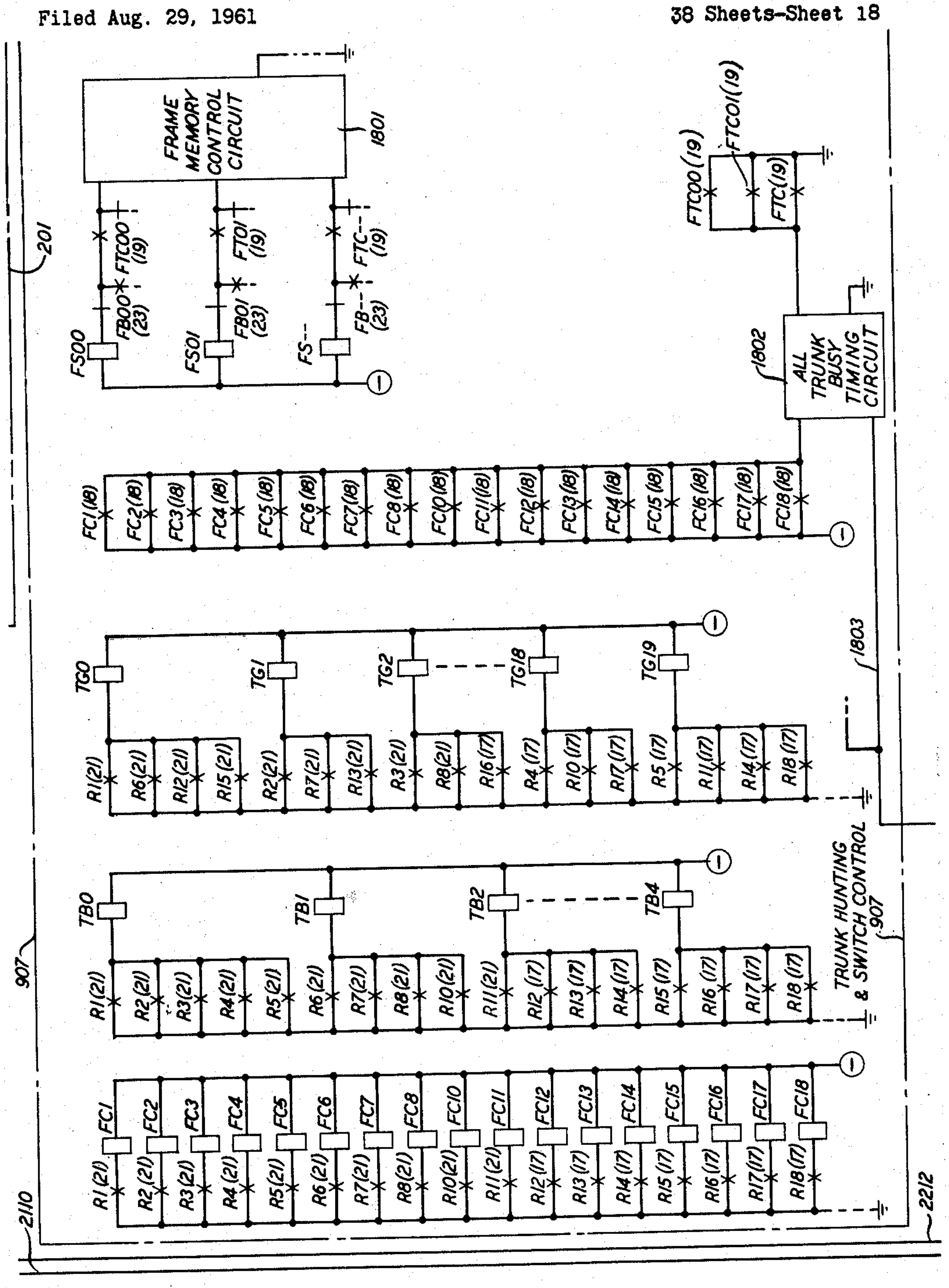
Figure 19:
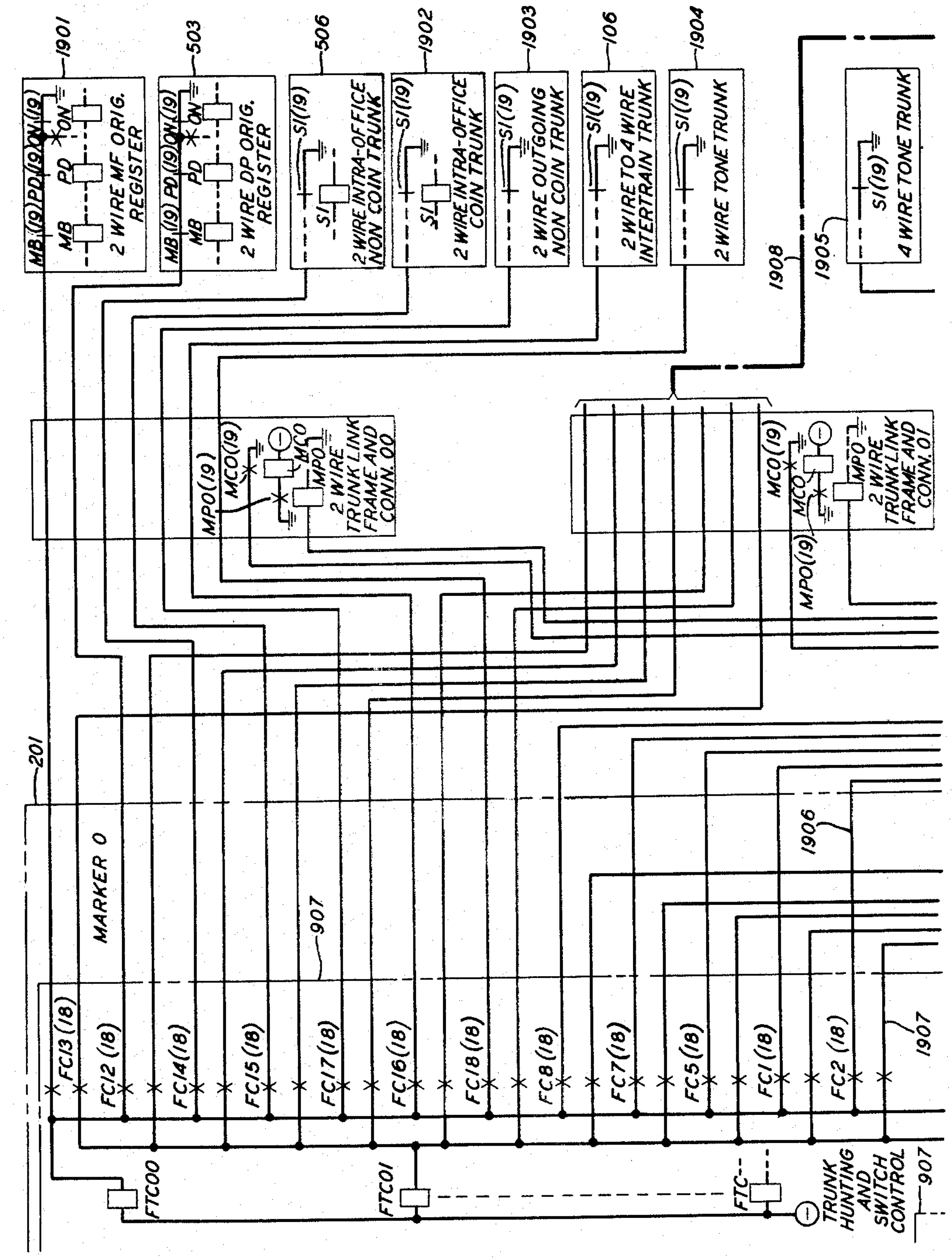
Figure 20:
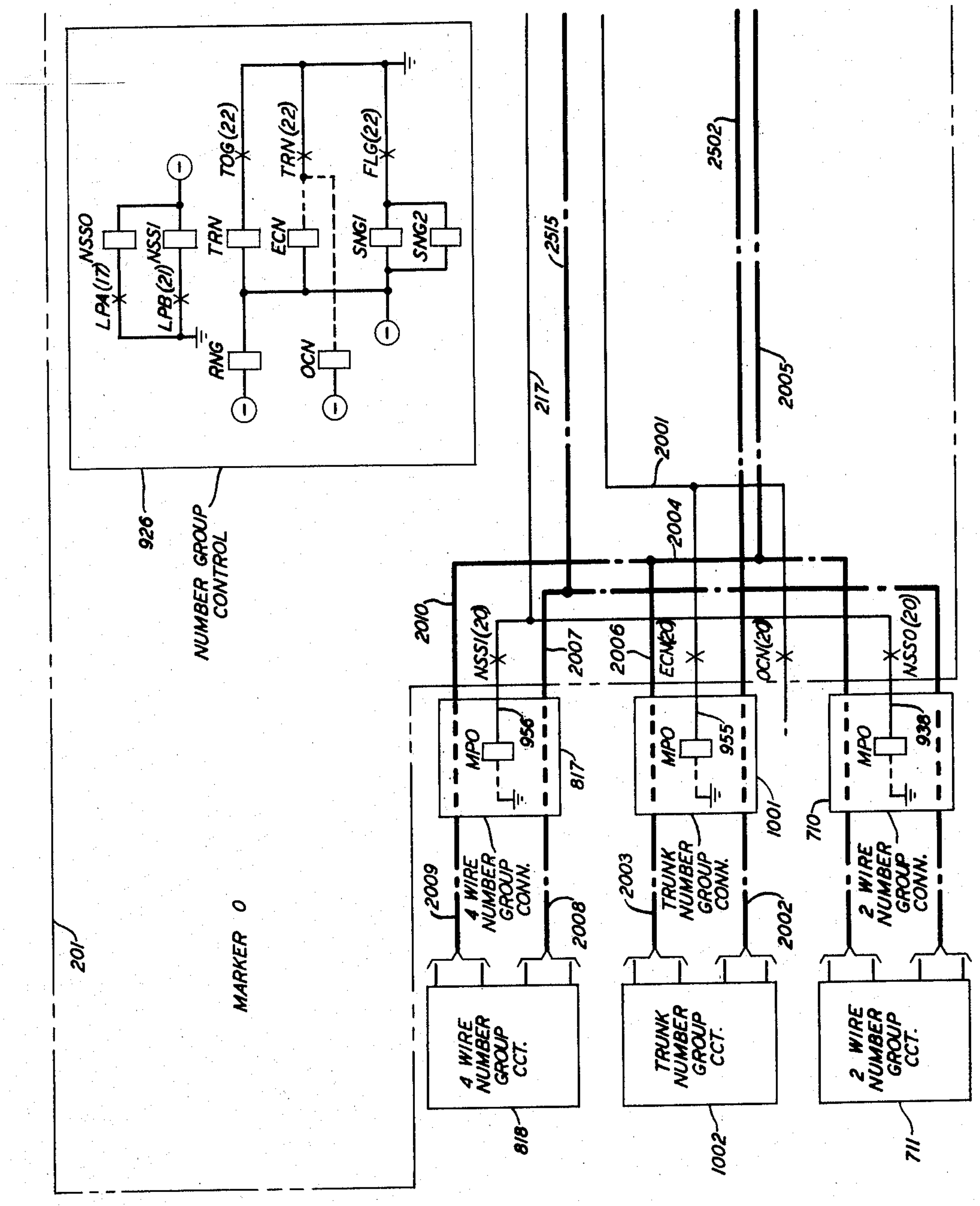
Figure 21:
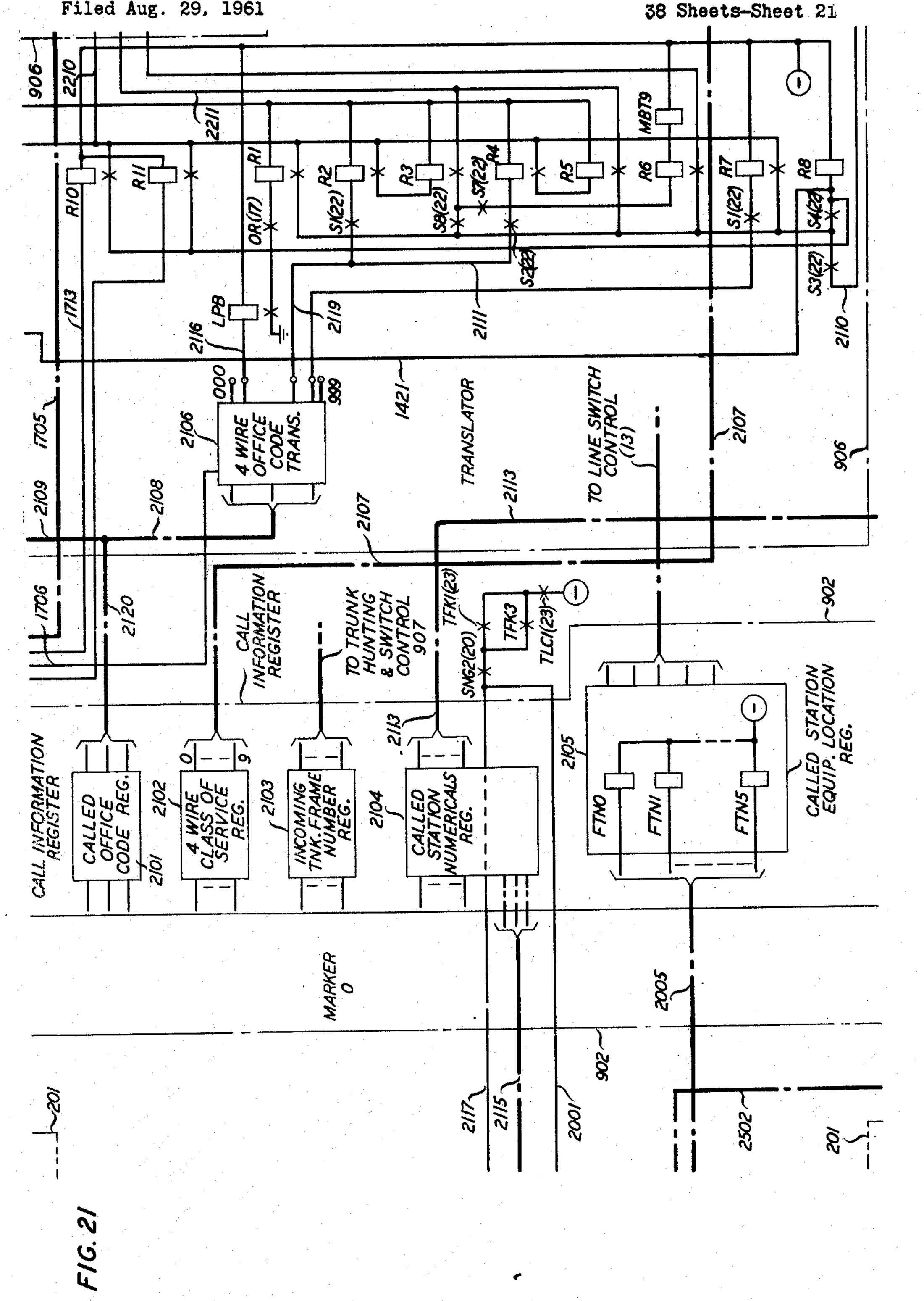
Figure 22:
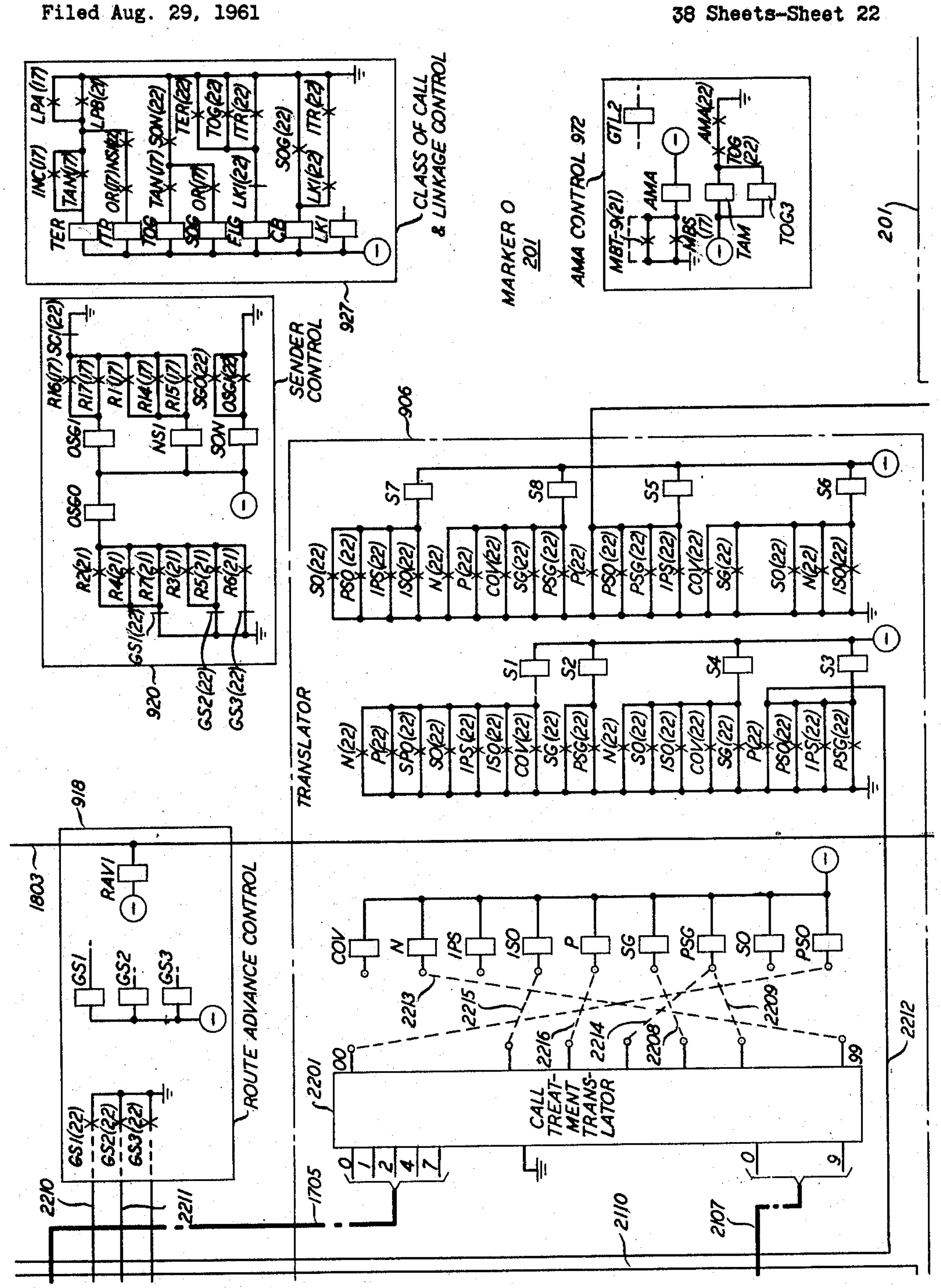
Figure 23:
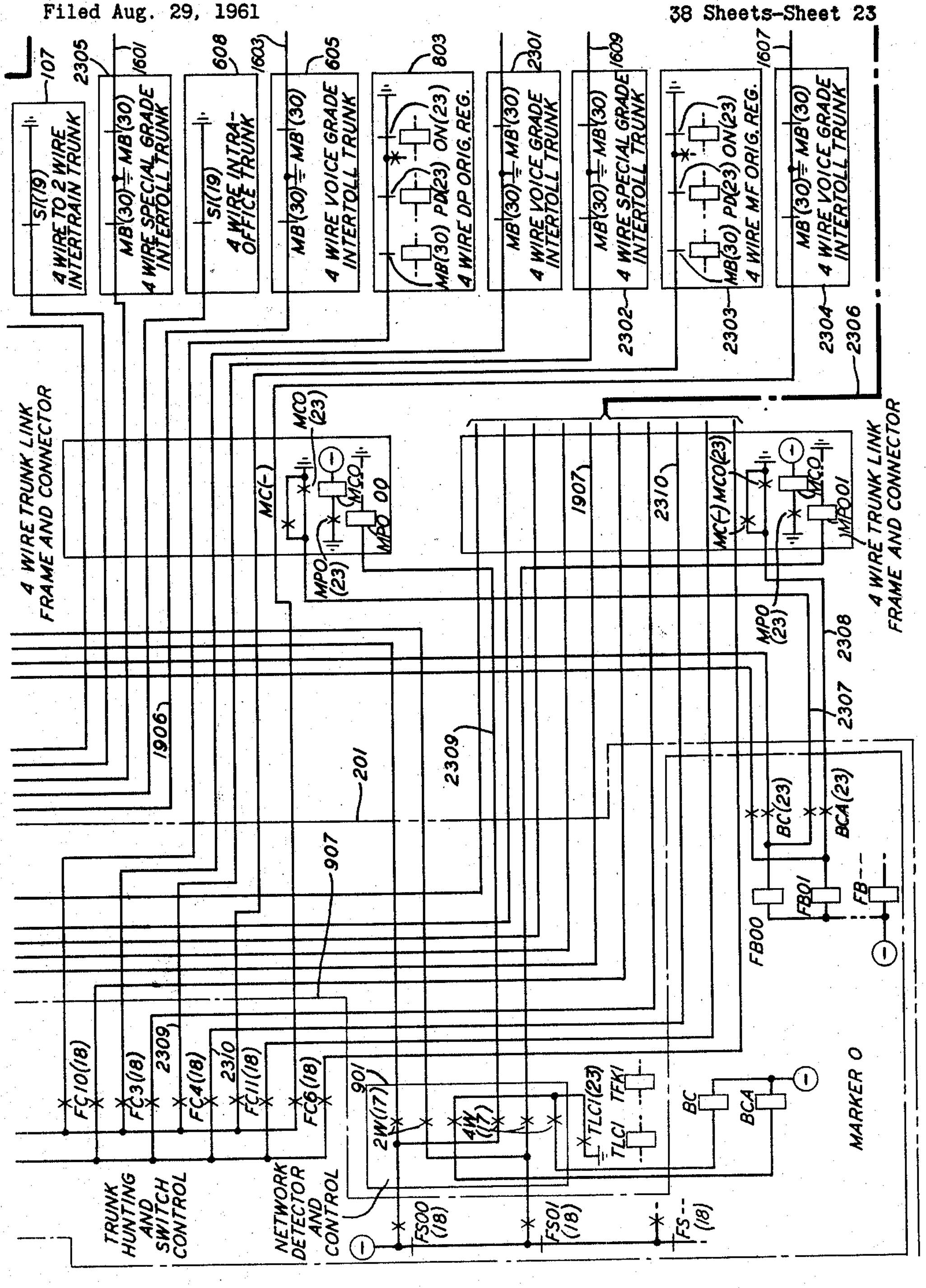
Figure 24:
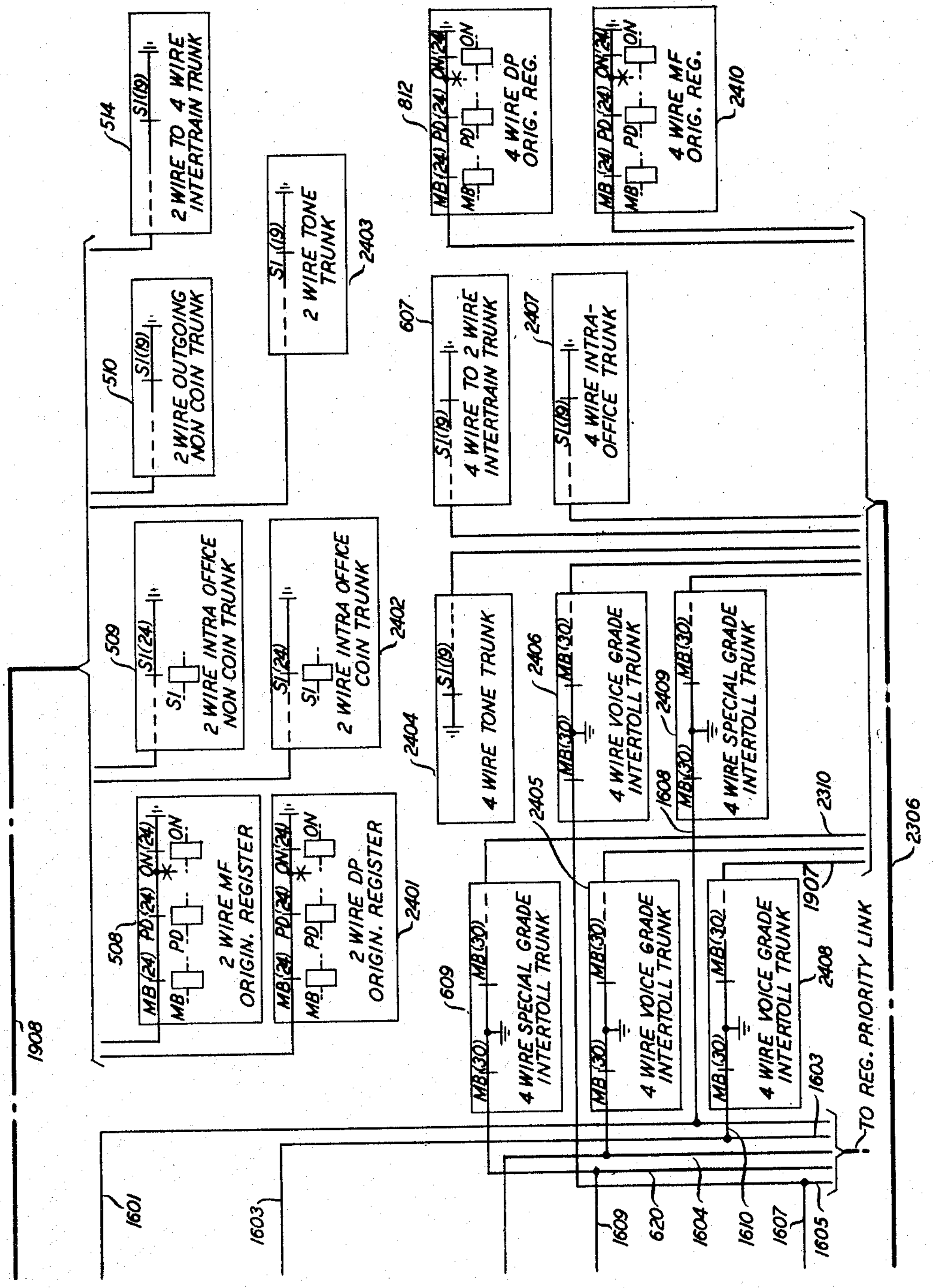
Figure 25:
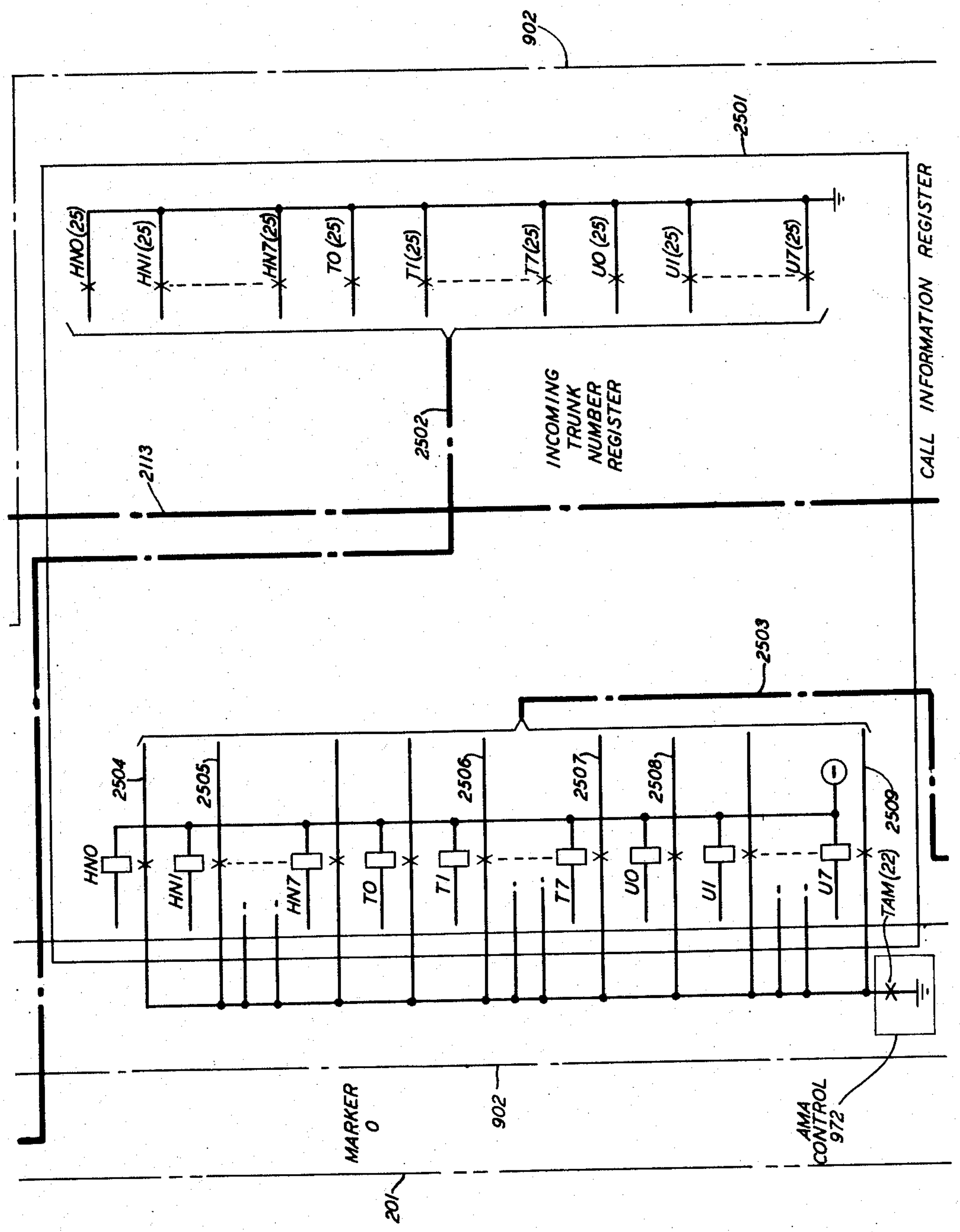
Figure 26:
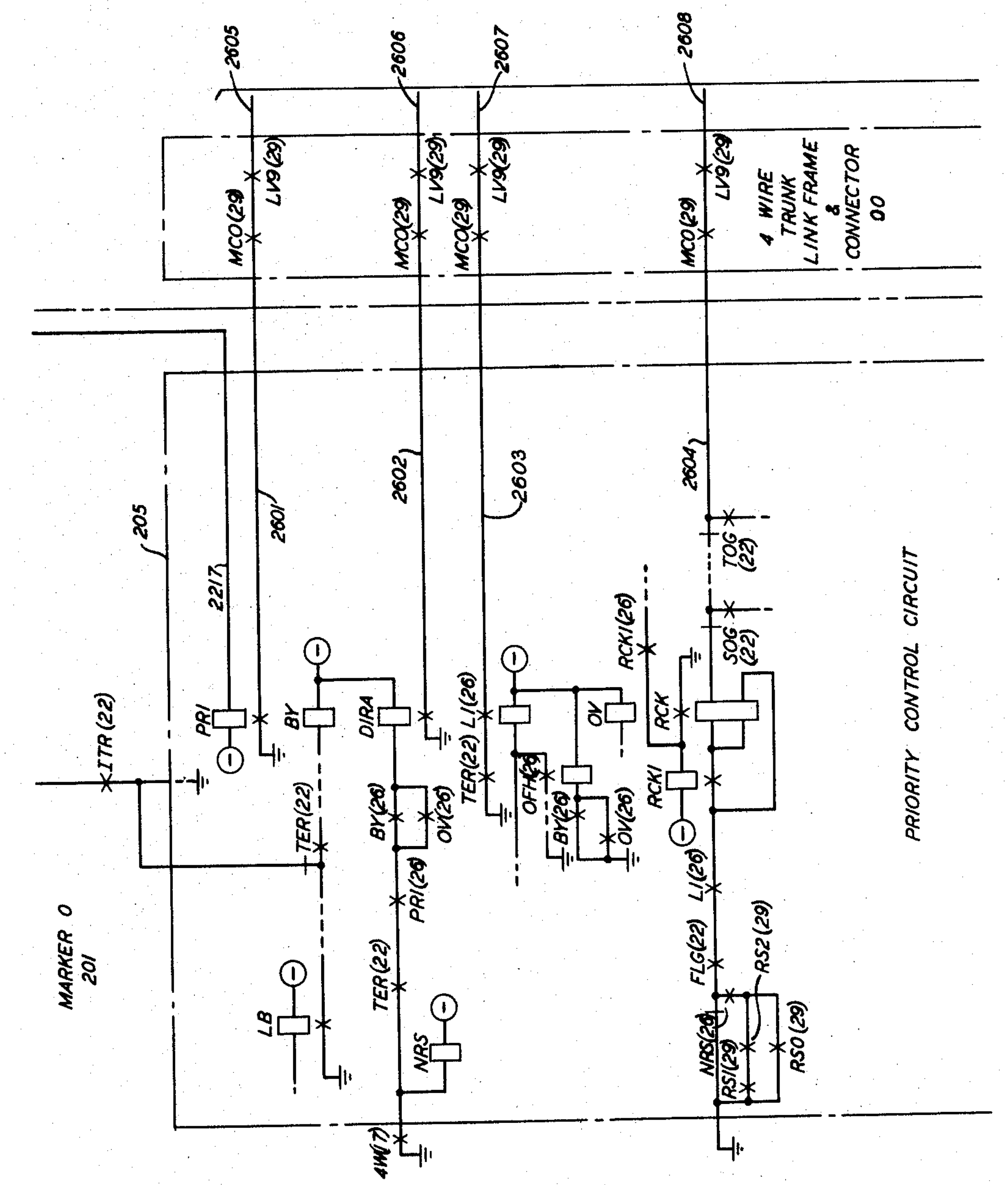

The operating winding of each relay has been given both an alphabetical and numerical designation. Many of these designations are indicative of the function performed by the associated relay; however, not all of the relays shown on the drawing are given such functional designations. When a relay is referred to in this description, a number in parentheses will follow the relay designation. This number indicates the number of the figure of the drawing on which the winding of the designated relay is shown. For example, 4W (17) identifies relay 4W whose operating winding is shown on FIG. 17 of the drawing.

The contacts of the various relays are portrayed in detached contact schematic form. Each detached contact or group of detached contacts is labeled with the designation of the relay with which they are associated and with the number of the figure of the drawing on which the operating winding of the associated relay may be found. The figure number is placed in parentheses following the designation of the relay associated with the relay contact or group of contacts. For example, 4W (17) identifies a contact of relay 4W whose operating winding is shown on FIG. 17.

Cables, which are indicated in the drawing as heavy lines broken by single dashes, comprise a plurality of leads or smaller cables whose paths parallel each other. Where a cable is terminated at the exterior of a block, its leads are associated with circuitry included in the element represented by the block whose operation is not described in detail herein, but is described elsewhere, as indicated in the detailed description.

The cables and leads of the drawing are given numerical designations, the first digit or digits of which indicate the number of the figure of the drawing on which they originate, and the last two digits of which indicate the numerical designation of the particular cable or lead. For example, cable 977 identifies the cable extending from sender control 920 on FIG. 9 to four-wire sender connector 807 on FIG. 8. Where a cable is separated into its components of smaller cables or leads a new numerical designation is given to each component at the point of separation. For example, cable 954 originating from number group control 926 on FIG. 9 is separated into two leads, 955 and 956, extending respectively to trunk number group connector 1001 on FIG. 10 and four-wire number group connector 818 on FIG. 8.

Figure 32:
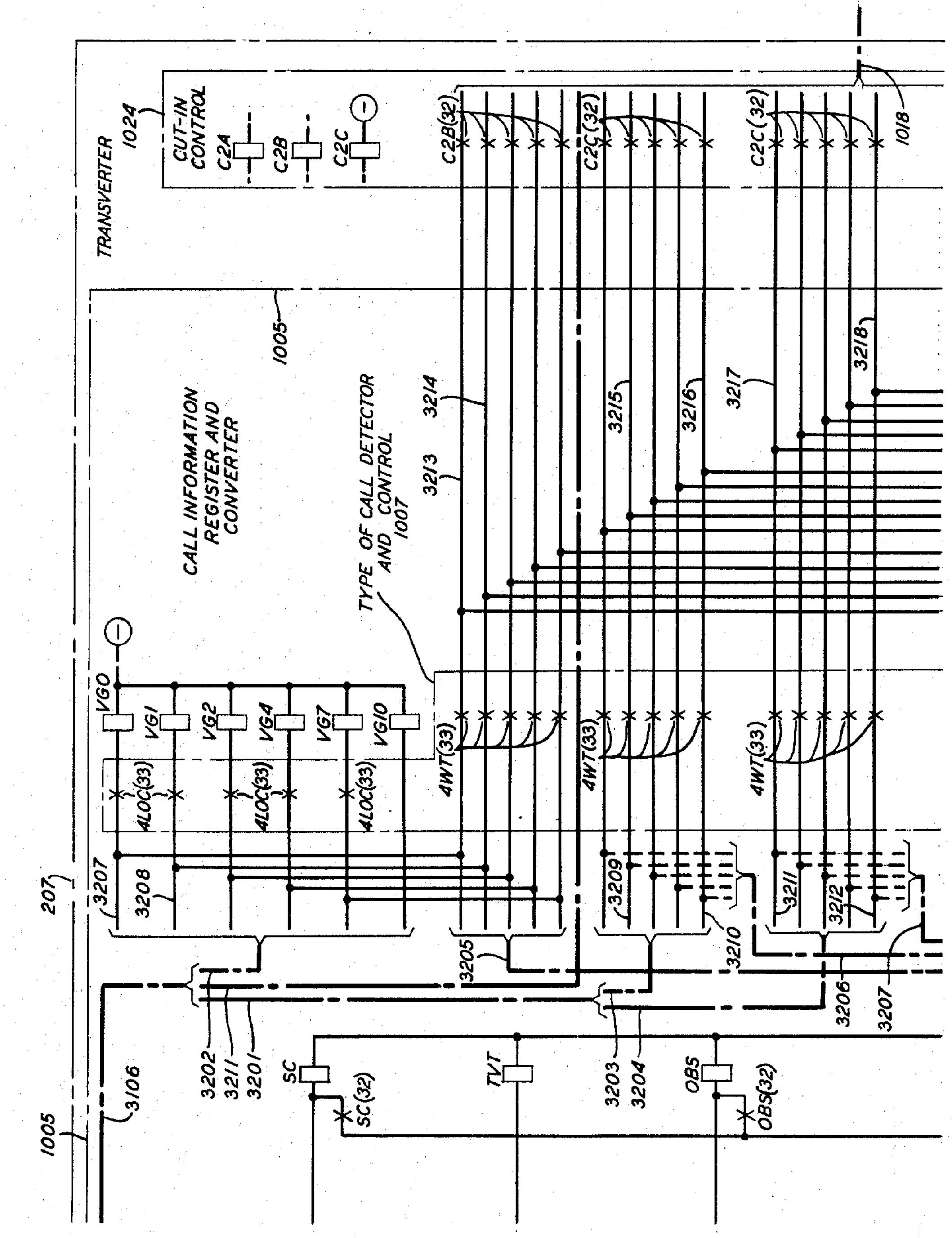
Figure 33:
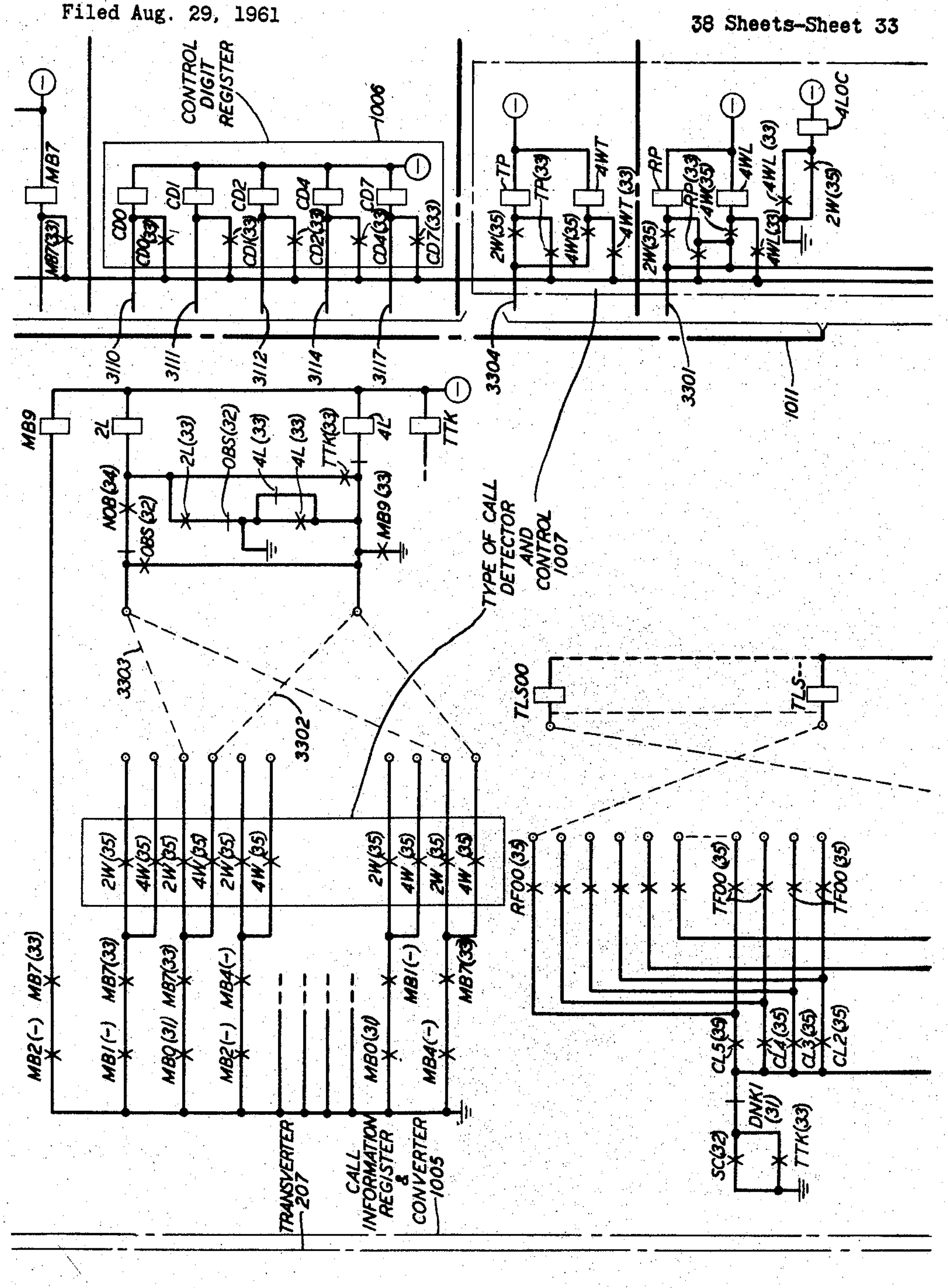
Figure 34:
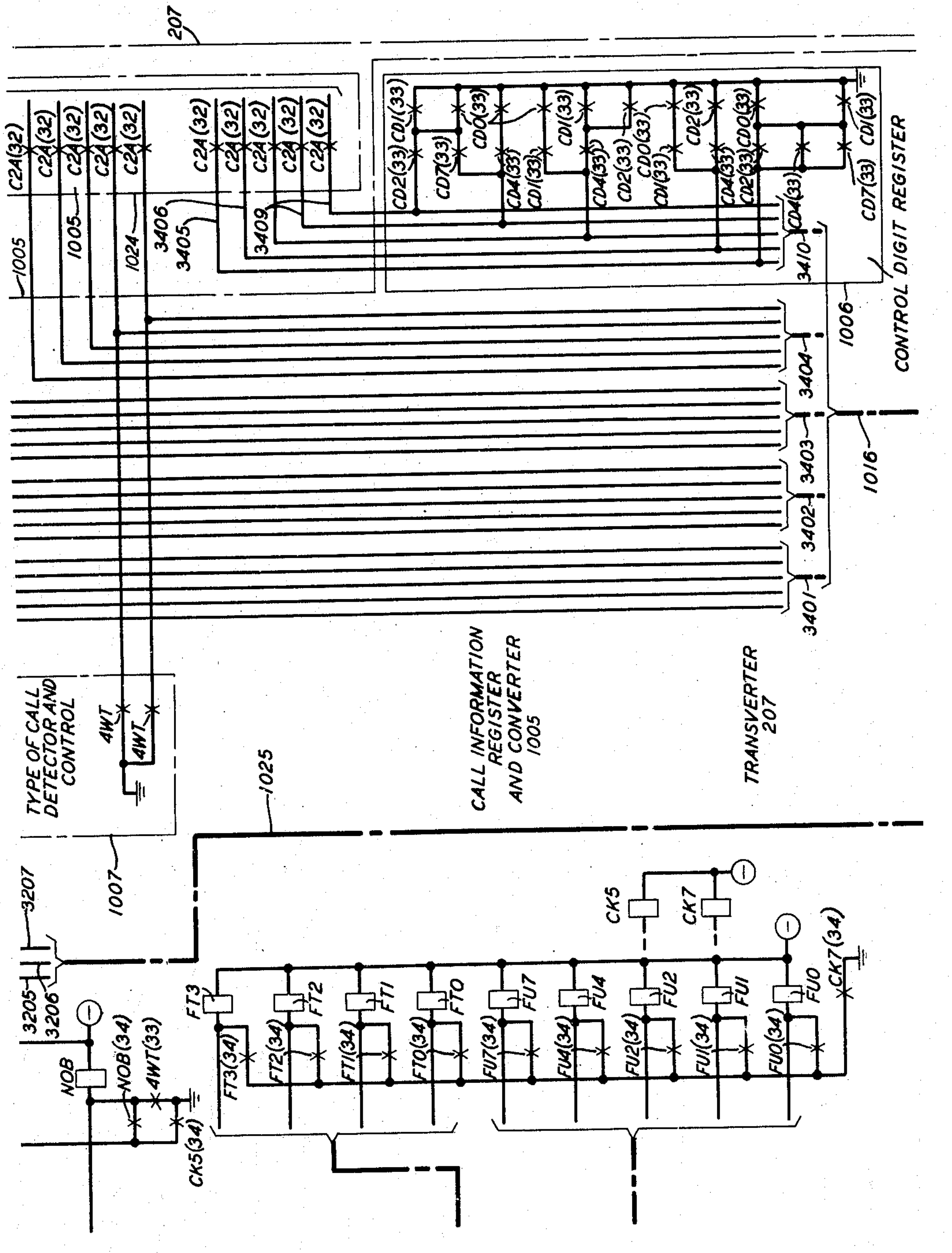
Figure 35:
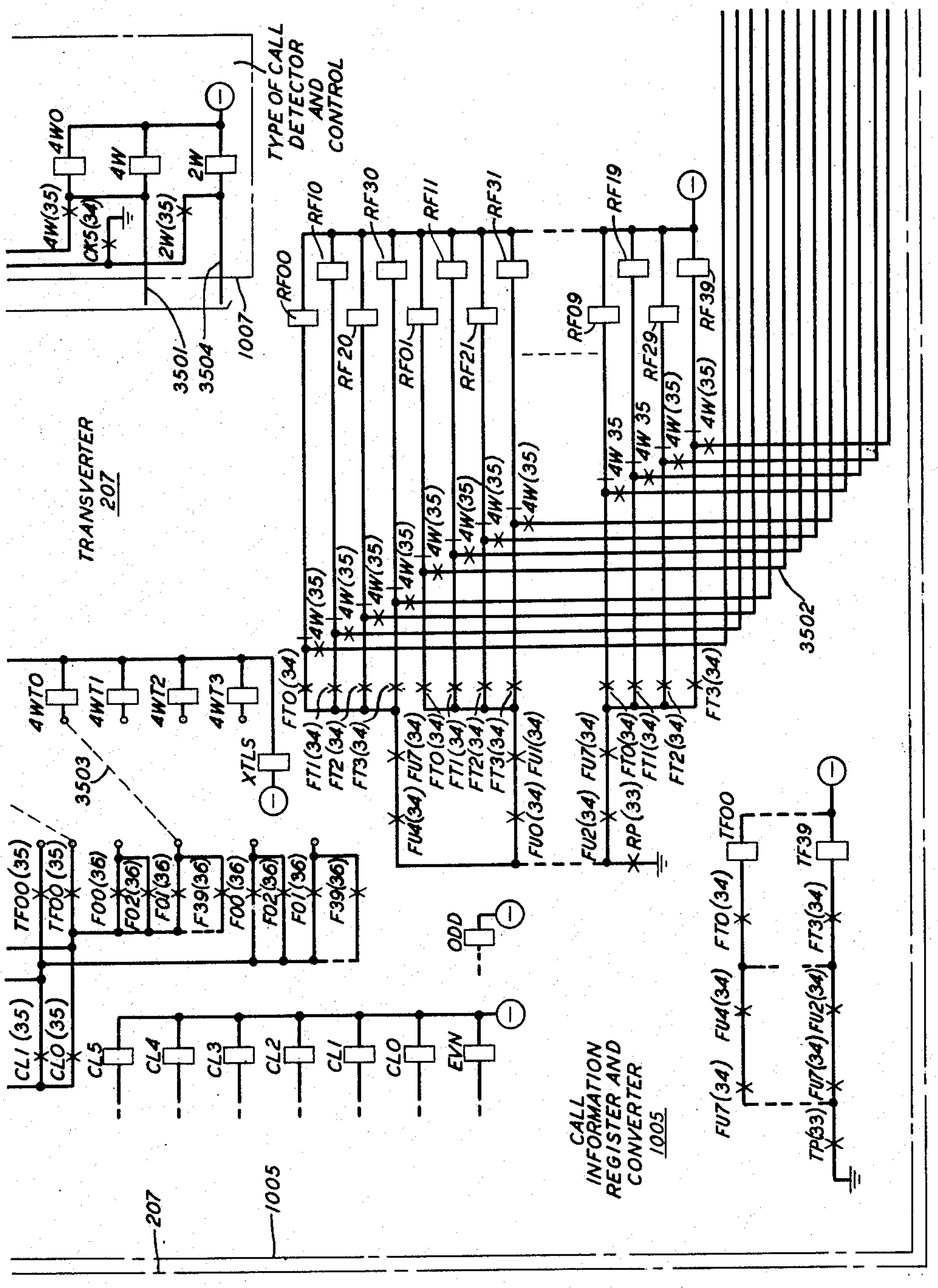
Figure 36:
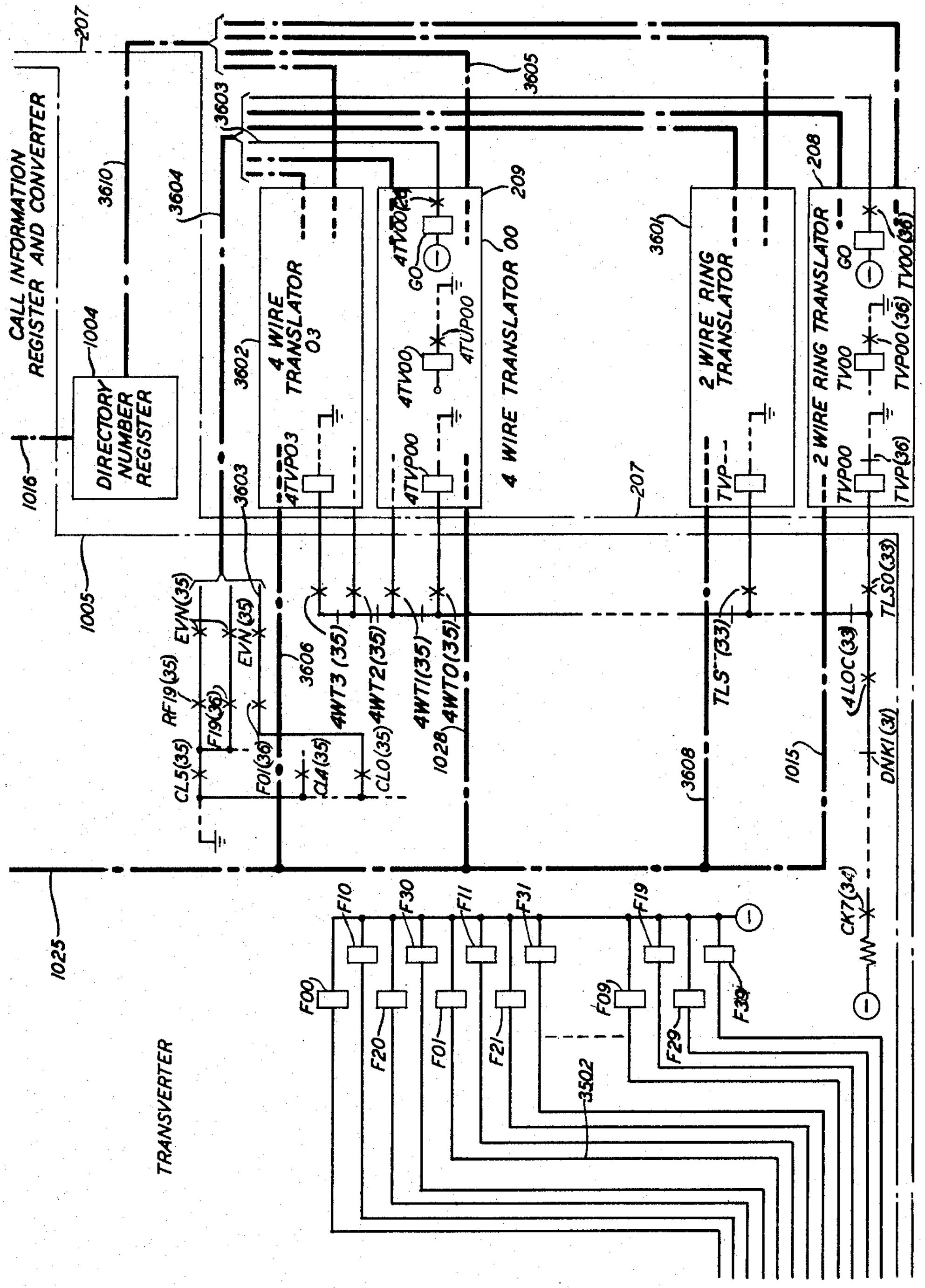
Figure 37:
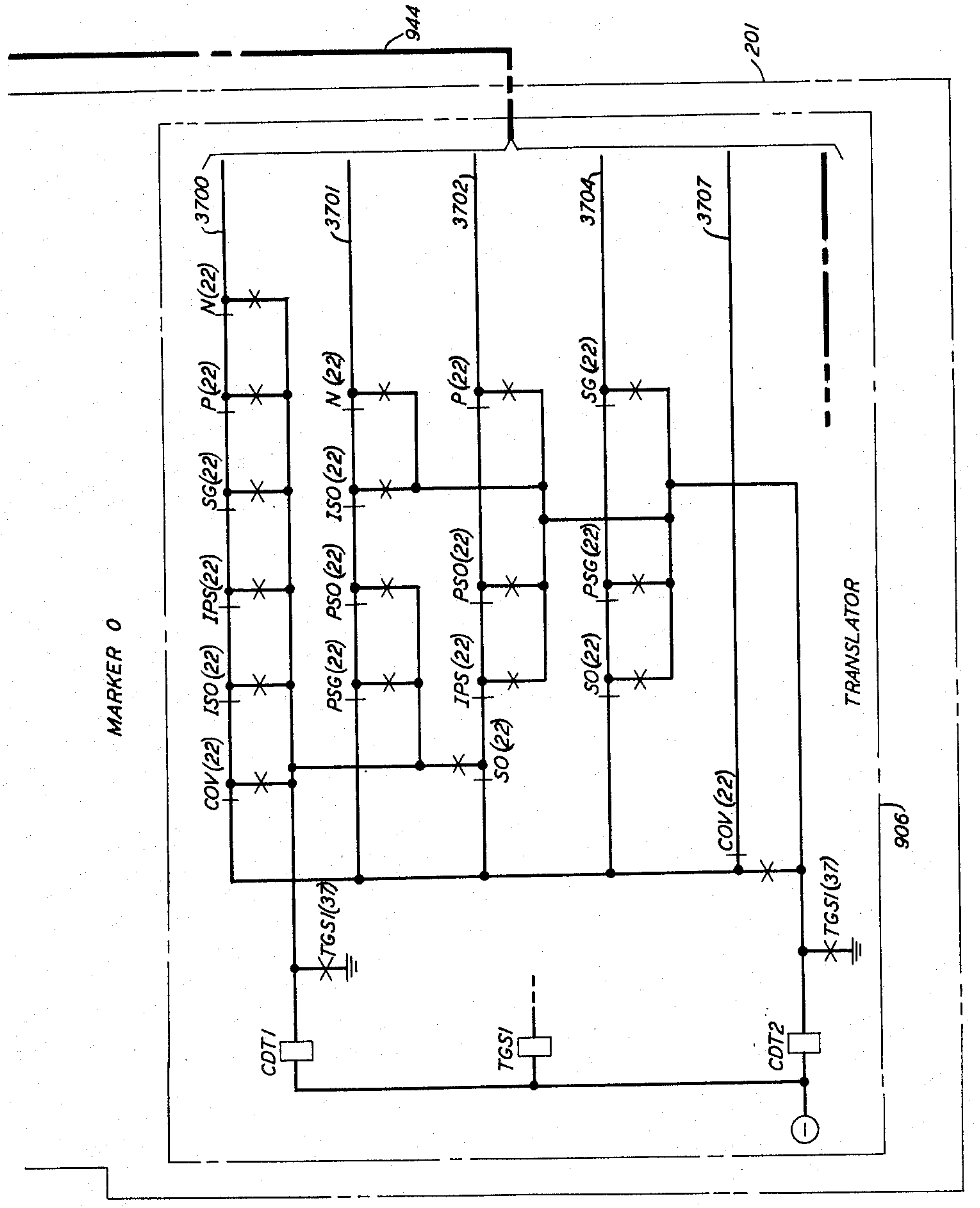
Figure 38A:
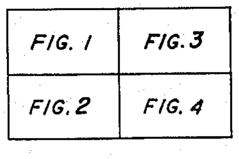
FIGS. 38A, 38B, and 38C are key diagrams showing how the various figures should be connected together.
Figure 38B:
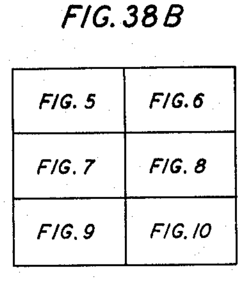
Figure 38C:
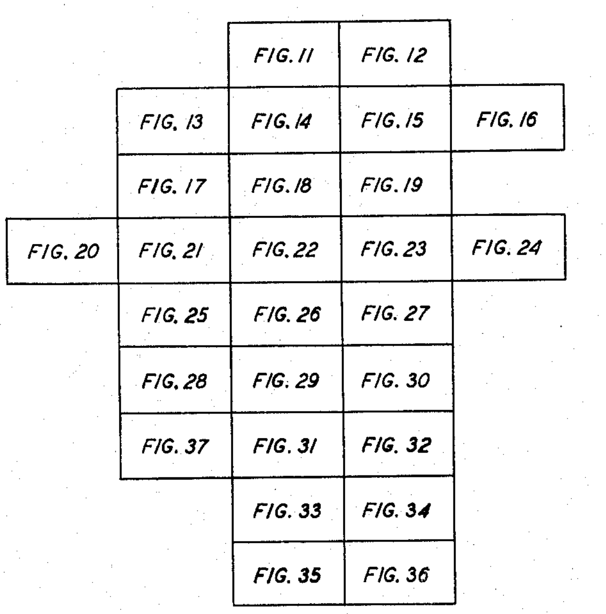

Those circuit components which are shown in block diagram form are given numerical designations, the first digit or digits of which indicate the figure of the drawing on which they are located. Since certain of these components are shown in varying degrees of detail on separate figures, the original numerical designation of the circuit component is retained regardless of figure number. However, a number in parentheses following the original numerical designation is used to indicate the figure referred to in the description. For example, cut in control 1024 (32) identifies the cut in control which is initially shown on FIG. 10 and of which certain details are shown on FIG. 32.

FOUR-WIRE INTEROFFICE CALL: ORIGINATING PORTION; NONPRIORITY—VOICE GRADE

The aforementioned Patent 2,585,904 to A. J. Busch discloses the switching operations required to complete a subscriber outgoing connection. Frequent reference to this description will be made hereinbelow.

When a customer at a four-wire station such as 109 initiates a call, a connection is established from the calling station 109 to an appropriate originating register such as 803. This connection is called a dial tone connection and will be described under a separate heading hereinbelow.

It is assumed, for purposes of this description, that a dial tone connection has been established in four-wire network 108 of switching center 1 from the appearance 602 of four-wire calling station 109 on four-wire line link frame 19 (6) to the appearance 603 of four-wire originating register 803 on four-wire trunk link frame 00 (6) through link 604. The customer at four-wire station 109, upon receiving dial tone from four-wire originating register 803, proceeds to dial a control digit indicative of the desired priority and grade of trunk. This is followed by the directory number of a called four-wire station, such as 401, in switching center 3. This information is received by, and stored in four-wire originating register 803.

Four-wire originating register 803 comprises register circuits for the storage of information, such as the dialed directory number, the equipment location of four-wire calling station 109 and the class of service of four-wire calling line 109. The operation and functions of these circuits are fully described in the Busch patent.

Four-wire originating register 803 further contains a control digit register 804 which is similar to the other digit registers of the originating register as described in the Busch patent.

When the customer at four-wire station 109 has completed dialing and the dialed digits, including the control digit and the directory number of called four-wire station 401, have been stored in four-wire originating register 803, a connection including cables 805 and 718 and originating register marker connector 125 and cable 919 is established from four-wire originating register 803 to marker 201 over which the stored call information is transferred to marker 201.

The marker 201 comprises a network detector and control 901 and a call information register 902. The network detector and control 901 detects which network, two-wire 101 or four-wire 108, requires the establishment of a connection therein, and directs marker 201 in establishing the required connection within the appropriate network. Call information register 902 comprises registers for the storage of specific items of call information, examples of which are the called office code and the numericals included in the directory number of called four-wire station 401, the class of service of calling four-wire station 109 and the equipment location of calling four-wire station 109. A control digit register 922 is further included in call information register 902 and may comprise a digit register similar in operation to those digit registers, described in the patent to Busch, which store the digits of the called line directory number through the operation of two-out-of-five relays. The remainder of the specific registers included in the call information register are similar to those described in the Busch patent.

The control digit, the dialed directory number of called four-wire station 401, the class of service of calling four-wire station 109, the equipment location of calling four-wire station 109 and the class of call indication are forwarded from four-wire originating register 803 through cable 805, through cable 718, through originating register marker connector 125, through cables 919, 921, and 905 to call information register 902, where this information is stored in the appropriate registers. A type of network signal is also passed from four-wire originating register 803 to network detector and control 901 to indicate that the call in progress requires that a connection be established in four-wire network 108. This signal is transmitted from four-wire originating register 803 through cable 805, through cable 718, through originating register marker connector 125, through cables 919 and 973 to network detector and control 901, where it is stored for future use.

Translator 906 will be described in greater detail below. However, its function is to translate call information, as received from call information register 902, into the information required by marker 201 in establishing the desired connection within four-wire network 108. The control digit, which is indicative of the grade of trunk and the degree of priority requested by the calling customer at four-wire station 109, and the class of service of four-wire station 109 are passed from call information register 902 through cable 924 to translator 906 where they are examined and compared to ascertain whether or not four-wire station 109 is entitled to the requested priority and grade of trunk.

It is assumed, for this example, that the control digit dialed by the calling customer at four-wire station 109 indicates a nonpriority call for which voice grade trunk facilities may be used. Translator 906 ascertains that four-wire station 109 is entitled to make such a call and provides a nonpriority, voice grade type of treatment indication.

The three digit office code, which is included in the directory number of called four-wire station 401, is also passed from call information register 902 through cable 924 to translator 906 where, through translation, it is ascertained that the call is directed to a four-wire station served by switching center 3. Translator 906 then combines the results of the previously described type of treatment translation and office code translation to provide the information required by the various hunting and control circuits of marker 201 to control four-wire network 108 in establishing the desired connection. This information includes the grade of trunk facility required, the location within four-wire switching network 108 of the proper grade of trunks which extend to switching center 3 or which may be used to reach switching center 3, the type of sender appropriate for use with such trunks, the location of senders of this type within four-wire network 108, the type of call data record, if any, to be made of the call and various other items of information pertinent to the priority or nonpriority treatment of the call and its completion within the four-wire network 108.

As a result of the translations performed by translator 906, indications are forwarded from translator 906 to trunk hunting and switch control 907 through cable 908 which identify the type of trunk required for the completion of the call in progress and the location of trunks of this type within switching center 1. It is assumed for purposes of this section of the description that four-wire voice grade intertoll trunk 605 extends from switching center 1 to switching center 3 and thus may be used to complete the call originated from four-wire station 109.

Trunk hunting and switch control 907 extends test leads through cables such as 910 and 911 to all trunk link frames in switching center 1 on which four-wire voice grade intertoll trunks extending to switching center 3 appear. Those trunk link frames on which an idle four-wire voice grade intertoll trunk extending to switching center 3 appears, return a signal to trunk hunting and switch control 907 indicating the availability of a suitable trunk.

Other test leads are extended from trunk hunting and switch control 907 through cables such as 910 and 911 to all trunk link frames in the four-wire network 108. Those trunk link frames which are currently connected to another marker in switching center 1, and are thus not available for use by marker 201, return a signal to trunk hunting and switch control 907 indicative of their non-availability. As a result of these tests for an idle trunk link frame and an idle trunk of the type required for the call in progress, trunk hunting and switch control 907 selects an idle four-wire trunk link frame, such as 00 (6), on which an idle four-wire voice grade intertoll trunk, such as 605, appears. A control connection is then established to the selected four-wire trunk link frame 00 (6). This connection extends from trunk hunting and switch control 907 through cable 913, through network detector and control 901 and through cables 914 and 933 to four-wire trunk link frame and connector 00 (6). Further connections are established from trunk hunting and switch control 907 through cables 911, 939, and 933 to four-wire trunk link frame and connector 00 (6).

The previously described four-wire network indication received by network detector and control 901 from four-wire originating register 803 was used in directing trunk hunting and switch control 907 in establishing the above-described initial connection to four-wire trunk link frame and connector 00 (6). Had the call originated in two-wire network 101 and a two-wire originating register, such as 503, had been connected to marker 201, network detector and control 901 would have received a two-wire network indication and would therefore have directed trunk hunting and switch control 907 to connect to a selected two-wire trunk link frame, such as two-wire link frame 00 (5), within two-wire network 101.

Included in the information transmitted from four-wire originating register 803 over the previously described path to call information register 902 was an indication that the call in progress originated from a local station served by switching center 1. This indication is passed to class of call and linkage control 927 through cable 940. Class of call and linkage control 927 then causes call information register 902 to forward the equipment location of calling four-wire station 109 through cable 941 to line switch control 916. Class of call and linkage control 927 further causes call information register 902 to interrogate network detector and control 901 as to the network, two-wire 101 or four-wire 108, in which the call in progress originated. This interrogating path extends from the class of call and linkage control 927 through cable 940, call information register 902, cable 943, network detector and control 901 and cable 942 to line switch control 916 where the result of this interrogation is stored. Line switch control 916 then establishes a connection to four-wire link frame 19 (6) on which four-wire station 109 appears. This connection extends from line switch control 916 through cable 935 to four-wire line link frame and connector 19 (6).

Marker 201 is now connected to four-wire line link frame 19 (6) on which calling four-wire station 109 appears and to four-wire trunk link frame 00 (6) on which the selected four-wire voice grade intertoll trunk 605 appears. In a manner similar to that described in the patent to Busch marker 201 now controls four-wire line link frame 19 (6) and four-wire trunk link frame 00 (6) in establishing a connection from the appearance 602 of calling four-wire station 109 on four-wire line link frame 19 (6) to the appearance 615 of four-wire voice grade intertoll trunk 605 on four-wire trunk link frame 00 (6) through a link such as 604.

Included in the information ascertained by translator 906, as previously described, was the type of sender required for use with the selected grade of trunk, such as four-wire voice grade intertoll trunk 605. This information is passed from translator 906 through cable 944 to sender control 920. The selection of a sender by a marker is described in the Busch patent. Briefly, translator 906 ascertains that a four-wire sender, such as 806, is required for use with a four-wire intertoll trunk, such as 605, and forwards this information to sender control 920. A connection is then established from sender control 920 through cable 977, through four-wire sender connector 807 through cable 808 to four-wire sender 806. Pertinent call information is then forwarded through this connection from sender control 920 to four-wire sender 806 including a control digit which is indicative of the type of treatment ascertained by translator 906 from the dialed control digit and the calling line class of service.

A connection is established, under control of marker 201, from four-wire sender 806 to four-wire voice grade intertoll trunk 605. This connection extends from four-wire sender 806 through cable 810, through a crosspoint of four-wire sender link 809 and through cable 606 to four-wire voice grade intertoll trunk 605.

The marker 201 makes various tests of these connections and checks that the information forwarded to sender 806 has been properly registered. A signal is then sent from marker 201 to four-wire sender 806 to advance, whereupon a test is made of the conductors of four-wire voice grade intertoll trunk 605 which extend to switching center 3. Upon the successful completion of this test, marker 201 is released, and four-wire sender 806 awaits a signal from switching center 3 to forward the control digit and directory number of called station 401 over the conductors of four-wire voice grade intertoll trunk 605.

In the handling of the above-described originating portion of a four-wire voice grade interoffice call, the testing functions and connections established under the control of marker 201 were directed by network detector and control 901 exclusively to the four-wire network 108.

When, in response to a signal from switching center 3, the transmission of the control digit and called line directory number has been completed by four-wire sender 806, the connection between four-wire intertoll trunk 605 and four-wire sender 806 is released, and the control of the call is transferred to four-wire voice grade intertoll trunk 605.

A clearer understanding of the originating portion of the above-described four-wire voice grade interoffice call may be obtained from a more detailed description with reference to FIGS. 11 through 37. The operation of four-wire originating register 803 in response to dialing signals from calling four-wire station 109 and its connection to the call information register 902 of marker 201 are described in some detail in the patent to Busch and will not be detailed herein. This connection extends through originating register marker connector 125 (11) in which multicontact connector relays such as MCO (11) and RC1 (11) are operated. Relay RC1 (11) is associated exclusively with four-wire originating register 803, and other similar connector relays are individually associated with the other originating registers of switching center 1. Relay MCO (11) is associated exclusively with marker 201, and other similar connector relays are individually associated with the other markers of switching center 1.

The operation of connector relays RC1 (11) and MCO (11) is described in the patent to Busch. The operation of relay RS1 (11) initiates the establishment of a connection from four-wire originating register 803 to marker 201 as described in the Busch patent. The operating circuit for relay RS1 (11) may be partially traced from ground in originating register marker connector 125 (11) through the winding of relay RS1 (11) over lead 1123, through cable 1202, over lead 1123, through break contacts of relays BT (12), BRL (12), MRL (12) respectively, and make contacts of relays SR (12) and MST (12) respectively, to battery.

Upon the establishment of this connection from four-wire originating register 803 through cables 805 and 718, through four-wire originating register marker connector 125, through cable 919 and other cables 973, 921, and 905 to the network detector and control 901 and call information register 902, several circuits are completed for passing call information from four-wire originating register 803 to marker 201.

Relay 4W (17) in network detector and control 301 (17) is operated over a circuit which extends from battery through the winding of relay 4W (17) over lead 1708, through cable 1750, through cables 973 and 919, through originating register marker connector 125, through cable 718 and through cable 805 to ground in four-wire originating register 803.

The ground in four-wire originating register 803 which is provided for the operation of relay 4W (17) is connected to a lead (not shown) identifying four-wire originating register 803 as a part of four-wire network 108. A similar lead (not shown) is provided in all four-wire originating and incoming registers, such as 812, 813 and 814. In a similar manner, a grounded lead (not shown) is provided in each two-wire originating register, such as 503 and 508, and incoming register, such as 703 and 704, to identify them as a part of two-wire network 101. These leads extend from the register, two-wire or four-wire, in use through the appropriate incoming or originating register marker connector, 124 or 125, to the network detector and control 901, and provide circuits for the operation of either relay 2W (17) or 4W (17). The operation of relay 2W (17) indicates that the activities of marker 201 should be directed to two-wire network 101. The operation of relay 4W (17) indicates that the activities of marker 201 should be directed to four-wire network 108.

The circuits provided in the incoming and originating registers of two-wire network 101 and four-wire network 108 for signalling call information to call information register 902 are not shown in detail in the drawing but are represented by a common ground source. A description of the operation of the various incoming and originating register circuits is given in the patent to Busch.

Relay OR (17), in call information register 902 (17), is operated in a circuit extending from battery through the winding of relay OR (17), over lead 1751, through cables 905, 921 and 919, through originating register marker connector 125, through cable 718 and through cable 805 to ground in four-wire originating register 803.

Various other items of call information are forwarded from four-wire originating register 803 to marker 201. These are forwarded over circuits paralleling the path previously described for the operation of relay OR (17), received by call information register 902 (17) and stored in the appropriate registers therein, namely, control digit register 922 (17), called office code register 2101, four-wire class of service register 2102, called station numericals register 2104, and calling station equipment location register 2801.

A series of translations of this call information is made in translator 906 to ascertain the type of treatment to be accorded the call and the type of trunk suitable for the completion of the call. Call treatment translator 2201 is employed to determine the type of treatment a call is to receive. This determination is made through a translation of the class of service of calling four-wire station 109 and the control digit dialed by the calling customer.

In this illustrative embodiment of the invention ten classes of service are available to a four-wire station. An indication of the class of service of four-wire station 109 was passed, as previously described, to four-wire class of service register 2102 in which it is stored on a one-out-of-ten basis.

Ten possible control digits may be dialed by a calling customer; however, certain of these are used to indicate information other than priority and grade of trunk. For purposes of simplicity, it is assumed that all ten digits are available for control purposes. The control digit was passed, as previously described, to call information register 902 (13, 17, 21, 25, 28) where it was stored in control digit register 922 on a two-out-of-five basis. The circuit operations of control digit register 922 (17) are similar to those of the five relay digit registers in called office code register 2101 which are fully described in the patent to Busch.

The control digit is forwarded from control digit register 922 (17) through cable 1705 to call treatment translator 2201 on a two-out-of-five basis. The class of service of four-wire station 109 is forwarded from four-wire class of service register 2102 through cable 2107 to call treatment translator 2201 on a one-out-of-ten basis. Call treatment translator 2201 translates the two inputs, which represent respectively, the dialed control digit and the class of service of four-wire station 109, into one-out-of-one hundred possible outputs. Each of these one hundred outputs is indicative of a different combination of calling station class of service and dialed control digit.

It is to be noted at this time that call treatment may be ascertained from either the class of service of a calling station or the control digit dialed at the calling station. If a calling station is not entitled to originate priority calls, the translation performed by call treatment translator 2201 will provide an output signal which may be used to automatically downgrade a call requesting priority to a normal call. Conversely, if a calling station is assigned a class of service which automatically gives calls originating therefrom a priority type of treatment, a customer using such a station may originate a call which dos not require priority treatment and may so indicate by dialing a particular control digit. The translation performed by call treatment translator 2201 will then provide an output signal which may be used to automatically downgrade the call to the type of treatment indicated by the control digit.

A translator for the translation of two-out-of-five inputs to a one-out-of-ten outputs is well known in the art, and, further, a translator for the translation of two one-out-of-ten inputs into one one-out-of-one hundred outputs is also well known in the art. Therefore, call treatment translator 2201 is not described in detail herein.

The outputs of call treatment translator 2201 are cross-connected through the windings of the type of call treatment relays, such N (22), P (22), PSG (22), et cetera, to battery.

In this example the control digit dialed by the customer is indicative of a nonpriority call requiring no special grade of trunk, and the class of service assigned to station 109 indicates that calls originating therefrom are not automatically assigned either priority or a special grade of trunk. A circuit is completed in call treatment translator 2201 to operate normal type of treatment relay N (22). This circuit may be traced from battery through the winding of relay N (22) over cross-connection 2213 through call treatment translator 2201 to ground.

The operation of relay N (22) completes circuits for the operation of screening relays S1 (22), S4 (22), S8 (22), and S6 (22). Operating paths for these screening relays may be traced from ground through make contacts of relay N (22) and through the windings of relays S1 (22), S4 (22), S8 (22), and S6 (22), respectively, to battery. The screening relays which are operated as a result of the translation by call treatment translator 2201 will be used later in ascertaining the proper type of trunk to be used in completing the call in progress.

The following table sets forth a particular functional assignment of screening relays S1 (22) through S8 (22) and S9 (17) through S12 (17).

*Table No. 1*

| Relay designation: | Functional meaning |
|---|---|
| **S1** (22) | Voice grade call. |
| **S2** (22) | Special grade call. |
| **S3** (22) | Camp-on authorized. |
| **S4** (22) | No camp-on authorized. |
| **S5** (22) | Priority authorized. |
| **S6** (22) | Priority not authorized. |
| **S7** (22) | Spillover authorized. |
| **S8** (22) | Spillover not authorized. |
| **S9** (22) | Non-coin station. |
| **S10** (17) | Coin station. |
| **S11** (22) | Call data record required. |
| **S12** (22) | Party line. |

The three digit office code of switching center 3, which was dialed by the customer at four-wire station 109, is passed from called office code register 2101 over cables 2120 and 2108 to four-wire office code translator 2106. Four-wire office code translator 2106 is similar to the translator described in the patent to Busch which is used to translate the three two-out-of-five office code digit indications into a one-out-of-one thousand output signal. This translation is fully described in the patent to Busch and will not be described herein. Four-wire office code translator 2106 is enabled over lead 1706 by the operation of relay 4W (17). When enabled translator 2106 provides ground on an appropriate output terminal.

As a result of the translation of the called office code, a circuit is completed for the operation of route relay R2 (21) and route series relay MBS (17). This circuit may be partially traced from battery through the winding of relay MBS (17), through the winding of relay R2 (21), through a make contact of relay S1 (22), over lead 2119 to ground at the output of four-wire office code translator 2106. The operation of route series relay MBS (17) indicates that a record is to be made of data pertaining to the call in progress by call data recording equipment 206. This function will be described in more detail later herein.

The operation of route relay R2 (21) provides the information required by trunk hunting and switch control 907 to select, locate and connect to a trunk suitable for completing the call in progress. Various other items of information pertinent to the completion of the call are also available upon the operation of route relay R2 (21) and will be described later herein.

The following table sets forth a particular assignment of trunk groups to the various route relays R1 (21) through R18 (17). Each route relay represents a trunk group which is suitable for the completion of a particular type of call to a particular destination, and provides appropriate indications to trunk hunting and switch control 907, sender control 920, and AMA control 972.

*Table No. 2*

| Route relay number: | Trunk group |
|---|---|
| R1 (21) | Four-wire intraoffice trunk group. |
| R2 (21) | Four-wire voice grade intertoll trunk group (direct). |
| R3 (21) | Four-wire voice grade intertoll trunk group (alternate). |
| R4 (21) | Four-wire special grade intertoll trunk group (direct). |
| R5 (21) | Four-wire special grade intertoll trunk group (alternate). |
| R6 (21) | Spillover trunk group. |
| R7 (21) | Four-wire to two-wire intertrain trunk group. |
| R8 (21) | Four-wire tone trunk group. |
| R10 (21) | Four-wire dial pulse originating register group. |
| R11 (21) | Four-wire multifrequency originating register group. |
| R12 (17) | Two-wire dial pulse originating register group. |
| R13 (17) | Two-wire multifrequency originating register group. |
| R14 (17) | Two-wire intraoffice trunk group (non-coin). |
| R15 (17) | Two-wire intraoffice trunk group (coin). |
| R16 (17) | Two-wire to four-wire intertrain trunk group. |
| R17 (17) | Two-wire outgoing trunk group (direct, non-coin). |
| R18 (17) | Two-wire tone trunk group. |

The operation of relay R2 (21) completes a circuit for the operation of relay FC2 (18) which may be partially traced from ground through a make contact of relay R2 (21) and through the winding of relay FC2 (18) to battery. Relay FC2 (18), in operating, extends test leads, such as 1906 and 1907, from trunk hunting and switch control 907 to those four-wire trunk link frames, such as four-wire trunk link frame 00 (23) and four-wire trunk link frames 01 (23), on which four-wire voice grade intertoll trunks extending to switching center 3 appear, such as four-wire voice grade intertoll trunks 605 (23) and 2408.

As described in the patent to Busch, those trunk link frames having an idle trunk suitable for the completion of the call in progress return a signal to trunk hunting and switch control 907 indicating the availability of a trunk on that particular trunk link frame. Assuming that four-wire voice grade intertoll trunk 605 (23) is idle and that four-wire voice grade intertoll trunk 2408 is in use, a signal will be returned extending from ground, in four-wire voice grade intertoll trunk 605 (23), through a break contact of relay MB (30), over lead 1906, through a make contact of relay FC2 (18) and through the winding of relay FTC 00 (19) to battery, thereby operating relay 00 (19). Four-wire voice grade intertoll trunk 2408 will not return a signal due to the operated condition of relay MB (30) therein. Had four-wire voice grade intertoll trunk 2408 been idle, a signal would have been returned from ground through a break contact of relay MB in trunk 2408, over lead 1907, through cable 2306, over lead 1907, through a make contact of relay FC2 (18), through the winding of relay FTC 01 (19) to battery, thereby operating relay FTC 01 (19).

An FTC-- relay (19) is provided for each trunk link frame in four-wire network 108. The same FTC-- relays (19) are used to locate a two-wire trunk link frame with a suitable two-wire trunk appearing thereon for calls originating in two-wire network 101.

When the above-described connection was established from four-wire originating register 803 to marker 201, a circuit was completed for the operation of relay TLC1 (23). The operation of this relay and its operating circuit are fully described in the patent to Busch. A circuit was then completed for the operation of relay BCA (23), which extends from battery, through the winding of relay BCA (23), through a make contact of relay 4W (17) and through a make contact of relay TLC1 (23) to ground. Relay BCA (23), in operating, extends test leads, such as 2307 and 2308, from trunk hunting and switch control 907 to all four-wire trunk link frame and connectors, such as 00 (23) and 01 (23). Those four-wire trunk link frame and connectors which are currently connected to another marker in switching center 1 will return a signal indicating their non-availability for use by marker 201.

It is assumed that four-wire link frame and connector 00 (23) is idle and that four-wire trunk link frame and connector 01 (23) is currently connected to another marker in switching center 1. A signal is returned from four-wire trunk link frame and connector 01 (23), extending from ground, through a make contact of marker connector relay MC– which is associated with another marker of switching center 1, over lead 2308, through a make contact of relay BCA (23) and through the winding of frame busy relay FB01 (23) to battery, thereby operating relay FB01 (23). Had four-wire trunk link frame and connector 00 (23) been connected to another marker of switching center 1, a similar signal would have been passed over lead 2307, through a make contact of relay BCA (23) and through the winding of frame busy relay FB00 (23) to battery.

The above-described frame busy test performed by trunk hunting and switch control 907 is further described in the patent to Busch. However, in this illustrative embodiment of the invention, network detector and control 901 (23), through the operation of relay BCA (23) for four-wire calls and relay BC (23) for two-wire calls, directs trunk hunting and switch control 907 to test only trunk link frames within the network, two-wire 101 or four-wire 108, in which the call is to be switched.

The results of the frame busy test and idle trunk test are combined in the selection and seizure of a suitable trunk. It is assumed that four-wire voice grade intertoll trunk 605 is idle and that four-wire trunk link frame and connector 00 is idle, therefore, relay FTC00 (19) has been operated and relay FB00 (23) has remained nonoperated. A circuit is now completed for the operation of frame selection relay FS00 (18), which may be partially traced from battery through the winding of relay FS00 (18), through a break contact of relay FB00 (23), through a make contact of relay FTC00 (19) and through frame memory control circuit 1801 to ground. Frame memory control circuit 1801 comprises a sequence circuit whose function is to insure that all trunk link frames are used equally by marker 201. The operation of fame memory control circuit 1801 is fully described in the Busch patent.

An FS-- relay (18) is provided in marker 201 for each four-wire trunk link frame in switching center 1. The same FS-- relays (18) are used in the selection of a two-wire trunk link frame for two-wire calls under the direction of network detector and control 901.

Relay FS00 (18), in operating, completes a circuit for the operation of relay MP0 (23) in four-wire trunk link frame and connector 00 (23). This circuit may be partially traced from ground, in four-wire trunk link frame and connector 00 (23), through the winding of relay MP0 (23), over lead 2309, through a make contact of relay 4W (17) and through a make contact of relay FS00 (18) to battery. Marker preference relay MP0 (23) in four-wire trunk link frame and connector 00 (23) is associated exclusively with marker 201 and forms a part of a connector preference circuit which is fully described in the Busch patent. Relay MP0 (23) of four-wire trunk link frame and connector 00 (23), in operating, completes a circuit for the operation of marker connector relay MC0 (23) extending from ground, through a make contact of relay MP0 (23) and through the winding of relay MC0 (23) to battery. The operation of relay MC0 (23) in four-wire trunk link frame and connector 00 (23) extends ground over lead 2307 and through a make contact of relay MC0 (23) indicating thereby that four-wire trunk link frame and connector 00 (23) is currently connected to marker 201 and is not available for connection to any other markers of switching center 1.

Relay MC0 (23) in four-wire trunk link frame and connector 00 (23) is associated exclusively with marker 201. Similar marker connector relays, designated MC0, which are also exclusively associated with marker 201 are provided in each trunk link frame and connector circuit in switching center 1. Each trunk link frame and connector further contains other marker connector relays each of which are individually associated with the other markers of switching center 1. The inter-relationship and operation of these relays and connectors are fully described in the patent to Busch.

The operation of relay MC0 (23) in four-wire trunk link frame and connector 00 (23) initiates the establishment of a connection, as described in the Busch patent, between four-wire trunk link frame 00 (6) and marker 201 which, as previously described, extends from four-wire trunk link frame and connector 00 (6) over cables 933, 939, and 911 to trunk hunting and switch control 907.

The previously described operation of route relay R2 (21) provides the information required by trunk hunting and switch control 907 for locating a four-wire voice grade intertoll trunk, such as 605, on four-wire trunk link frame 00, after the connection between marker 201 and four-wire trunk link frame 00 (6) has been established. A circuit is completed for the operation of trunk block relay TB0 (18), which may be partially traced from ground, through a make contact of relay R2 (21) and through the winding of relay TB0 (18) to battery. Another circuit is completed for the operation of trunk group relay TG1 (18), which may be partially traced from ground, through a make contact of relay R2 (21) and through the winding of relay TG1 (18) to battery. The operation of relays TB0 (18) and TG1 (18) provide trunk hunting and switch control 907 with an indication of the location of four-wire voice grade intertoll trunks extending to switching center 3, such as 605, on four-wire trunk link frames, such as 00 (6). The operation of trunk hunting and switch control 907 in selecting and establishing a connection to an individual trunk on a selected trunk link frame is fully described in the patent to Busch and is not detailed herein.

The above-described operation of route relay R2 (21) also provides an indication as to the type of sender suitable for use with the selected type of trunk. Route relay R2 (21), in operating, completes a circuit for the operation of relay OSG0 (22) in sender control 920 (22), which may be traced from ground, through a break contact of relay GS1, (22), a make contact of relay R2 (21) and through the winding of relay OSG0 (22) to battery. Relay OSG0 (22), in operating, identifies the outsender group which is to be used for calls originating from the four-wire network 108.

The selection and connection to a suitable four-wire sender is similar to the description given in the Busch patent of the selection of a sender within a particular outsender group by a marker, and, therefore, the operations involved will not be detailed herein. Upon the operation of relay OSG0 (22) a suitable four-wire sender, such as 806, is selected by sender control 920; and a connection is established from sender control 920 to the selected four-wire sender 806, which extends through cable 977, through four-wire sender connector 807 and through cable 808.

After selecting and connecting to four-wire sender 806, marker 201 controls the establishment of a connection from the selected four-wire voice grade intertoll trunk 605 to the selected four-wire sender 806. The circuit operations entailed in the establishment of this connection are fully described in the Busch patent and are not detailed herein. The connection extends from four-wire voice grade intertoll trunk 605, through cable 606, through a crosspoint of four-wire sender link 809 and through cable 810 to four-wire sender 806.

Portions of the call information provided by translator 906 which are required by four-wire sender 806 in completing the originating portion of this four-wire interoffice call are forwarded from marker 201 to four-wire sender 806 over a path extending from sender control 920, through cable 977, through four-wire sender connector 807 and through cable 808 to four-wire sender 806. This information is stored in four-wire sender 806 for transmission to switching center 3 and for use by the call data recording equipment 206 which will be later described herein. The circuit operations entailed in the marker 201, the four-wire sender connector 807 and four-wire sender 806 in transferring this information from marker 201 to four-wire sender 806 are similar to those described in the patent to Busch and are not detailed herein.

Other items of call information, such as the directory number of called four-wire station 401, are forwarded to four-wire sender 806 over a path extending from call information register 902 through cable 946, through cable 948, through four-wire sender connector 807 and through cable 808 to four-wire sender 806.

An indication of the type of treatment to be accorded the call at the terminating switching center and at any tandem switching centers through which the call may be switched is forwarded from translator 906 to sender control 920 through cable 944 and thence to four-wire sender 806 via cables 977 and 808 and sender connector 807. The type of treatment indication is in the form of a new control digit as ascertained from the type of treatment relay which operated as a result of the translation performed by call treatment translator 2201. The new control digit may or may not be identical to that dialed by the customer at calling four-wire station 109.

A table is provided below to identify one example of the assignment of control digits to various types of call treatment.

*Table No. 3*

| Relay | Control digit | Treatment |
|---|---|---|
| N (22) | 1 | Normal. |
| P (22) | 2 | Priority treatment. |
| PSO (22) | 3 | Priority treatment and spillover authorized. |
| SG (22) | 4 | Special grade of transmission. |
| PSG (22) | 5 | Priority and special grade of transmission. |
| SO | 6 | Spillover authorized. |
| COV | 7 | Crossover call. |

The above types of call treatment will be further described hereinbelow.

The above-described operation of relay N (22) completed circuits for extending ground over two of the five leads 3700–3707 through make contacts of relay TGS1 (37) and make contacts of relay N (22). These leads extend through cable 944, thorugh cable 977, through four-wire sender connector 807, through cable 808, over leads 3700 and 3701 to control digit register 819 in four-wire sender 806. The operation of relay TGS1 (37) is described in the Busch disclosure.

Control digit register 819 (31) is similar in circuitry and operation to the other information registers in four-wire sender 806 such as that used to receive and register a digit of the called office code. These registers are described in the Busch disclosure and are not described in detail herein.

As described in the Busch patent, ground placed on two of the five input leads to one of the above-mentioned registers causes the registration of an associated digit therein. The ground signals on leads 3700 and 3701 cause the digit 1 to be registered in control digit register 819 (31) of four-wire sender 806.

During the time that trunk hunting and switch control 907 has been selecting and connecting to four-wire voice grade intertoll trunk 605, the marker 201 has been connecting to four-wire line link frame 19 (6) on which four-wire station 109 appears. The equipment location of calling station 109 was forwarded, as previously described, from four-wire originating register 803 to call information register 902. It is stored in calling station equipment location register 2801 through the operation of relays FT1 (28), FU2 (28) and FU7 (28) which identify the number of four-wire line link frame 19 (6), and other relays identifying the vertical group, horizontal group, and vertical file in which calling four-wire station 109 is located. The operation of these relays is fully described in the Busch patent.

The previously described operation of relay OSG0 (22) completed a circuit for the operation of relay SON (22) in sender control 920 (22), which may be traced from battery, through the winding of relay SON (22) and through a make contact of relay OSG0 (22) to ground. Relay SON (22), in operating, completes a circuit for the operation of relay SOG (22), in class of call and linkage control 927, which may be traced from battery, through the winding of relay SOG (22), through a make contact of relay OR (17) and through a make contact of relay SON (22) to ground. Relay SOG (22), in operating, completes an obvious circuit for the operation of relay CB (22) in class of call and linkage control 927 (22).

The previously described operations of relays 4W (17) in network detector and control 901 (17), FT1 (28) in calling station equipment location register 2801 and CB (22) in class of call and linkage control 927 (22), complete a circuit for the operation of relay FTS1 (13), which may be partially traced from battery, through the winding of relay FTS1 (13), through a make contact of relay 4W (17), through a make contact of relay FT1 (28) and through a make contact of relay CB (22) to ground.

Relay FTS1 (13), in operating indicates that the calling station appears on a four-wire line link frame whose numerical designation contains the digit 1 as a tens digit. Had relay 2W (17) of network detector and control 901 (13) been operated instead of relay 4W (17) a circuit would have been completed for the operation of relay FTT1 (13), extending from battery through the winding of relay FTT1 (13), through a make contact of relay 2W (17), through a make contact of relay FT1 (28) and through a make contact of relay CB (22) to ground. Relay FTT1 (13) if operated, would have indicated that the calling station appeared on a two-wire line link frame whose numerical designation contained the digit 1 as a tens digit. Network detector and control 901 is used in this manner to direct line switch control 916 (13) in connecting marker 201 to line link frames in the proper network, two-wire 101 or four-wire 108.

The units digit, 9, of the numerical designation of the line link frame on which a calling station appears is forwarded directly from calling station equipment location register 2801 to line switch control 916 (13), since the differentiation between two-wire and four-wire line link frames is made only through the tens digit indication. A circuit is completed upon the operation of relay CB (22) for the operation of relay FUT9 (13) in line switch control 916. This circuit may be partially traced from battery, through the winding of relay FUT9 (13), through a make contact of relay FU7 (28), through a make contact of relay FU2 (28) and through a make contact of relay CB (22) to ground. The operation of relay FUT9 (13) and the operation of relay FTS1 (13) provide the information required by line switch control 916 (13) in connecting marker 201 to four-wire line link frame and connector 19 (13).

The line link frame and connectors of switching center 1 are each provided with marker preference relays, such as MP0 (13), in four-wire line link frame and connector 19 (13). These relays operate in a manner similar to the previously described marker preference relays included in each trunk link frame and connector, such as MP0 (23) in four-wire trunk link frame and connector 00 (23). Relay MP0 (13) in four-wire line link frame and connector 19 (13) is now operated over a circuit which may be partially traced from ground, through its winding, over lead 1301, through a make contact of relay FTS1 (13) and through a make contact of relay FUT9 (13) to battery. The circuit operations which follow the operation of a marker preference relay, such as MP0 (13) in a selected line link frame and connector, such as four-wire line link frame and connector 19, for connecting a marker, such as 201, to the selected line link frame and connector are described in the patent to Busch, and will not be detailed herein.

Marker 201 now controls four-wire network 108 in establishing a connection from appearance 602 of four-wire calling station 109 on four-wire line link frame 19 (6) to appearance 615 of four-wire voice grade intertoll trunk 605 on four-wire trunk link frame and connector 00 (6), through link 604. The circuit operations for establishing a channel from the appearance of a calling station on a line link frame to the appearance of a trunk on a trunk link frame are fully described in the Busch patent and will not be detailed herein.

The remaining circuit operations required to complete this originating portion of a four-wire interoffice call are described in the Busch patent. Briefly, after marker 201 has checked that the selected connecting path over link 604 has been satisfactorily established, it transmits an advance indication to four-wire sender 806. A test is then made of the conductors of four-wire voice grade intertoll trunk 604 which extend to switching center 3. Marker 201 is then released and sender 806 awaits a register ready signal from switching center 3 before transmitting the control digit and the directory number of called line 401 through four-wire voice grade intertoll trunk 605 to switching center 3. This transmission occurs over the previously described path extending from four-wire sender 806, through cable 810, through a crosspoint of four-wire sender link 809, through cable 806 and over four-wire voice grade intertoll trunk 605. After completing this transmission, four-wire sender 806 is released and control of the call is assumed by four-wire voice grade intertoll trunk 605.

FOUR-WIRE INTEROFFICE CALL ORIGINATING PORTION: PRIORITY—SPECIAL GRADE

A four-wire station may, as previously indicated represent a high speed data terminal, a normal voice communication station, or both. A separate and distinct class of service is assigned to each of the foregoing types of stations. A four-wire station assignment may be of such a nature that the majority of calls originated from the station are urgent and, therefore, require priority handling. This type of station is assigned a separate and distinct class of service. Other station assignments may be of such a nature that they are not entitled to originate urgent calls requiring priority treatment. These stations are assigned another class of service. Still other stations may be of the type which are entitled to originate priority calls when desired by the calling customer. Still another class of service is assigned to this type of station.

As indicated in the description of a nonpriority voice grade four-wire interoffice call, ten classes of service are available for assignment to various types of stations, and ten control digit indications are available to a customer for signalling the switching center as to the grade of trunk and the type of priority he desires for his call. Approximately one hundred combinations of class of service indication and control digit indication are therefore available in determining the proper type of treatment to be accorded a particular call.

It is assumed for this example that a customer at four-wire station 109 is originating an urgent call directed to four-wire station 401. This call requires a special grade of trunk facility. It is further assumed that four-wire station 109 is assigned a class of service which indicates that four-wire station 109 can originate calls requiring a special grade of trunk and that the priority to be accorded these calls is determined at the discretion of the calling customer through a control digit indication which is dialed preceding the directory number of the called station.

The customer at four-wire station 109 dials a control digit indicative of his intention to make an urgent call requiring a special grade of trunk. The control digit is followed by the directory number of called four-wire station 401. As previously described, the control digit, the directory number of called four-wire station 401, the class of service of calling four-wire station 109, the equipment location of calling four-wire station 109 and an originating call indication are passed from four-wire originating register 803 to call information register 902 of marker 201 and stored therein. A four-wire network indication is forwarded, as previously described, from four-wire originating register 803 to the network detector and control 901 of marker 201 and stored therein.

The class of service of four-wire calling station 109, the dialed control digit and the dialed office code portion of the directory number of called four-wire station 401, are forwarded, as previously described, from call information register 902 over cable 924 to translator 906. The control digit indication and the class of service indication are again compared in translator 906 to determine whether or not calling station 109 can originate a priority call requiring a special grade of trunk. The result of this comparison and the result of a translation of the office code are combined and further translated to obtain the information required by trunk hunting and switch control 907 in selecting and connecting to a suitable four-wire special grade intertoll trunk such as 609.

In a manner similar to that described for the nonpriority voice grade call, trunk hunting and switch control 907 selects and connects to a four-wire special grade intertoll trunk such as 609. The translation performed by translator 906 further provide the information required by sender control 920 in selecting and connecting to a four-wire sender suitable for use with a four-wire special grade intertoll trunk.

In a manner similar to that described for the nonpriority voice grade call, marker 201 selects a four-wire sender, such as 806, and controls the establishment of a connection from four-wire sender 806 to four-wire special grade intertoll trunk 609. This connection extends from four-wire sender 806 through cable 810, through a crosspoint of four-wire sender link 809 and through cable 618 to four-wire special grade intertoll trunk 609.

A connection is established, under the control of line switch control 916, from marker 201 to four-wire line link frame and connector 19 in a manner similar to that described for the nonpriority voice grade call.

A connection is then established, under the control of marker 201, from appearance 602 of four-wire station 109 on four-wire line link frame 19 (6) to appearance 616 of four-wire special grade intertoll trunk 609 on four-wire trunk link frame 01 (6) through link 617 in a manner similar to that previously described for the establishment of a connection from four-wire station 109 to four-wire voice grade intertoll trunk 605.

The succeeding operations of four-wire sender 806, marker 201, and four-wire special grade trunk 609 are similar to those previously described for the originating portion of the nonpriority voice grade interoffice call.

Referring now to the more detailed portion of the drawing, upon the establishment of the connection between four-wire originating register 803 and marker 201, circuits are completed, as previously described, for the transfer of call information from four-wire originating register 803 to marker 201. Relay 4W (17) in network detector and control 901 and relay OR (17) in call information register 902 are operated as previously described. The control digit, dialed by the customer from calling four-wire station 109, is received and stored in control digit register 922 (17); the office code and numericals of the directory number of called four-wire station 401 are received and stored in office code register 2101 and called station numericals register 2104, respectively; the class of service indication of calling four-wire station 109 is received and stored in four-wire class of service register 2102; and the equipment location of calling four-wire station 109 is received and stored in calling station equipment location register 2801. The preceding information is forwarded from four-wire originating register 803 to call information register 902 in a manner similar to that described for the four-wire nonpriority voice grade call.

The dialed control digit and the class of service indication of calling four-wire station 109 are then passed from call information register 902 to translator 906. The control digit is forwarded from control digit register 922 (17) through cable 1705 to call treatment translator 2201. The class of service indication is forwarded from four-wire class of service register 2102 through cable 2107 to call treatment translator 2201. The two-out-of-five input signal from control digit register 922 (17) and a one-out-of-ten input signal from four-wire class of service register 2102 are translated as previously described into one-out-of-one hundred output signals.

In the above described nonpriority voice grade call, relay N (22) was operated as a result of the translations performed by call treatment translator 2201. Since a different control digit was dialed by the calling customer at four-wire station 109, the output signal from call treatment translator 2201 will appear on a different lead, such as 2209, which is cross-connected to the winding of priority special grade call treatment relay PSG (22). A circuit is then completed for the operation of relay PSG (22) extending from battery through its winding, over cross-connection 2209 and through call treatment translator 2201 to ground.

The operation of relay PSG (22) completes circuits for the operation of screening relays which will be used by translator 906 in ascertaining the type of trunk required for the call in progress. These circuits may be traced from battery, through the windings of relays S2 (22), S3 (22), S8 (22), and S5 (22) and through make contacts of relay PSG (22), respectively, to ground, thus operating these screening relays.

The office code is forwarded from office code register 2101 through cables 2120 and 2108 to four-wire office code translator 2106. It may be noted that the called office code is also forwarded to two-wire office code translator 1703 through cables 2120 and 2109. However, the previously described operation of relay 4W (17) in network detector and control 901 enables the ground supply for output signals from four-wire office code translator 2106 and does not enable the ground supply for output signals from two-wire office code translator 1703.

Four-wire office code translator 2106 translates the three two-out-of-five digit indications of the called office code into a one one-out-of-one thousand output, as previously described. In a manner similar to that described for the nonpriority voice grade call, ground is applied through a make contact of relay 4W (17), over lead 1706, through four-wire office code translator 2106 to lead 2109.

In the above-described nonpriority voice grade call, screening relay S1 (22) was operated, thereby completing a path for the operation of route relay R2 (21) which is associated with voice grade calls directed to switching center 3. For this special grade call, screening relay S2 (22) was operated, thereby completing a circuit for the operation of route relay R4 (21) and route series relay MBS (17). This circuit may be traced from battery, through the winding of relay MBS (17), through the winding of route relay R4 (21), through a make contact of relay S2 (22), over leads 2111 and 2119, through four-wire office code translator 2106, over lead 1706 and through a make contact of relay 4W (17) to ground.

Route relay R4 (21) is associated with special grade calls directed to switching center 3, and provides information pertaining to such special grade calls similar to the information provided by route relay R2 for voice grade calls directed to switching center 3. Relay R4 (22), in operating, completes circuits for the operation of trunk hunting control relays FC4 (18), TB0 (18) and TG18 (18) which may be partially traced from ground, through make contacts of relay R4 (21) to battery.

Relay FC4 (18) in operating, extends test leads, such as 2309 and 2310, from trunk hunting and switch control 907 (23) to those four-wire trunk link frames on which four-wire special grade intertoll trunks extending to switching center 3 appear. As previously described, those four-wire trunk link frames on which available four-wire special grade intertoll trunks appear, will return a signal indicating the availability of a suitable trunk on that frame. The signal indicating an available trunk of the selected type which is returned by the four-wire trunk link frame on which the trunk appears, operates on FTC-- relay (19) which is associated with the particular four-wire trunk link frame returning the signal. If no four-wire special grade intertoll trunks to switching center 3 are available, no FTC-- relay (19) will be operated.

All trunk busy timing circuit 1802 is provided to detect when no trunks to a called destination are available. All trunk busy timing circuit 1802 is enabled by the operation of an FC- relay (18) associated with a route relay such as R4 (21). The operation of any FTC-- relay (19) disables all trunk busy timing circuit 1802. However, if no FTC-- relay (19) operates, a signal is forwarded from all trunk busy timing circuit 1802 over lead 1803 to route advance control 918 (22). The function of this signal and the circuit operations following such a signal will be later described in greater detail hereinbelow. It is assumed at this time that four-wire special grade intertoll trunk 609 appearing on four-wire trunk link frame O1 (23) is idle. Therefore, an all trunk busy signal will not be sent from all trunk busy timing circuit 1802 to route advance control 918 (22).

In a manner similar to that previously described for the nonpriority voice grade call, a trunk available signal is passed through four-wire trunk link frame O1 (23) from ground in four-wire special grade trunk 609 (24), over lead 2310, through cable 2306, over lead 2310, through a make contact of relay FC4 (18) and through the winding of relay FTC 01 (19) to battery, thereby operating relay FTC 01 (19).

In a manner similar to that previously described for the nonpriority voice grade call, relay BCA (23) was operated as a result of the operation of relay 4W (17) in network detector and control 901 (23). The operation of relay BCA (23) extends frame busy test leads, such as 2307 and 2308, to all four-wire trunk link frame and connectors in switching center 1. As previously described, the failure of an FB-- relay (23) to operate indicates that the associated four-wire trunk link frame and connector is not currently in use by another marker in switching center 1. Therefore, relay FB01 (23), which is associated with four-wire trunk link frame and connector 01 (23), does not operate. An operated FTC 01 relay (19) and a nonoperated relay FB01 (19) provide the information required for the selection of four-wire trunk link frame 01 (23) as previously described.

The remainder of the circuit operations required for the completion of this four-wire priority special grade interoffice call are analogous to those previously described for the four-wire non-priority voice grade interoffice call. These operations include the selection and connection to four-wire special grade intertoll trunk 609 by trunk hunting and switch control 907; the connection to four-wire line link frame 19 (13) by line switch control 916; the selection of an appropriate four-wire sender such as 806; the connection of the selected four-wire sender 806 to four-wire special grade intertoll trunk 609; the establishment of a connection between four-wire station 109 and four-wire special grade intertoll trunk 609; the transmission of an advance signal from marker 201 to four-wire sender 806; the transmission of the control digit and the directory number of called line 401 by four-wire sender 806 to switching center 3 and the assumption of control of this call by four-wire special grade intertoll trunk 609.

Priority Camp-on

In the above-described four-wire priority special grade interoffice call it was assumed that an idle trunk was available within the trunk group extending to switching center 3. This trunk group was selected by the translations performed in translator 906. It will now be assumed that no trunks in the trunk group selected by translator 906 are available for use by the call in progress.

As described above, several alternate groups of trunks can be used to connect switching centers 1 and 3. One trunk group may directly interconnect switching centers 1 and 3; one trunk group may connect switching centers 1 and 2, where a tandem connection will be necessary to pass the call to switching center 3; and one trunk group may connect switching center 1 with a further switching center, not shown, where further tandem connections may be required to connect switching center 1 with switching center 3. These alternate trunk groups are sequentially examined by trunk hunting and switch control 907 as it attempts to select an idle four-wire special grade intertoll trunk which may be used to reach the desired call destination, switching center 3.

This sequential examination is controlled by route advance control 918, whose operation is described in the patent to Busch. Briefly, if trunk hunting and switch control 907 fails to locate a suitable idle trunk in the trunk group which directly connects switching centers 1 and 3, a signal is forwarded from trunk hunting and switch control 907 over cable 929 to route advance control 918. Route advance control 918 then signals translator 906 through cable 930 that a second trunk group must be examined. Translator 906 then "route advances" to provide the information required by trunk hunting and switch control 907 in selecting a four-wire special grade intertoll trunk within the alternate trunk group, which connects switching center 1 with switching center 2.

The alternate trunk group is then examined by trunk hunting and switch control 907 to select an idle four-wire special grade intertool trunk extending to switching center 2 and appearing on a four-wire trunk link frame which is not currently in use by another marker. This selection is made in a manner similar to that previously described in the selection of a trunk within the direct trunk group directly connecting switching centers 1 and 3. If trunk hunting and switch control 907 fails to locate a trunk within the alternate trunk group it again signals route advance control 918. Route advance control 918 signals translator 906 which route advances and, unless a further alternate trunk group is provided to reach the desired call destination, signals camp-on control 204 through cable 931.

Camp-on control 204 recognizes this signal from translator 906 as an indication that a priority call has encountered an all trunks busy condition within those trunk groups of switching center 1 which may be used to complete a call.

As described above, a plurality of trunk groups may be used to complete calls to a particular called destination. This plurality of trunk groups is known as a trunk combination and normally comprises a direct trunk group and one or more alternate trunk groups. The trunk group serving as a direct trunk group in the trunk combination for calls directed to switching center 2 may also serve as an alternate trunk group in the trunk combination for calls directed to switching center 3. This is exemplified by four-wire interoffice trunks 112 and 113, which directly connect switching centers 1 and 2, and which may also be used as a segment of a tandem connection between switching centers 1 and 3.

Included in the information ascertained by translator 906 is the trunk combination associated with the direct trunk group provided for the completion of a call in progress. Since there is only one direct trunk group provided for special grade calls directed to a particular switching center, such as switching center 3, the trunk combination for such calls is directly associated with the direct trunk group.

Translator 906 upon receiving the route advance signal from route advance control 918, as a result of all trunks within a trunk combination being busy, has signaled camp-on control 204 that a call entitled to camp-on has encountered on all trunks busy condition. Translator 906 further passes to camp-on control 204 signal indicating the trunk combination which may be used to complete the priority call in progress. Camp-on control 204 then establishes a connection from camp-on control 204 to register priority link 613.

Register priority link circuit 613 comprises a plurality of crossbar switches which have vertical appearances for each four-wire originating register and each four-wire incoming register and horizontal appearances for trunk group busy leads such as 620, each of which is multiplied to all trunks within that particular trunk group. Register priority link circuit 613 further comprises circuitry for controlling the crossbar switches in establishing connections from a four-wire originating or incoming register through a crosspoint on a crossbar switch to the group busy leads of those trunk groups which are included in the trunk combination associated with the call.

Each incoming and originating register of four-wire network 108 is provided with a monitor circuit such as 822. Camp-on control 204 now controls the establishment of a monitoring connection. For the present call, monitor circuit 822 of four-wire originating register 803 will be connected through cable 823 and through a crosspoint 622 of register priority link circuit 613 to a trunk group busy lead such as 620. After this connection is established, marker 201 is released and the control of the priority call is transferred to originating register 803.

When a trunk within the trunk group being monitored becomes idle, a trunk available signal is passed, through the above-described monitoring connection, to the monitor circuit 822 of four-wire originating register 803. Upon receipt of this signal, four-wire originating register 803 initiates the establishment of a connection to marker 201. Marker 201 then attempts, as previously described, to locate and connect to an idle four-wire special grade intertool trunk. If trunk hunting and switch control 907 is successful in selecting a suitable trunk, the priority call is processed as previously described. However, if the idle trunk has been seized by another marker within switching center 1 and all trunks are again found busy, marker 201 disconnects, and four-wire originating register 803 remains in the monitoring condition. This condition, in which a register awaits the availability of a trunk to complete the call whose information is stored in the register, is known as camp-on.

Each originating and incoming register such as 803 includes a timing circuit, which causes the periodic reestablishment of a connection between four-wire originating register 803 and marker 201, if an idle trunk is not detected by monitor circuit 822 within a prescribed period of time. This prevents a register from being locked in a camp-on condition permanently.

The previously described signal from all trunk busy timing circuit 1802 to route advance control 918 (22) causes the operation of relay RAV1 (22) over a path extending from ground through all trunk busy timing circuit 1802 over lead 1803, through the winding of relay RAV1 (22) to battery. The operation of all trunk busy timing circuit 1802 is fully described in the patent to Busch and will not be detailed herein.

The operation of route advance control 918 (22) is described in the Busch patent. Briefly, the first signal from all trunk busy timing circuit 1802 to route advance control 918 (22) causes the operation of ground supply relay GS1 (22), thereby completing a circuit for the operation of route relay R5 (21) which may be partially traced from ground, through a make contact of relay GS1 (22), over lead 2210, through a make contact of relay R4 (21), through the winding of route relay R5 (21) and, through the winding of relay MBS (17) to battery. The operation of route relay R5 (21) supplies the information required by trunk hunting and switch control 907 is selecting a four-wire special grade intertool trunk which is included in the alternate trunk group which connects switching centers 1 and 2.

Route relay R5 (21) completes circuits for the operation of trunk hunting and control relays FC5 (18), TB0 (18), and TG19 (18) which may be traced from battery, through their respective windings and through make contacts of relay R5 (21) to ground. The operation of relay FC5 (18) extends test leads to those trunk link frames on which trunks in the alternate trunk group appear, as previously described for the direct trunk group. As before, all trunk busy timing circuit 1802 will signal route advance control 918 if trunk hunting and switch control 907 fails to locate an idle trunk in the alternate trunk group.

As described in the Busch patent a second operation of relay RAV1 (22) in route advance control 918 will result in the operation of a second ground supply relay such as GS2 (22).

The previously described operation of relay PSG (22) completed a circuit for the operation of relay CPN (14), in camp-on control 204, which may be traced from ground, through a make contact of relay PSG (22), over lead 2212 and through the winding of relay CPN (14) to battery. The operation of relay GS2 (22) and the operation of relay CPN (14) complete a circuit for the operation of priority link seizure relay PLS (14), which may be partially traced from ground, through a make contact of relay GS2 (22), over lead 2211, through a make contact of relay R5 (21), through a make contact of relay S3 (21) over lead 2110, through a make contact of relay CPN (14), through a break contact of relay COC (14), through a break contact of relay CE (14), and through the winding of relay PLS (14) to battery.

The operation of relay PLS (14) in camp-on control 204 initiates a signal to register priority line 613 (14) indicating that a monitoring connection is to be established. Relay MP0 (14), of the preference control 1401 in register priority link circuit 613 (14), is operated over a circuit which may be partially traced from ground, through the winding of relay MP0 (14), over lead 1403, through cable 932, over lead 1403, through a make contact of relay PLS (14) and a make contact of relay CPN (14) to battery. Relay MP0 (14) of preference control 1401 is one of a group of marker preference relays each of which is associated with a particular marker, such as 201. This type of preference control is fully described in the patent to Busch and is similar in operation to that described hereinabove for the establishment of connections from marker 201 to a four-wire trunk link frame and connector and to a four-wire line link frame and connector.

The operation of relay MP0 (14) completes an obvious circuit for the operation of marker connector relay MC0 (14). The operation of relay MC0 (14) completes a path for the operation of relay CS (14) in camp-on control 204, which extends from ground, through a make contact of relay MC0 (14) over lead 1404, through cable 932, over lead 1404 and through the winding of relay CS (14) to battery. Relay MC0 (14), in operating, also establishes a circuit for the operation of relay OR (14), which may be traced from ground, through a make contact of relay MC0 (14) over lead 1405, through cable 932, over lead 1405 through a make contact of relay PLS (14), through cable 959, over lead 1405, through cable 960 over lead 1104, through a make contact of relay MC0 (11) in originating register marker connector 125 (11), through a make contact of relay RC1 (11), through cable 1119, through cable 962, over lead 1104, through cable 716, over lead 1413 and through the winding of relay OR (14) to battery. Relay OR (14), in operating, provides an indication that the priority call for which a monitoring connection is to be established is an originating call whose call information is stored in an originating register, such as 803.

In this illustrative embodiment of the present invention, the register priority link circuit includes one crossbar switch for each twenty trunk combinations and ten registers, originating or incoming. One register is associated with each vertical on a switch, and two trunk combinations are associated with each horizontal level. When camp-on is required, a six-wire crosspoint such as 622 (15) is closed, connecting three leads from the monitor circuit, such as 822, of a register, such as 803 (12), to each of the two trunk combinations represented by that horizontal level. Relays EV (12) or OD (12) in the monitor circuit 822 (12) determine which set of three leads is used. These three leads monitor the direct and the first and second alternate trunk groups of the trunk combination. Group busy leads for two overflow trunk groups are multipled to all registers and cut in as required.

Trunk combinations numbered 00–19 appear on the first crossbar switch 1501 with numbers 00 and 10 on level 0 and progressing upward to numbers 09 and 19 on level 9. Similarly, trunk combinations 20–39 appear on the second switch, et cetera. The odd or even nature of the trunk combination is determined by the tens digit of the trunk combination numbers.

The previously described operation of relay MC0 (14) further establishes circuits for the operation of trunk combination identification relays such as TC00 (14) through TC19 (14). The indications given by translator 906 to provide the information required by trunk hunting and switch control 907 in selecting a trunk within the direct trunk group resulted from the operation of route relay R4 (21). Route relay R4 (21) is therefore used to provide the trunk combination for special grade calls directed to switching center 3 from switching center 1. A circuit is completed for the operation of trunk combination relay TC05 (14), which extends from ground, through a make contact of relay PLS (14), through a make contact of relay R4 (21), over cross-connection 1415, over lead 1416, through cable 932, over lead 1416, through a make contact of relay MC0 (14) and through the winding of relay TC05 (14).

The operation of relay TC05 (14) in register priority link circuit 613 completes circuits for the registration of trunk combination information in four-wire originating register 803 (12). A circuit may be traced from battery, through the winding of relay EV (12) over lead 1201, through cable 1202, over lead 1201, over lead 1113, through a make contact of relay RC1 (11), through a make contact of relay MC0 (11), over lead 1114, through cable 1111, through cable 962, through cable 1414, through cable 716, over lead 1115, and through a make contact of relay TC05 (14) to ground, thereby operating relay EV (12). In the event that another trunk combination, such as 10, were associated with the call in progress, relay TC10 (14) would be operated and circuits would be completed over paths similar to that previously traced for the operation of relays OF0 (12) and OD (12).

The operation of the trunk combination information relays EV (12), OD (12), OF0 (12), and OF1 (12) indicates respectively an even trunk combination number, an odd trunk combination number, a first overflow trunk group and a second overflow trunk group. The operation of relay EV (12) or OD (12) in four-wire originating register 803 (12) serves to differentiate between even and odd numbered trunk combinations, and determines which three of the six leads extended through register priority link 613 (15) are to be monitored by monitor circuit 922.

When relay CS (14) was operated, as previously described, in the camp-on control 204 of marker 201, ground was extended through a make contact of relay PLS (14), through a make contact of relay CS (14) over lead 1430, through cable 959, over lead 1417, through cable 960, over lead 1105, through a make contact of relay MC0 (11), make contact of relay RC1 (11), through cable 1119, through cable 962, through cable 1414, through cable 716, over lead 1419 and through the winding of relay PG0 (11) to battery, thus operating relay PG0 (11). The operation of relay PG0 (11) serves to identify the register priority group which contains the register being used in this call. A register priority group is made up of all the registers that appear on the same crossbar switch such as 1501.

The operation of relay PG0 (11) and relay TC05 (14) completes a circuit for the operation of the select magnet SM5 (15) that is associated with the required trunk combination 05 and register 803. This circuit may be traced from battery, through the winding of select magnet SM5 (15), through a make contact of relay PG0 (14) and through a make contact of relay TC05 (14) to ground.

When relay TC05 (14) was operated, as previously described, it completed an obvious circuit for the operation of trunk combination group relay CG0 (14), which extends from ground, through a make contact of relay TC05 (14) and through the winding of relay CG0 (14) to battery. A trunk combination group comprises a maximum of twenty trunk combinations all of which appear on the same crossbar switch. The previously described operation of select magnet SM5 (15) completed a circuit for the operation of relay TS (14), which extends from ground, through make contact of relay SM5 (15), through a break contact of relay PR (11) and through the winding of relay TS (14) to battery, thus operating relay TS (14).

The operation of trunk combination group relay CG0 (14) completes a circuit for the operation of the hold magnet HM1 (15) associated with originating register 803 and trunk combination 05. This circuit may be traced from battery, through the winding of hold magnet HM1 (15), through a make contact of relay CG0 (14), over lead 1502, over lead 1203, through cable 716, through cable 1414, through cable 962, through cable 1119, over lead 1126, through a make contact of relay RC1 (11), through a make contact of relay MC0 (11), over lead 1106, through cable 1111, through cable 962, through cable 1414, through cable 716, over lead 1418, through a make contact of relay MC0 (14) of register priority link circuit 613 and through a make contact of relay TS (14) to ground.

Hold magnet HM1 (15), in operating, closes crosspoint 622 (15), thereby extending leads 1503, 1504, 1505, 1506, 1507 and 1508 through crosspoint 622 and over leads 1510, 1511, 1512, 1513, 1514, and 1515, respectively. The operation of hold magnet HM1 (15) also completes a circuit for the operation of relay CE (12) in four-wire originating register 803 (12), which extends from battery, through the winding of relay CE (12), over lead 1204, through cable 823, over lead 1204, over lead 1205, and through a make contact of hold magnet HM1 (15) to ground. Hold magnet HM1 (15) is then held operated over a circuit extending from battery through its winding, over lead 1208, through a make contact of hold magnet HM1 (15), over lead 1206, over lead 1204, through cable 823, over lead 1204, through a make contact of relay CE (12), through a break contact of relay MRL (12), over lead 1207 and through a make contact of relay ON1 (12) to ground. Relay CE (12) is held operated to the same ground over an obvious circuit.

Figure 16:
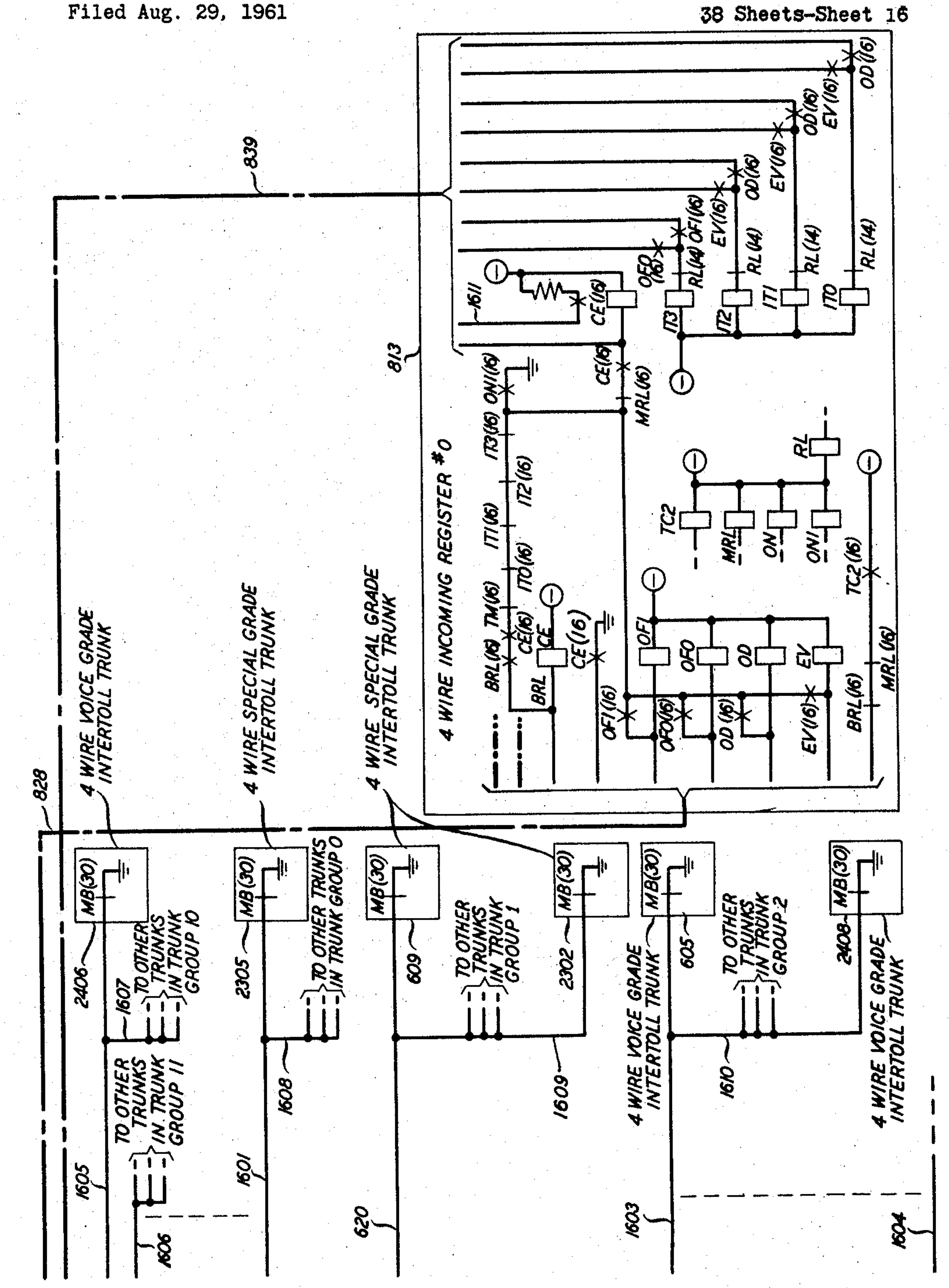

As previously described, trunk group busy leads, such as 620, are multipled to each trunk within the specific trunk group associated with a particular trunk group busy lead. As shown in FIG. 16, these group busy leads are multipled through a break contact of the MB (30) relay in each respective trunk to ground. The operation of the MB relays (30) in each trunk will be more fully described later herein. However, its operation is an indication that the trunk associated therewith is busy, and therefore not available for use for another call.

Monitor circuit 922 of four-wire originating register 803 (12) comprises a series of trunk group monitoring relays such as relays IT0 (12), IT1 (12), IT2 (12), and IT3 (12). Relays IT0 (12), IT1 (12), IT2 (12), are used to monitor trunk group busy leads extended through a crosspoint such as 622 (15) of a crossbar switch such as 1501 in register priority link 613. Relay IT3 (12) is used to monitor the trunk group busy leads of overflow trunk groups 10 or 11.

The previously described closure of crosspoint 622 completes the establishment of the monitoring connection for trunk group busy leads 620 and 1601, which represent those trunk groups within trunk combination 05. A monitoring connection for trunk group 1 may be traced from ground in four-wire special grade intertoll trunk 609 (16), over trunk group busy lead 620, over cross-connection 1516, over lead 1514, through crosspoint 622, over lead 1507, through cable 823, through a make contact of previously operated relay EV (12), through a break contact of relay RL (12) and through the winding of relay IT1 (12) to battery. A similar monitoring connection for trunk group 0 may be traced from ground in four-wire special intertoll trunk 2305 (16), over lead 1601, over cross-connection 1517, over lead 1513, through crosspoint 622, over lead 1506, through cable 823, over lead 1506, through a make contact of relay EV (12), through a break contact of relay RL (12) and through the winding of relay IT2 (12) to battery.

Assuming that all trunks are busy within trunk group 0 and trunk group 1 of trunk combination 05, the MB relays (30) in all of these trunks will be operated, thereby removing all ground supplies from the above-described monitoring connection. When a trunk within trunk group 0 or trunk group 1 becomes idle, the MB relay associated with the idle trunk is released. The release of relay MB (30) in a trunk, such as four-wire special grade intertoll trunk 609 (16), generates a signal from the trunk to monitor circuit 822 in four-wire originating register 803 (12). This signal extends from ground in four-wire special grade intertoll trunk 609, through a break contact of relay MB (30), over lead 620, over cross-connection 1516, over lead 1514, through crosspoint 622, over lead 1507, through cable 823, over lead 1507, through a make contact of relay EV (12), through a break contact of relay RL (12) and through the winding of relay IT1 (12) to battery, thereby operating relay IT1 (12). The function of relay IT1 (12) will be described later herein.

The above-described operation of relay CE (12) in four-wire originating register 803 completed a circuit for the operation of relay CE (14) in camp-on control 204 of marker 201. This circuit extends from battery, through the winding of relay CE (14), over lead 1420, through cable 959, over lead 1420, through cable 960, over lead 1102, through a make contact of relay MC0 (11), through a make contact of relay RC1 (11), over lead 1121, over lead 1122, through cable 1202, over lead 1122, over lead 1209 and through a make contact of relay CE (12) to ground. Relay CE (14), in operating completes a circuit for the operation of relay BRL (14) in camp-on control 204 of marker 201. This circuit extends from battery, through the winding of relay BRL (14), through a make contact of relay CE (14), through a break contact of relay COC (14), through a make contact of relay CPN (14), over lead 2110, through a make contact of relay S3 (22), through a make contact of relay R5 (21), over lead 2211 and through a make contact of relay GS2 (22) to ground in route advance control 918 (22).

Relay BRL (14), in operating, completes an obvious circuit for the operation of relays DIS1 (14) and DIS2 (14). The operation of relays DIS1 (14) and DIS2 (14) initiates the release of marker 201, as described in the patent to Busch, and further completes a circuit for the operation of relay BRL (12) in four-wire originating register 803 (12). This circuit extends from battery through the winding of relay BRL (12), over lead 1210, over lead 1211, through cable 1202, over lead 1211, over lead 1125, through a make contact of relay RC1 (11), through a make contact of relay MC0 (11), over lead 1103, through cable 960, over lead 1103, through cable 959, over lead 1103, through a make contact of relay BRL (14), through a make contact of relay DIS1 (14) and through a make contact of relay DIS2 (14) to ground. Relay BRL (12) of four-wire originating register 803, in operating, opens the previously described circuit for the operation of relay RS1 (11) in originating register marker connecter 125, thereby releasing the connection between four-wire originating register 803 and marker 201.

The above-described operation of relay CE (14) in camp-on control 204 also releases relay PLS (14) by removing ground from its previously described operating path through a break contact of relay CE (14). Relay PLS (14), in releasing, releases relay MP0 (14) of preference control 1401 in register priority link circuit 613, thereby releasing marker connector relay MC0 (14). The release of marker connector relay MC0 (14) in register priority link circuit 613, and the release of marker connector relay MC0 (11) in originating register marker connector 125, breaks the connection between marker 201 and register priority link 613, thereby releasing all relays therein.

The monitoring circuit 822 of four-wire originating register 803 is now connected through register priority link 613 to group busy leads 620 and 1601 from trunk groups 1 and 0, respectively. This connection remains established until four-wire originating register 803 is released as a result of completing the call to an idle trunk within trunk group 0 or trunk group 1.

TRUNK AVAILABLE

When a trunk within trunk groups 0 or 1 becomes available, a circuit completed for the operation of relay IT1 (12) or relay IT2 (12), as previously described. Relay BRL (12) in four-wire originating register 803 has been held operated over a circuit extending from battery through its winding, through a make contact of relay BRL (12), through a make contact of relay CE (12), through a break contact of relay TM, through a break contact of relay IT0 (12), through a break contact of relay IT1 (12), through a break contact of relay IT2 (12), through a break contact of relay IT3 (12) and through a make contact of relay ON1 (12) to ground. The operation of relay IT1 (12) releases relay BRL (12) thereby enabling the circuit over lead 1123, as previously described, to operate relay RS1 (11) in originating register marker connector 125 (11).

Relay RS1 (11), in operating, again initiates the establishment of the connection between four-wire originating register 803 and marker 201. Marker 201 again attempts to locate an idle trunk within trunk combination 05. If an idle trunk is located, this four-wire priority special grade interoffice call is completed as previously described. If, however, another marker has already utilized the four-wire special grade intertoll trunk 609 which signaled its availability to four-wire originating register 803, marker 201 is again released, and the monitoring connection is maintained until a further trunk in trunk groups 0 or 1 signals its availability to four-wire originating register 803.

The monitoring connection is not released during this attempt to locate a trunk within trunk combination 05. It is maintained until the call whose information is stored in four-wire originating register 803 has been completed to an available four-wire special grade intertoll trunk in trunk combination 05. The completion of this call will will cause the operation of relay MRL (12) in four-wire originating register 803, as described in the patent to Busch, thereby releasing relay ON1 (12). The release of relay ON1 (12) releases the monitoring connection by releasing hold magnet HM1 (15) and relay CE (12).

Relays ON1 (12), MST (12), SR (12), MRL (12), and BT (12) are described in the patent to Busch and their operation, therefore, will not be detailed herein.

PERIODIC RESEIZURE OF MARKER

Upon the operation of relay BRL (12) in four-wire originating register 803, a circuit is completed to enable timing circuit 1213 which extends from ground, through a make contact of relay CE (12) and a make contact of relay BRL (12) to timing circuit 1213.

Timing circuit 1213 is similar to that described in the patent to Busch for timing the various functions of an originating register. After the elapse of a predetermined length of time, a signal is passed by timing circuit 1213 from ground, through timing circuit 1213 and through the winding of relay TM (12) to battery, thereby operating relay TM (12). The operation of relay TM (12) opens previously described holding circuit for relay BRL (12), thereby releasing relay BRL (12). The release of relay BRL (12) initiates the reestablishment of a connection from four-wire originating register 803 to marker 201 through originating register marker connector 125, as previously described.

If an available trunk is not detected by the operation of one of the monitor relays, IT0 (12), IT1 (12), IT2 (12) or IT3 (12), four-wire originating register 803 will again attempt to complete the call in progress after having been in the camp-on condition for a length of time as determined by timing circuit 1213.

CALL DATA RECORDING FOR ORIGINATING CONNECTION

As previously indicated herein, patent 2,599,358 to Harold D. Cahill et al. discloses a call data recording system suitable for use with the switching system disclosed in the aforementioned Busch patent. The patent to Cahill et al. will be frequently referred to herein.

It is assumed that a call data record is desired for the above-described four-wire special grade interoffice call from four-wire station 109 to four-wire station 401. As previously described, the information ascertained by translator 906 included an indication as to whether or not a call data record for the call in progress is required. If a call data record is required, a signal is forwarded from translator 906 to AMA control 972 through cable 965. Translator 906 also forwards other pertinent call information to AMA control 972 over cable 965, such as the message billing index, code pattern, digit deletion requirements, class arbitrary digits and compensating resistance, all of which are described in the patent to Busch.

The above-described information and other information pertinent to the call in progress are forwarded from AMA control 972 to a selected four-wire sender, such as 806, through cable 979, through sender control 920, through cable 977, through four-wire sender connector 807 and through cable 808 to four-wire sender 806. AMA control 972 signals call information register 902 that a call data record is required and causes call information register 902 to forward the equipment location of calling four-wire station 109 to four-wire sender 806 through cable 946, through cable 948, through four-wire sender connector 807, through cable 808 to four-wire sender 806. The items of information passed from marker 201 to a selected sender for a call requiring a call data record and the circuit operations required to transfer this information and to register it in the selected sender are fully described in the Busch patent.

The information now stored in four-wire sender 806 includes the equipment location of calling four-wire station 109, the code pattern, the number of digits, message billing index, the recorder and trunk group number wherein the call in progress is being observed, an indication that the call in progress originated locally, the control digit which represents the type of treatment accorded the call in progress, the directory number of called four-wire station 401 and other pertinent information as described in the patent to Busch. This information is now forwarded from four-wire sender 806 through cable 1008, through transverter connector 211, through cable 1009 and through cable 1010 to call information register and converter 1005, of transverter 207. The control digit register 1006 of call information register and converter 1005 is similar in operation to the other digit registers described in the patent to Cahill et al. which store the digits of a called station directory number on a two-out-of-five basis. Control digit register 1006 will therefore not be described in detail herein.

A signal, indicating that the call for which data is to be recorded is being switched in four-wire network 108, is forwarded from four-wire sender 806, through cable 1008, through transverter connector 211, through cable 1009 and through cable 1011 to type of call detector and control 1007.

The information stored in call information register and converter is forwarded through cable 1030 to type of call detector and control 1007 where, with the exception of the calling station equipment location, it is forwarded through cable 1014, through cut-in control 1024 and through cable 1018 to recorder 212 (10).

The four-wire network indication received by type of call detector and control 1007 directs type of call detector and control 1007 in selecting the proper type of translator, two-wire 208 (10) or four-wire 209 (10), for the translation of the calling station equipment location into the directory number of the calling station. For the call presently being described, type of call detector and control 1007 will select four-wire translator 209 through cable 1023. Call information register and converter 1005 then forwards the equipment location of calling four-wire station 109 to four-wire translator 209 (10) through cable 1025. This equipment location is translated by four-wire translator 209 (10) as described in the patent to Cahill et al. and forwarded through cable 1020 and through cable 1017 to directory number register 1004. Directory number register 1004 then forwards the directory number of four-wire calling station 109 through cable 1016, through cut-in control 1024, and through cable 1018 to recorder 212 (10).

Is is assumed that four-wire special grade intertoll trunk 609 is being used to complete the call in progress. A signal is sent from four-wire special grade intertoll trunk 609 through cable 621 and through cable 1022 to trunk identifier 210 (10). Trunk identifier 210 (10) forwards the information identifying four-wire special grade intertoll trunk 609 as the trunk being used for the call in progress through cable 1021 to recorder 212 (10).

The circuit operations of trunk identifier 210, recorder 212, master timer 213, cut-in control 1024, directory number register 1004, two-wire translator 208 and four-wire translator 209 are described in the patent to Cahill et al. Cut-in control 1024 controls the sequence in which the call data is recorded by recorder 212.

Type of call detector and control 1007 serves to differentiate between locally originated four-wire calls and four-wire calls being switched through switching center 1 on a tandem basis. For two-wire calls, type of call detector and control serves to differentiate between calls originating from tip two-wire stations and ring two-wire stations. This latter function is fully described in the Cahill et al. patent. Type of call detector and control 1007 further directs cut-in control 1024 in forwarding the control digit, indicative of the type of treatment accorded the call in progress, to recorder 212 (10) on four-wire calls.

A description of call information register and converter 1005, with the exception of the above-described control digit register 1006 may be found in the Cahill et al. patent. Call information register and converter 1005 comprises registers for the storage of individual items of call information hereinabove described as being stored in four-wire sender 806.

As previously described, route relay R4 (21) and route series relay MBS (17) were operated as a result of the translations performed by translator 906. As described in the patent to Busch, relay MBS (17) in operating completes an obvious circuit for the operation of relay AMA (22). Several other route series relays like relay MBS (17) may be provided, each of which indicates a different message billing index, that is, a different form of call data record. The operation of any of these message billing index route series relays, such as relay MBS (17), will complete a circuit for the operation of relay AMA (22) in AMA control 972 (22).

The patent to Busch describes in detail the various items of call information which are made available by the operation of a route relay such as R4 (21). The Busch patent further describes the transfer of this information from a marker such as 201 to a selected sender such as 806. The circuit operations involved in these functions will not be described in detail herein. However, the operation of relay AMA (22) in AMA control 972 initiates the circuit operations required for the transfer of call information necessary for the call data record from marker 201 to four-wire sender 806.

The establishment of a connection from a selected sender to a transverter through a transverter connector is fully described in the Cahill et al. patent and will not be described herein. This connection extends from transverter 207 (10) through cable 1009 through transverter connector 211 (10) through cable 1008 to four-wire sender 806 (31).

Upon the establishment of this connection, the information stored in four-wire sender 806, including the control digit, is transferred from four-wire sender 806 to call information register and converter 1005 in transverter 207 (10). The various ground supplies in four-wire sender 806 used for the transfer of this information are described in the patent to Cahill et al. and will not be detailed herein. However, circuits are completed for the operation of information storage relays in call information register and converted 1005 (31, 32, 33, 34) which extend from ground, in four-wire sender 806 (31), through cables 3101 and 3102, through cables 1008 (31) and 1012 (31), respectively, through transverter connector 211 (31), through cable 1009 (31), through cable 1010 (31), and through the windings of the respective information storage relays in call information register and converter 1005 (31) to battery. As described in the Cahill et al. patent, the code pattern is stored through the operation of two-out-of-five of relays CP0 (31) to CP7 (31); the recorder number is stored through the operation of two-out-of-five of relays RN0 (31) to RN7 (31); the message billing index is stored through the operation of two-out-of-five of relays BMO (31) to MB7 (33); and the control digit is stored through the operation of two-out-of-five of relays CD0 (33) to CD7 (33) in control digit register 1006 (33). Further pertinent call information including portions of the equipment location of calling four-wire station 109, is stored in call information register and converter 1005 (32, 34) in a manner similar to that described in the Cahill et al. patent.

Each sender, two-wire or four-wire, provides type of call detector and control 1007 (33, 34) of transverter 207 with a signal indicating the type of call, two-wire or four-wire, of which a record is to be made. A four-wire type of call signal is sent by four-wire sender 806 (31) from ground, over lead 3103, through cable 1008, through transverter connector 211, through cable 1009, through cable 1011, over lead 3501 and through the windings of relay 4W (35) and relay 4W0 (35), respectively, to battery, thereby operating relay 4W (35) and relay 4W0 (35). The information storage relays which were operated as previously described and relays 4W (35) and 4W0 (35) are held operated over a circuit extending from battery through the windings of the respective relays, through make contacts of the respective relays and through make contacts of either relay CK5 (34) or relay CK7 (34) to ground. The operation of relays CK5 (34) and CK7 (34) are fully described in the patent to Cahill et al. and will not be described herein.

The above-mentioned patent to Busch describes the tests performed by a marker, such as marker 201, in ascertaining the party designation of a calling station, which result in the operation of either relay TP (28) or RP (28). This calling station party indication is transferred from a marker to a selected sender, and from the selected sender to a transverter for inclusion in the call data recorded. In this embodiment of the present invention a similar procedure is followed for calls originating in two-wire network 101 which will be described in greater detail later herein. However, since the four-wire stations such as 109 of this embodiment are not party lines, a similar method of signaling is used by marker 201 to inform transverter 207 as to the local or tandem nature of the call in progress.

As described in the patent to Busch, a party test of any calling station which does not result in the operation of tip party relay TP (28) will result in the operation of ring party relay RP (28), thus designating any station which is not a tip party as a ring party. If relay TP (28) is operated, ground is extended through a make contact of relay TP (28), through a make contact of previously operated relay AMA (22) and over lead 2802. If relay RP (28) is operated, ground is extended through a make contact of relay RP (28), through a make contact of relay AMA (22) and over lead 2803.

Since calling station 109 is a four-wire station having no party designation relay RP (28) operates as described in the patent to Busch, and ground is extended over lead 2803, through cable 979, through sender control 920, through cable 977, through four-wire sender connector 807 (31) and through cable 808 to four-wire sender 806 (31), where an RP relay, not shown, is operated, as described in the patent to Busch. This signal is relayed by four-wire sender 806 (31), as described in the Cahill et al. patent, from ground, in four-wire sender 806 (31), through cable 3102, through cable 1012, through transverter connector 211 (31), through cable 1009, through cable 1011, over lead 3301, through a make contact of relay 4W (35) and through the winding of relay 4WL (33) to battery, thereby operating relay 4WL (33).

It is to be noted at this time that a circuit would have been completed for the operation of relay RP (33) had relay 2W (35) been operated. Therefore, had this call originated in two-wire network 101, the ring party relay RP (33) in transverter 207 would have been operated, as described in the patent to Cahill et al. However, since the call in progress originated in four-wire network 108, a circuit was completed for the operation of four-wire local call relay 4WL (33). Relay 4WL (33) is held operated over a circuit extending from battery, through its winding, through a make contact thereof and through a make contact of relay CK5 (34) to ground. Relay 4WL (33) in operating completes a circuit for the operation of relay RP (33) extending from a battery through its winding, through a make contact of relay 4W (35) through a make contact of relay 4WL (33) and through a make contact of relay CK5 (34) to ground.

An obvious circuit for the operation of relay 4LOC (33) is completed by the operation of relay 4WL (33). Relay 4LOC (33) in operating completes a circuit for the operation of vertical group storage relays VG0 (32) through VG7 (32) whose operation, on a two-out-of-five basis, stores the vertical group portion of the equipment location of four-wire station 109.

The patent to Cahill et al. describes the conversion of information registered in call information register and converter 1005 into information suitable for recording by recorder 212. The detailed circuit operations performed in call information register and converter 1006 will not be described herein. However, a brief description of the operations of type of call detector and control 1007 (32, 33, 34, 35) in conjunction with call information register and converter 1006 is included hereinbelow.

The type of data record, two line or four line, is ascertained from the message billing index indication and the type of call indication. As described in the patent to Cahill et al., relays MB0 (31) through MB7 (33) may register any message billing index 0 to 9 in accordance with the message billing index registered by the similar relays in four-wire sender 806. For example, it is assumed that message billing index relays MB0 (31) and MB7 (33) have been operated, thereby completing a circuit for the operation of four line entry relay 4L (33). This circuit extends from ground, through a make contact of relay MB0 (31), through a make contact of relay MB7 (31), through a make contact of relay 4W (35), over cross-connection 3302, through a break contact of relay TTK (33) and through the winding of relay 4L (33) to battery. The operation of relay TTK (33) is fully described in the Cahill et al. patent. A further description of the conversion of message billing index indications to two line and four line entry indications is also contained in the patent to Cahill et al.

As previously described, portions of the equipment location of calling four-wire station 109 have been registered in call information register and converter 1005. The patent to Cahill et al. describes the conversion of this information into the information required for the selection of a translator such as 208. Although the circuit operations required for the selection and connection to an appropriate translator are fully described in the patent to Cahill et al., a brief description will be included hereinbelow.

As described in the Cahill patent, relays VG0 (32) through VG10 (32) register the vertical group on the line link frame in which a calling station appears. Two of the relays VG0 (32) through VG7 (32) are operated in combination to register vertical groups 0 through 9, and relay VG10 (32) is operated, in addition, for vertical groups 10 through 19. The Cahill et al. patent describes the conversion of vertical group information into column information whereby a column relay, such as relay CL0 (35) through CL5 (35), is operated in addition to relay EVN (35) to relay ODD (35).

The frame number of the line link frame on which a calling station appears is registered by the operation of one of the relays FT0 (34) through FT3 (34) and two of the five relays FU0 (34) through FU7 (34), as described in the patent of Cahill et al. Assuming that relays FU0 (34), FU1 (34) and FT0 (34) have been operated, a circuit is completed for the operation of four-wire frame relay F01 (36), which extends from ground, through a make contact of relay RP (33), through a make contact of relay FU0 (34), through a make contact of relay FU1 (34), through a make contact of relay FT0 (34), through a make contact of relay 4W (35) over lead 3502 and through the winding of relay F01 (36) to battery.

Since the call whose call data is to be recorded is a service call, relay SC (32) was operated, as described in the patent to Cahill et al. It is assumed that relays CL0 (35) and EVN (35) were operated as a result of the previously described conversion from vertical group information. The operation of these relays and the operation of relay F01 (36) complete a circuit for the operation of four-wire translator identification relay 4WT0 (35), which extends from battery through the winding of cross detecting relay XTLS (35), through the winding of relay 4WT0 (35), over cross-connection 3503, through a make contact of relay F01 (34), through a make contact of relay CL0 (35), through a break contact of relay DNK1 (31) and through a make contact of relay SC (32) to ground.

Relay 4WT0 (35), in operating, completes a circuit initiating the connection of transverter 207 to four-wire translator 209 (36). This circuit may be partially traced from battery through a make contact of relay CK7 (34), through a make contact of relay DNK1 (31), through a make contact of relay 4LOC (33), through a break contact of relay TLS00 (33), through break contacts of all other TLS-- (33) relays through a make contact of relay 4WT0 (35) and through the winding of transverter preference relay 4TVP00 (36).

Each translator includes a transverter preference relay such as 4TVP00 (36). Their operation is fully described in the patent to Cahill et al. Relay 4TVP00 (36), in operating, completes an obvious circuit for the operation of transverter connector relay 4TV00 (36). As described in the patent to Cahill et al., relay 4TV00 connects the selected translator, four-wire translator 209, to transverter 207.

In a manner similar to that described in the Cahill et al. patent, a circuit is now completed for the operation of relay G0 (36), which may be partially traced from battery through the winding of relay G0 (36), through a make contact of relay 4TV00 (36), over lead 3603, through cable 3604, over lead 3603, through a make contact of relay EVN (35), through a make contact of relay F01 (36) and through a make contact of relay CL0 (35) to ground.

The remaining portion of the equipment location of calling four-wire station 109 is then passed from four-wire sender 806 (31) through cable 3102, through cable 1008, through transverter connector 211, through cable 1009, and through cable 1010 to call information register and converter 1005. Cables 3205, 3206, and 3207 forward this information through cable 1025 to a selected translator, such as four-wire translator 00 209 (36), through a cable such as 3607.

The circuit operations of a translator for translating the equipment location of a calling station into the directory number of the calling station are fully described in the patent to Cahill et al. and will not be described herein. The directory number of four-wire calling station 109 is now forwarded from four-wire translator 209 through cable 3605 and through cable 3610 to a directory number register 1004.

The directory number of calling four-wire station 109 is now transferred from directory number register 1004 through cable 1016 through cables 3401, 3402, 3403, 3404 and 3410, through cut-in control 1024 and through cable 1018 to recorder 212.

Cut-in control 1024, as previously described and as described in the patent to Cahill et al. controls the sequence in which call data is forwarded from transverter 207 to recorder 212. The relays C2A (32), C2B (32), and C2C (32) cut through leads of cable 1018 which transmit information to be recorded in the third line of the call data record. This information includes the thousands, hundreds, tens, and units digits of the number of the calling line and the office number of the calling line, as registered in directory number register 1004. These circuit operations are described in the patent to Cahill et al.

In this embodiment of the present invention, all four-wire stations have the same office number; therefore, a record of the office number for calls originating from four-wire stations, such as 109, is not required. On four-wire calls, the control digit, as registered in the control digit register 1006 of call information register and converter 1005, is substituted for the office number of a calling four-wire station. The translation performed by a four-wire translator, such as four-wire translator 209 (36), will provide no office number indication to directory number register 1004. Therefore, no office number indication is passed from directory number register 1004 through cable 1016 to cut-in control 1024. Instead, the control digit, stored in control digit register 1006 (34), is converted, as shown in the following table, and forwarded through cut-in control 1024 to recorder 212 through cable 1018.

*Table No. 4*

| Control digit: | Recorded digit |
|---|---|
| 1 | 6 |
| 2 | 7 |
| 3 | 7 |
| 4 | 8 |
| 5 | 9 |
| 6 | 6 |
| 8 | 8 |

The circuit operations required to complete the recording of call data for the call in progress are described in the patent to Cahill et al. and will not be described herein in detail. Briefly, this includes the identification of the trunk which is being used to pass the call to the next switching center by trunk identifier 210 and the forwarding of this information from trunk identifier 210 to recorder 212, and the forwarding of various other items of call data from four-wire sender 806 through cable 3102, through cable 1008, through transverter connector 211, through cable 1009, through cable 1010, through cable 3106, through cable 3211, through cut-in control 1024 and through cable 1018 to recorder 212.

Two further entries of call data information are made. When called four-wire station 401 answers, four-wire special grade intertoll trunk 609 signals trunk identifier 210 to cause a record to be made by recorder 212 of the time of the answer and the identity of trunk 609. When calling four-wire station 109 disconnects, four-wire special grade intertoll trunk 609 again signals trunk identifier 210 which causes recorder 212 to record the time of disconnect and the identity of trunk 609. The circuit operations required to make these answer and disconnect call data records are described in the patent to Cahill et al. and will not be detailed herein.

Four-Wire Interoffice Call: Tandem Portion; Priority—Special Grade

The aforementioned Patent 2,587,817 to A. J. Busch et al. discloses the switching operations required to complete a tandem connection. Frequent reference to this description will be made hereinbelow.

Figure 3:
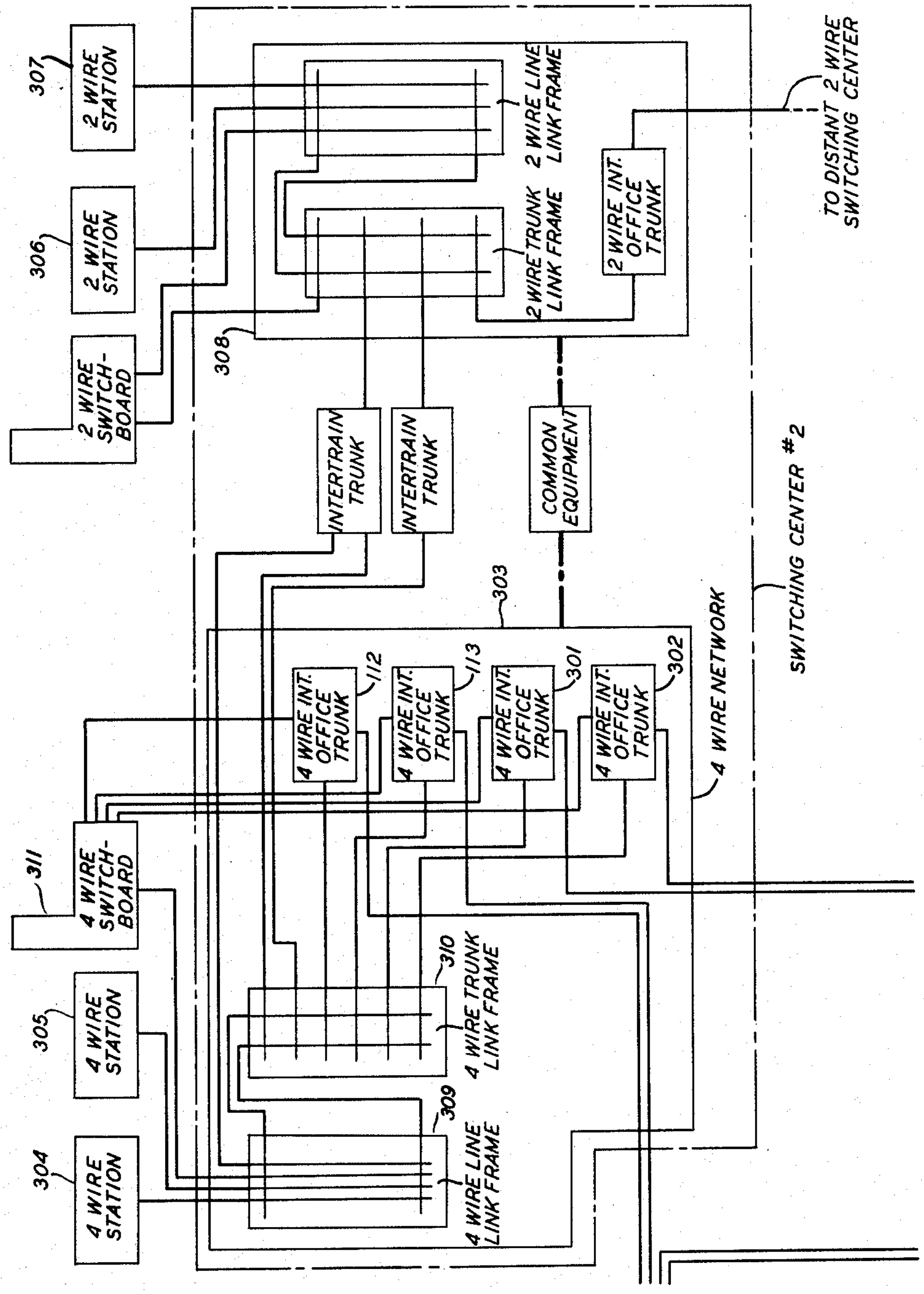
Figure 4:
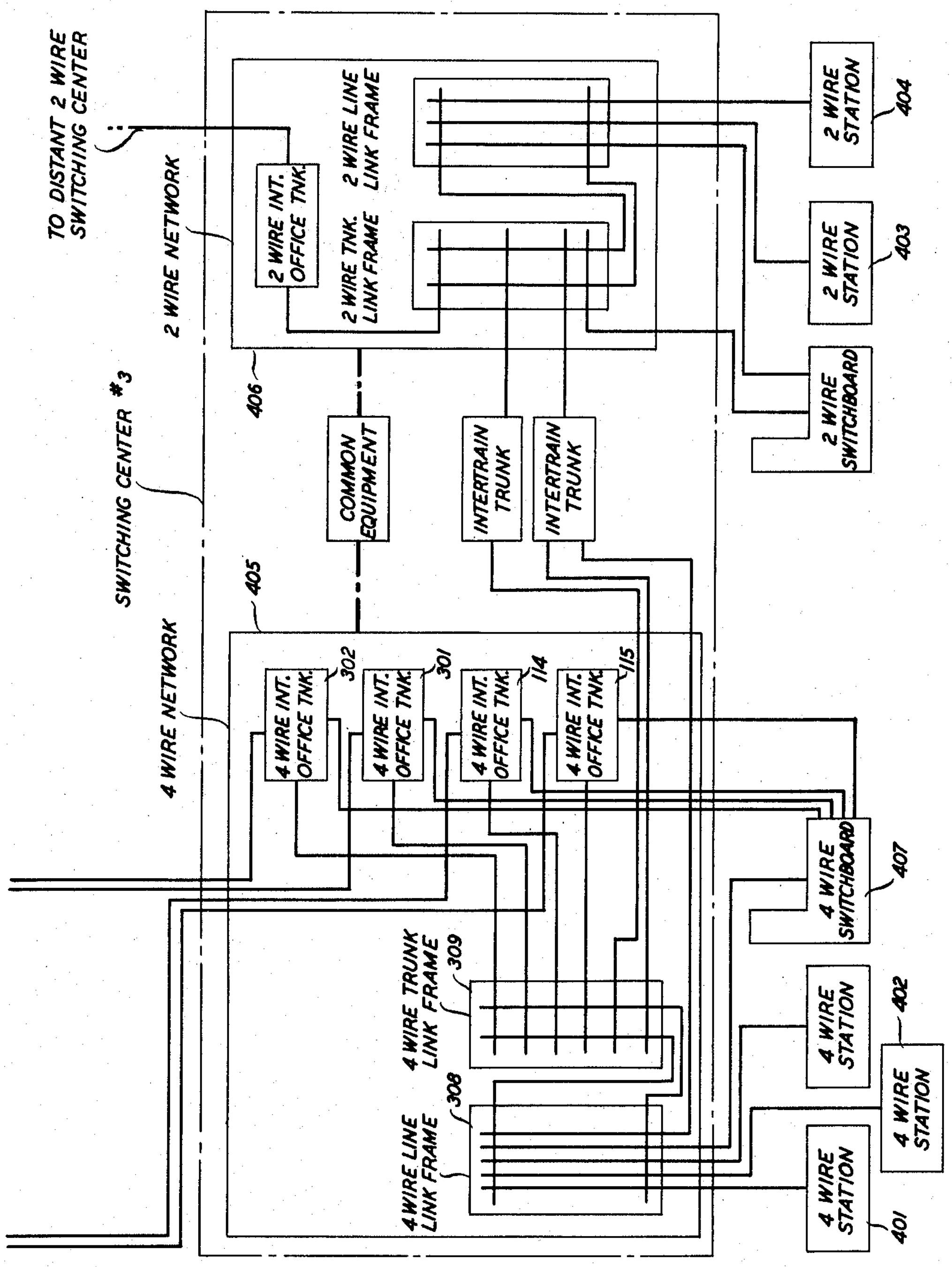

It is assumed for this example that FIGS. 5 through 10 represent switching center 2 of FIG. 3. It is further assumed that the above-described originating portion of a four-wire priority special grade interoffice call has been completed in switching center 1, and that four-wire special grade intertoll trunk 609 was used to complete the call.

As described in the patent to Busch et al., a connection is established from a trunk, over which a call enters a tandem switching center, through the incoming register link to an incoming register. This connection extends from four-wire special grade intertoll trunk 609 through cable 623, through a crosspoint of four-wire incoming register link 816 and through cable 827 to four-wire incoming register 813. A signal is then returned through four-wire special grade intertoll trunk 609 to the sender in switching center 1 which was selected, as previously described, for use in completing this call. The sender in switching center 1 then transmits the control digit, indicating the type of treatment to be accorded the call, and the directory number of called four-wire station 401 over four-wire special grade intertoll trunk 609, through cable 263, through a crosspoint of four-wire incoming register link 816 and through cable 827 to four-wire incoming register 813, in which it is stored. The control digit register 825 of four-wire incoming register 813 is similar in operation to the other digit registers in the incoming register which are described in the patent to Busch, et al. The circuit operations required for the establishment of the above-mentioned connections, and the transmission and storage of call data from switching center 1 to four-wire incoming register 813 of switching center 2 are fully described in the Busch et al. patent and will not be detailed herein.

Various other items of information, as described in the patent to Busch et al., are forwarded from four-wire special grade intertoll trunk 609 to four-wire incoming register 813. This information includes the tens and units digits of the number of the trunk link frame on which four-wire special grade intertoll trunk 609 appears, the class of trunk represented by four-wire special grade intertoll trunk 609 and the arbitrary trunk number of four-wire special grade intertoll trunk 609. The registration of this information in an incoming register, such as four-wire incoming register 813, is fully described in the patent to Busch et al., and will not be described herein.

Upon the completion of the registration of call information in four-wire incoming register 813, a connection is established from four-wire incoming register 813 through cable 828, through cable 720, through incoming register marker connector 124 and through cable 925 to marker 201. The circuit operations involved in the establishment of this connection are similar to those previously described for the connection from four-wire originating register 803 to marker 201 in the originating portion of this call. A further description of the establishment of this connection may be found in the patent to Busch et al.

As previously described for the originating portion of this call, a four-wire network indication is forwarded from four-wire incoming register 813 to network detector and control 901 of marker 201. This indication is forwarded over the above traced connection and through cable 971 to network detector and control 901. The other call information stored in four-wire incoming register 813 is transferred to call information register 902 of marker 201 from four-wire incoming register 813 over the connection previously described and through cables 970 and 905 to call information register 902, in which it is stored for future use.

The class indication of four-wire special grade intertoll trunk 609, the control digit indicative of the type of treatment accorded the call, and the office code are forwarded from call information register 902 through cable 924 to translator 906. Translator 906 translates this information into the information required by trunk hunting and switch control 907 to select and connect to a four-wire special grade intertoll trunk extending to switching center 3, in which the called four-wire station 401 is terminated.

The class of service indication of calling four-wire station 109 may differ from the class indication of four-wire special grade intertoll trunk 609, and a different type of treatment indication may therefore be ascertained by translator 906. The type of treatment accorded a particular call may be changed at a tandem switching point in this manner.

As previously described for the originating portion of this call, trunk hunting and switch control 907 now proceeds to select a four-wire special grade intertoll trunk connecting switching centers 2 and 3. A sender suitable for use with the selected type of trunk is selected and connected to sender control 920. These operations are performed in a manner similar to those in switching center 1 which were described for the originating portion of this call.

After marker 201 has selected and connected to an idle trunk connecting switching centers 2 and 3 it proceeds to interconnect the selected trunk and the trunk over which the call entered switching center 2. For purposes of description only, it will be assumed that four-wire voice grade intertoll trunk 605 is suitable for the completion of this call to switching center 3, although, in reality, a four-wire special grade intertoll trunk similar to 609 would be required.

Four-wire special grade intertoll trunk 609 is provided with a line link appearance 624 on four-wire line link frame 19 (6) as well as a trunk link appearance 616 on four-wire trunk link frame 01 (6). A connection will be established, under the control of marker 201, from appearance 624, of four-wire intertoll special grade trunk 609 on four-wire line link from 19 (6), to appearance 615, of four-wire voice grade intertoll trunk 605 on four-wire trunk link frame 00 (6), through link 604.

As described in the patent to Busch et al., marker 201, in order to select the line link appearance 624 of four-wire special grade intertoll trunk 609, must consult a number group translator circuit, such as 1002, for a translation of the arbitrary trunk number of four-wire special grade intertoll trunk 609 into equipment location information of the line link frame appearance 624 of this trunk.

Sender control 920 has received signals from translator 906, as previously described, indicating that the call in progress requires the use of a sender and is not terminated locally in switching center 2. An indication of the nonlocal nature of the call is passed from sender control 920 through cable 953 to class of call and linkage control 927. The class of trunk indication, received as previously described by call information register 902 from four-wire incoming register 813, is forwarded through cable 940 to class of call and linkage control 927. Class of call and linkage control 927 combines a class of trunk indication received from call information register 902 and the outgoing call indication received from sender control 920 and, as a result, signals number group control 926 through cable 952 that the use of a trunk number group circuit, such as 1002, is required.

Number group control 926 then signals trunk number group connector 1001 through cable 954 and over lead 955 to connect a trunk number group circuit, such as 1002, to call information register 902 through cable 1027. Upon the establishment of this connection, call information register 902 forwards the arbitrary number of four-wire special grade intertoll trunk 609 through cable 1027, through trunk number group connector 1001 and through cable 1026 to trunk number group circuit 1002. Trunk number group circuit 1002 performs a translation of this arbitrary trunk number and returns the equipment location of line link appearance 624 of four-wire special grade intertoll trunk 609 to call information register 902 through cable 1026, through trunk number group connector 1001 and through cable 1027. This equipment location information is stored in call information register 902 for use by line switch control 916, as previously described in the originating portion of this call. The above-described operations are performed in a manner similar to that described in the Busch et al. disclosure, wherein details of the circuit operations may be found.

The circuit operations required to complete the remainder of this tandem portion of an interoffice call are described in the previously referred to patent to Busch et al. and are similar to the circuit operations described for the originating portion of this call. In brief, the equipment location of four-wire special grade intertoll trunk 609 is forwarded to line switch control 916 from call information register 902; class of call and linkage control 927 causes call information register 902 to interrogate network detector and control 901 as to which network, two-wire 101 or four-wire 108, is switching the call in progress; and marker 201 is connected to four-wire line link frame 19 (6) on which four-wire special grade intertoll trunk 609 appears.

Trunk hunting and switch control 907, as directed by network detector and control 901, selects and connects to a suitable four-wire special grade intertoll trunk connecting switching centers 2 and 3. It has been assumed, for purposes of description only, that four-wire voice grade intertoll trunk 605 is suitable for this connection.

Sender control 920 selects and connects to an appropriate sender, such as four-wire sender 806, and passes the required call information to the selected sender 806. A connection is established from four-wire sender 806 to four-wire voice grade intertoll trunk 605. Line switch control 916 and trunk hunting and switch control 907 then control the establishment of a connection in four-wire network 108 from appearance 624, or four-wire special grade intertoll trunk 609 on four-wire line link frame 19 (6), to appearance 615, of four-wire voice grade intertoll trunk 605 on four-wire trunk link frame 00 (6), through link 604.

After the completion of various tests, marker 201 signals four-wire sender 806 to advance, and releases. When switching center 3 is ready to receive signals from four-wire sender 806 of switching center 2, a signal is sent from switching center 3 over four-wire voice grade intertoll trunk 605, through the previously described connection to four-wire sender 806, whereupon the control digit and directory number of called line 401 are transmitted by four-wire sender 806 to switching center 3 over four-wire voice grade intertoll trunk 605.

Network detector and control 901, in a manner similar to that described for the originating portion of this call, directed the testing and connection establishing functions of marker 201 to four-wire network 108, in which the call in progress was being switched. Assuming now that FIGS. 11 through 37 represent circuit details of certain portions of the switching center shown in FIGS. 5 through 10 and are incorporated in switching center 2, the above-described call will enter switching center 2 on four-wire special grade intertoll trunk 609 (27). A more complete description of the circuit operations of a four-wire intertoll trunk will be given in a description of the incoming portion of this call at switching center 3.

As previously described, a connection is established from four-wire special grade intertoll trunk 609 through cable 623, through a crosspoint of four-wire incoming register link 816 and through cable 827 to four-wire incoming register 813. This connection is utilized to receive and store call information from originating switching center 1 and from four-wire special grade intertoll trunk 609. This information includes the control digit, the directory number of called four-wire station 401, the arbitrary identifying number assigned to four-wire special grade intertoll trunk 609 in switching center 2, the class of trunk indication and the number of the four-wire trunk link frame on which four-wire special grade intertoll trunk 609 appears, which is 01.

Upon the receipt and registration of the above call information, a connection is established, in a manner similar to that described in the patent to Busch, from four-wire incoming register 813 to marker 201. The call information stored in incoming register 813 is then forwarded to marker 201 over this connection. As in the case of four-wire originating register 803 in the originating portion of this call, the various sources of ground in four-wire incoming register 813 which are used to forward call information to marker 201 are not described herein. However, details thereof may be found through reference to the patent to Busch.

Upon the establishment of the above connection, a circuit is completed for the operation of relay 4W (17) in network detector and control 901, which may be partially traced from ground in four-wire incoming register 813 through cable 828, through cable 720, through incoming register marker connector 124, through cable 925, through cable 971, through cable 1750, over lead 1708, and through the winding of relay 4W (17) to battery. Similar circuits are completed through cables 970 and 905 for the operation of relay TAN (17), the storage of the office code of switching center 3 in office code digit register 2101, the storage of the trunk class indication in four-wire class of service register 2102, the storage of digits 0 and 1 representing the number of four-wire trunk link frame 01 in incoming trunk frame number register 2103, the numerical designation of called four-wire station 401 in called station numericals register 2104 and the arbitrary number of four-wire special grade intertoll trunk 609 in incoming trunk number register 2501. These circuits extend from ground in four-wire incoming register 813 through cable 828 through cable 720, through incoming register marker connector 124, through cable 925, through cable 970, through cable 905 and through the windings of the various information storage relays (not shown) to battery.

As previously described for the originating portion of this call, the control digit is forwarded from control digit register 922 through cable 1705 to call treatment translator 2201, and the class of trunk indication is forwarded from four-wire class of service register 2102 through cable 2107 to call treatment translator 2201. Call treatment translator 2201 translates these indications into one-out-of-one hundred possible outputs, each of which is cross-connected to a type of call treatment relay, such as PSG (22). The class of trunk indication of four-wire special grade intertoll trunk 609 will differ from that of calling four-wire station 201 in switching center 1 thereby producing a separate output.

A circuit is then completed for the operation of relay PSG (22) extending from battery through the winding of relay PSG (22), over cross-connection 2214 and through call treatment translator 2201 to ground. Relay PSG (22), in operating, completes circuits for the operation of screening relays S2 (22), S3 (22), S8 (22), and S5 (22) as previously described.

The remaining operations of translator 906, including the operation of route relay R4 (21), are similar to those described for the originating portion of this call. The selection of a suitable sender such as four-wire sender 806 by sender control 920 also occurs in a manner similar to that previously described. A connection is then established from four-wire sender 806 to a selected trunk, such as 605, which connects switching centers 2 and 3.

As a result of the previously described operation of relay TAN (17) in call information register 902 and the operation of relay SON (22) in sender control 920, a circuit is completed for the operation of tandem outgoing class relay TOG (22), which extends from battery through the winding of relay TOG (22), through a make contact of relay TAN (17) and through a make contact of relay SON (22) to ground. Relay TOG (22), in operating, completes an obvious circuit for the operation of relay TRN (20) in number group control 926. Relay TRN (20), in operating, completes another obvious circuit for the operation of relay ECN (20) in number group control 926.

The previously described operation of relay TOG (22) completes a circuit for the operation of relay FLG (22) in class of call and linkage control 927, which extends from battery through the winding of relay FLG (22), through a break contact of relay LK1 (22) and through a make contact of relay TOG (22) to ground. Relay FLG (22), in operating, completes an obvious circuit for the operation of seize number group SNG1 (20) and SNG2 (20). Relay TLC1 (23) and relay TFK1 (23) in trunk hunting and switch control 907 have been operated as described in the patent to Busch et al.

The operation of relay SNG2 (20) completes a circuit for the operation of marker preference relay MP0 (20) in trunk number group connector 1001, which may be partially traced from ground through the winding of relay MP0 (20), in trunk number group connector 1001, through a make contact of relay ECN (20) over lead 2001, through a make contact of relay SNG2 (20) through a make contact of relay TFK1 (23) and through a make contact of relay TLC1 (23) to battery. The above circuit and the operation of trunk number group connector 1001 is described in the patent to Busch et al.

As described in the Busch et al. disclosure, the operation of relay MP0 (20), in trunk number group connector 1001 (20), initiates the establishment of a connection from incoming trunk number register 2501 through cable 2502 through trunk number group connector 1001 (20) and through cable 2002 to trunk number group translator 1002 (20). The arbitrary trunk number of four-wire special grade intertoll trunk 609 is then forwarded over this connection from incoming trunk number register 2501 to trunk number group translator 1002, where it is translated into the equipment location of the line link appearance 624 of four-wire special grade intertoll trunk 609.

This equipment location is then forwarded from trunk number group translator 1002 (20) through cable 2003, through trunk number group connector 1001, through cable 2006, through cable 2004 and through cable 2005 to called station equipment location register 2105 in which it is stored. The tens digit of the number of four-wire line link frame 19 (6), on which four-wire special grade intertoll trunk 609 appears, is registered through the operation of relay FTN1 (21) in called station equipment location register 2105. The remaining equipment location information is stored through the operation of similar register relays, as described in the patent to Busch et al.

The circuit operations performed by trunk number group connector 1001 and trunk number group circuit 1002 are fully described in the patent to Busch et al. and will not be detailed herein.

As previously described for the originating portion of this call, call information register 902 now interrogates network detector and control 901 to ascertain the network, two-wire 101 or four-wire 108, containing the line link frame on which either a calling station or the incoming trunk appears. Since four-wire special grade intertoll trunk 609 is serving as the incoming trunk, network detector and control 901 will provide a four-wire network indication.

The operation of relay FTN1 (21) in called station equipment location register 2105 completes a circuit for the operation of relay FTS1 (13) in line switch control 916, which may be traced from battery through the winding of relay FTS1 (13), through a make contact of relay 4W (17) in network detector and control 901 and through a make contact of relay FTN1 (21) in called station equipment location register 2105 to ground. As previously described, had the equipment location registered in called station equipment location register 2105 pertained to a line link frame in two-wire network 101, relay 2W (17) would have been operated, thus completing a circuit for the operation of relay FTT1 (13) in line switch control 916. The remaining items of equipment location information stored in called station equipment location register 2105 (13) are forwarded through cable 1301 to line switch control 916 and stored therein as described in the Busch et al. disclosure, through the operation of relays such as FUT9 (13). The operation of relays FUT9 (13) and FTS1 (13) complete a circuit for the operation of marker preference relay MP0 (13) in four-wire line link frame and connector 19 (13).

In a manner similar to that previously described for the originating portion of this call and further described in the patent to Busch et al., a connection is established, under the control of marker 201, from four-wire special grade intertoll trunk 609 to the selected four-wire special grade intertoll trunk connecting switching centers 2 and 3.

The further operations required to complete the tandem portion of this call, which include various tests, the sending of an advance signal from marker 201 to sender 806, the release of marker 201, a signal from switching center 3 that it is ready to receive signals from four-wire sender 806, the transmission of call information from sender 806 of switching center 2 to switching center 3, and the assumption of control of the call by the selected four-wire special grade intertoll trunk, all occur in a manner similar to that previously described for the outgoing portion of this call, and are described in the patent to Busch et al.

Priority—Camp-on for a Through Switched Call

The circuit operations which were performed in the establishment of a monitoring connection from monitor circuit 822 of four-wire originating register 803, through register priority link circuit 613, to those trunk group busy leads which were associated with trunk groups included in the trunk combination 05, as ascertained from translator 906, were hereinabove described for the originating portion of a four-wire priority special grade interoffice call. A similar connection is established in the tandem switching center 2 from monitor circuit 824 of four-wire incoming register 813 through register priority link circuit 613 to those trunk group busy leads which are associated with the trunk groups in the trunk combination for calls originating from or switched through switching center 2 which are directed to switching center 3.

The tandem portion of this four-wire priority call in switching center 2 progresses as previously described until trunk hunting and switch control 907 attempts to select a suitable trunk extending to switching center 3. It is now assumed that no trunk to switching center 3 is available. Marker 201 now functions in a manner similar to that described for the all trunks busy condition encountered in the originating portion of a four-wire priority call. Trunk hunting and switching control 907, upon failing to locate a trunk to switching center 3 within the direct trunk group, signals route advance control 918 which, in response to the signal, causes translator 906 to route advance. Translator 906 now provides trunk hunting and switch control 907 with information concerning the alternate trunk group provided for calls directed to switching center 3. Trunk hunting and switch control 907 fails to locate an idle trunk within the alternate trunk group and again signals route advance control 918, which causes translator 906 to route advance a second time.

As a result of this second route advance, translator 906 signals camp-on control 204 that a priority call has encountered an all trunks busy condition. As a result, camp-on control 204 is connected to register priority link circuit 613 through cable 932. A further connection is then established from camp-on control 204 to register priority link 613 which extends through cable 959, through cable 961, through incoming register marker connector 124, through cable 963 and through cable 716.

As previously described, incoming register marker connector 124 comprises marker connector relays, each of which is associated with an individual marker, and register connector relays, each of which is associated with an individual incoming register. The above traced connection, between camp-on control 204 and register priority link circuit 613, extends through make contacts of a marker connector relay associated with marker 201, and a register connector relay associated with four-wire incoming register 813, thus associating four-wire incoming register 813 and marker 201 for purposes of the establishment of the monitoring connection.

Translator 906 passes an indication of the trunk combination number, which is associated with the direct trunk group extending to switching center 3, to camp-on control 204, which then forwards this indication through cable 932 to register priority link circuit 613.

Register priority link circuit 613 was described in connection with the originating portion of this priority call. Each crosspoint thereof, in operating, cuts through six trunk group busy leads to a register monitor circuit, such as 824. In this embodiment of the present invention, a maximum of three trunk groups plus one overflow trunk group can be monitored by a monitor circuit such as 824. Monitor circuit 824 must therefore differentiate between the three leads to be monitored and the three leads to be ignored.

The trunk combination information forwarded to four-wire incoming register 813, as previously described, is converted by register priority link 613 into an odd or even trunk combination indication. This odd or even indication is forwarded from register priority link circuit 613 through cable 716, through cable 963, through incoming register marker connector 124, through cable 721 and through cable 828 to four-wire incoming register 813. The odd or even indication is utilized by monitoring circuit 824 to ascertain which three of the six trunk group busy leads cut through registery priority link circuit 613 it is to monitor.

Signals for the operation of the select and hold magnets of the crossbar switches in register priority link circuit 613 are passed through cable 716, through cable 963, through incoming register marker connector 124 and return through cable 963 and cable 716 to register priority link circuit 613. These signals, in passing through the above described register connector relays and marker connector relays of incoming register marker connector 124, identify four-wire incoming register 813 as the register which is to monitor the trunk combination received from marker 201. The select magnet associated with the indicated trunk combination, and the hold magnet associated with four-wire incoming register 813, are now operated, thus cutting through the six-trunk group busy leads to monitor circuit 824, in four-wire incoming register 813.

The remaining circuit operations involved in the establishment of the monitoring connection, the release of marker 201, the detection of an idle trunk within one of the selected trunk groups, the re-establishment of a connection to a marker and the completion of the priority call to a selected trunk now occur substantially as described for the originating portion of this priority call.

The detailed circuit operations required for the establishment of the camp-on condition in four-wire incoming register 813 including the operations which occur subsequent to the detection of an idle trunk, and the limitation as to the number of registers in a camp-on condition, all occur substantially as described for the originating portion of this four-wire priority call.

PERCENTAGE LIMITATION OF REGISTERS IN CAMP-ON

Figure 11:
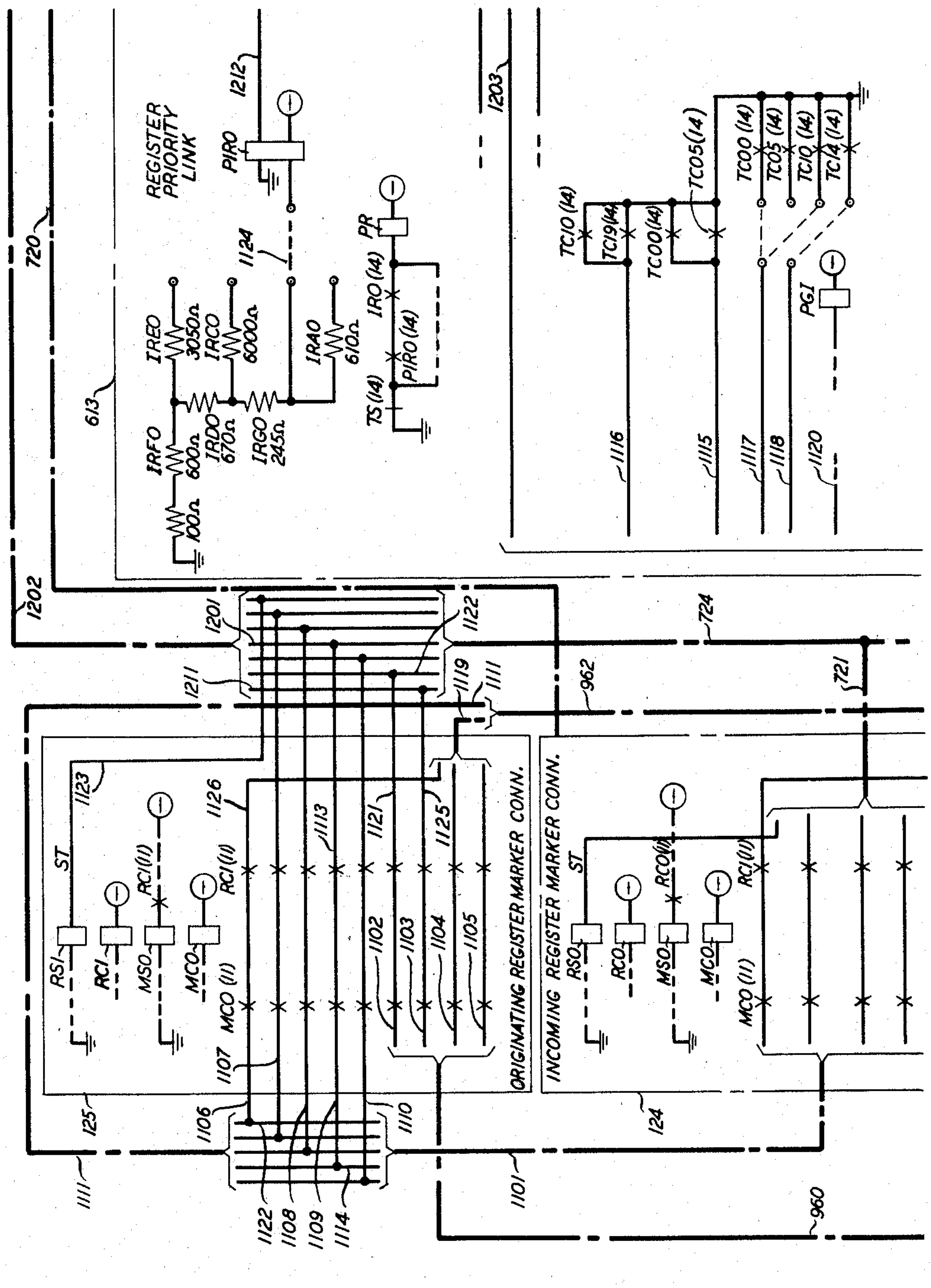
FIGS. 11–37 are schematic representations in detached contact form of certain portions of the general components of the switching center shown in FIGS. 1 and 2.
Figure 12:
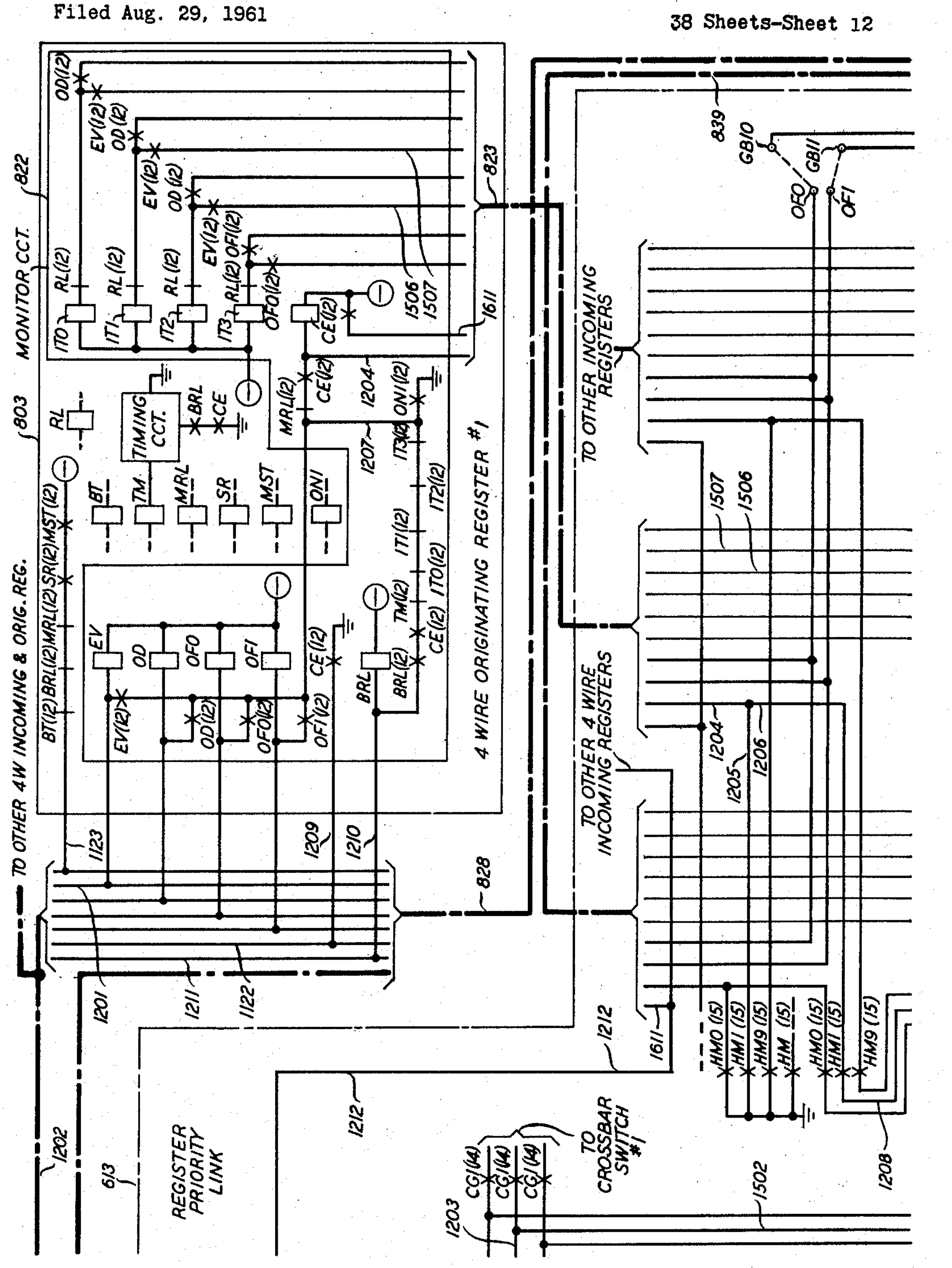
Figure 13:
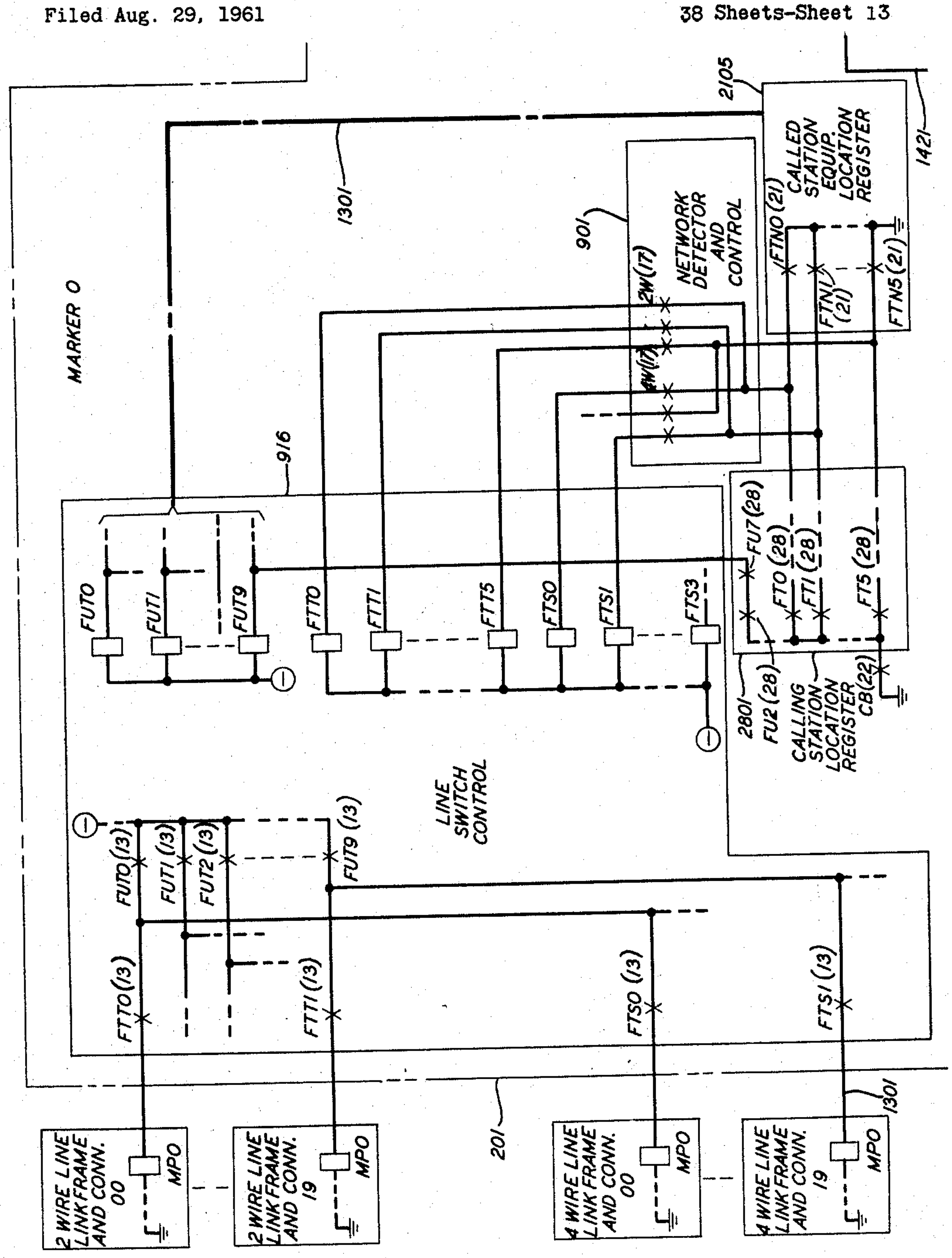
Figure 14:
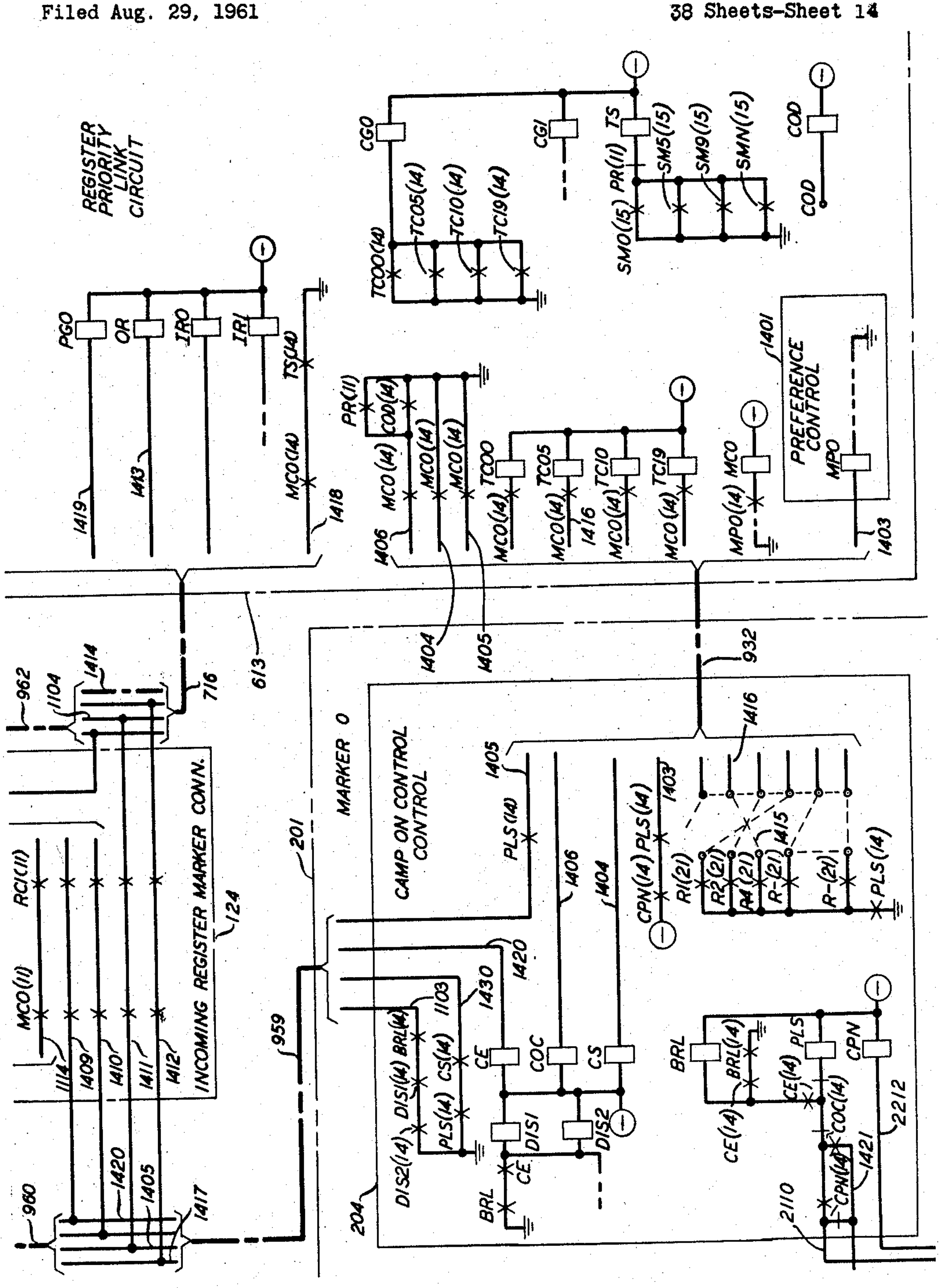
Figure 15:
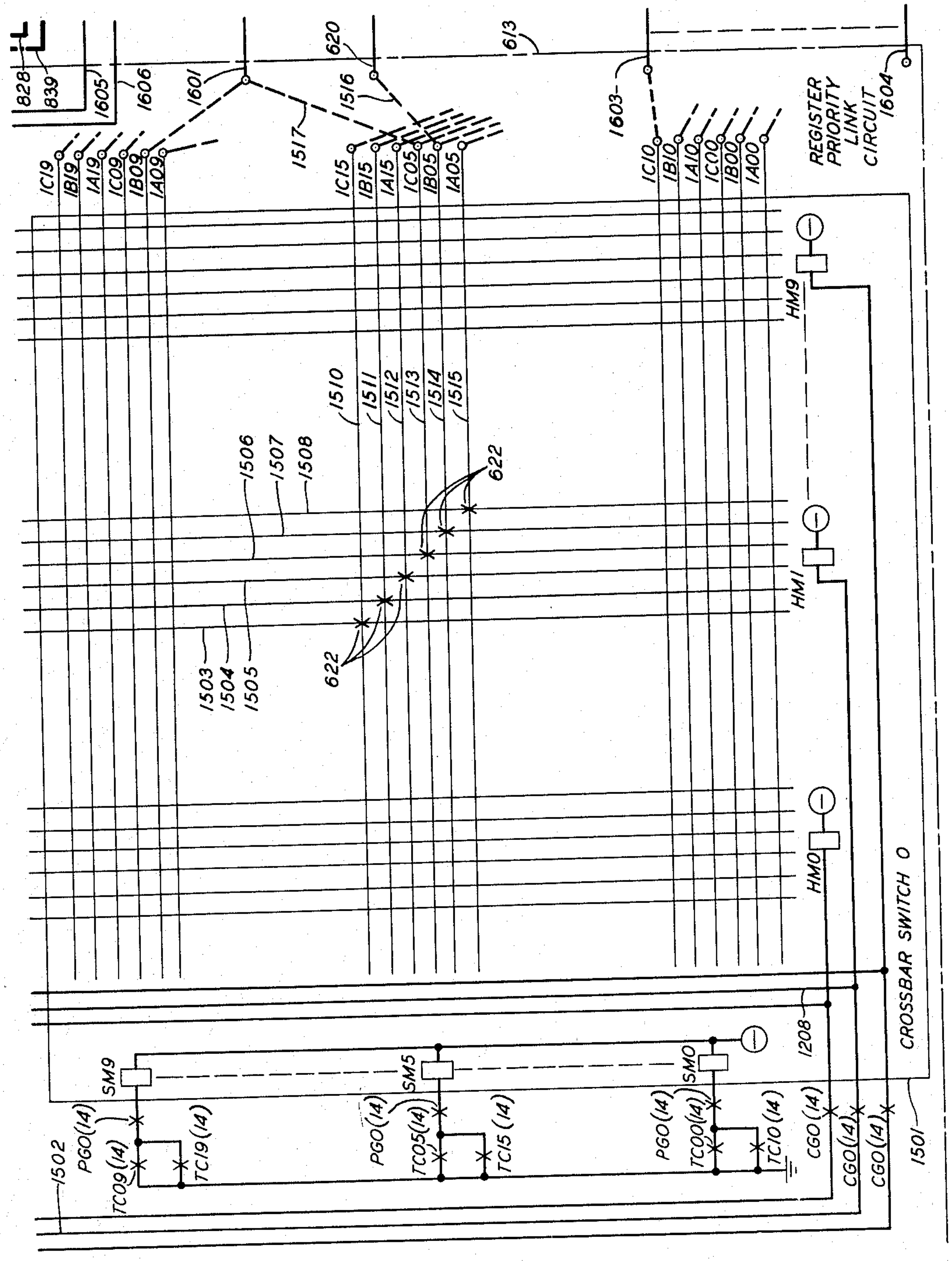

Register priority link circuit 613 is arranged to deny camp-on service to a call if a certain percentage of the registers in that particular register group are already in the camp-on condition. In the present embodiment of this invention, provision is made so that this percentage can be adjusted between 25 percent and 50 percent. A biased polar relay, such as PIR0 (11), is provided for the originating register group, which is register group 1, and for each incoming register group, such as register group 0. When an incoming register such as 813 (16) is in the camp-on condition a resistance battery is connected to the primary circuit of relay PIR0 (11) which is associated with the register group including four-wire incoming register 813 (16), i.e., register group 0. This circuit may be traced from battery, through a make contact of relay CE (16) over lead 1611, through cable 839 (16), over lead 1611, over lead 1212, and through the primary winding of relay PIR0 (11) to ground. When a prescribed number of registers in a group are in camp-on, the primary circuit resistance of relay PIR0 (11) is sufficiently lowered to allow the primary current to overcome the current in the secondary winding of relay PIR0 (11), thus permitting the relay to operate. The bias winding current of relay PIR0 (11) can be adjusted by changing cross connections such as 1124. The values of the various resistances IRA0, IRC0, IRD0, IRE0, IRF0 and IRG0 shown in FIG. 11 are illustrative of the variations in the number of registers with operated CE relays required to operate relay PIR0 (11).

Relay PIR0 (11), in operating, completes a circuit for the operation of relay PR (11), which extends from ground, through a break contact of relay TS (14), a make contact of relay PIR0 (11), a make contact of relay IR0 (14) and through the winding of relay PR (11) to battery. Relay IR0 (14) was previously operated from four-wire incoming register 813 in a manner similar to that described for the operation of relay OR (14) from four-wire originating register 803. Relay PR (11), in operating, completes a circuit for the operation of camp-on cancel relay COC (14) in camp-on control 204. This circuit extends from ground, through a make contact of relay PR (11) through a make contact of relay MC0 (14), over lead 1406, through cable 932, over lead 1406 and through the winding of relay COC (14) to battery.

Relay COC (14), in operating, releases relay PLS (14), thus releasing register priority link circuit 613 from marker 201 as previously described. Relay COC (14) in operating also diverts the operating ground of relay PLS (14) from the winding of relay PLS (14) to lead 1421 and through the winding of route relay R8 (21) to battery, thereby operating route relay R8 (21). Route relay R8 (21) is associated with four-wire tone trunks such as 1905 and 2404. The operation of route relay R8 (21) initiates the establishment of a connection from the calling station 109 to a tone trunk such as 1905. The operations and functions of a tone trunk are fully described in the patent to Busch.

RECORDING OF CALL DATA AT A TANDEM SWITCHING CENTER

The switching system of the present invention may be advantageously used as a large private switching network. During periods of heavy traffic, the trunking facilities provided for the exclusive use of this private network may become overloaded thereby precluding the expeditious completion of urgent calls. In this situation, it is desirable that the private switching network have access to a larger commercial network with larger trunk facilities, and it is for this purpose that the above-mentioned commercial trunk groups are provided. When a call in the private switching network is given access to the larger commercial switching network, it is termed a "spillover" call.

Only certain calls are entitled to spillover. This is determined from an examination and comparison of the class of service of the calling station and the control digit dialed from the calling station, as previously described in the determination of priority and special grade trunk requirements.

Spillover may occur at the switching center in which a call originates, or it may occur at a switching center through which a call is switched. A record must be made of call data pertaining to a call at the switching center in which spillover occurs so that the large commercial switching network can bill the private switching network user for use of the commercial trunking facilities.

It is now assumed that a call from four-wire station 109 in switching center 1 to four-wire station 401 in switching center 3 has been passed to switching center 2 and is to be completed to switching center 3 on a tandem basis. It is further assumed that the class of service of four-wire station 109 and the control digit dialed by the customer at station 109 indicate a priority voice grade call entitled to spillover. This information is passed in the form of a control digit from switching center 1 to four-wire incoming register 813 in switching center 2 as previously described.

A spillover call progresses substantially in the same manner as described for the tandem portion of a priority interoffice call. Translator 906 ascertains from the control digit, class of service information and the called office code those trunk groups which are suitable for the completion of the call. In addition to the above-described direct and alternate trunk groups, a spillover trunk group may now be used, if available, to complete this call.

It is assumed that trunk hunting and switch control 907 has examined the direct and alternate trunk groups, as previously decribed, and failed to locate an idle trunk therein. Trunk hunting and switch control 907 signals route advance control 918 of this condition and route advance control 918 then signals translator 906 to route advance. Translator 906, upon advancing, provides the information required by trunk hunting and switch control 907 in selecting and connecting to a spillover trunk. Translator 906 further signals AMA control 972 that a call data record is required for a spillover call which is being switched through the switching center.

The circuit operations required for the recording of call data at a tandem location are substantially similar to those previously described for the recording of call data at an originating switching center. However, the directory number of four-wire station 109 is not available from four-wire translator 209, since four-wire station 109 is not served by switching center 2. Therefore, the arbitary trunk number assiged to the trunk over which this call entered the tandem switching center is recorded in place of the directory number of a calling station to identifying the call for record purposes.

It is now assumed that the call entered switching center 2 through four-wire voice grade intertoll trunk 605. As previously described, four-wire incoming register 813 has forwarded the control digit, the directory number of called four-wire station 401, a class of trunk indication, the arbitrary number assigned to four-wire voice grade intertoll trunk 605 and the numerical designation, 00, of four-wire trunk link frame 00 (6) on which four-wire voice grade intertoll trunk 605 appears, to call information register 902.

In response to the previously described signal from translator 906, AMA control 972 causes call information register 902 to transfer the arbitrary number of four-wire voice grade intertoll trunk 605 to those leads in cable 946 which are normally used to forward the equipment location of a calling station from call information register 902 through cable 946, through cable 948, through four-wire sender connector 807 and through cable 808, to four-wire sender 806.

As described for the tandem portion of the four-wire priority call, sender control 920 has signaled class of call and linkage control 927 that the call in progress requires the use of a sender and is not terminated locally, and call information register 902 has signaled class of call and linkage control 927 that the call in progress did not originate in switching center 2. Class of call and linkage control 927 combines these two items of information and returns a signal to AMA control 972 indicating that a tandem call data record is required. AMA control 972 now forwards a signal through call information register 902 and through the above-described connection to four-wire sender 806 indicating the call in progress does not terminate locally.

A connection is now established, as previously described, from four-wire sender 806 to transverter 207 (10), through cable 1008, through transverter connector 211 (10) and through cable 1009. The indication that call in progress is not terminted locally and the indication that it is being switched in four-wire network 108 are passed from four-wire sender 806 through the above-described connection to transverter 207 (10) and thence through cable 1011 to type of call detector and control 1007. Other items of call information, including the substitution of the arbitrary number of four-wire voice grade intertoll trunk 605 for the equipment location of a called station, is forwarded, as previously described, from four-wire sender 806 through the above-described connection to transverter 207 (10) and through cable 1010 to call information register and converter 1005.

Type of call detector and control 1007, responsive to the indication received from four-wire sender 806 that the call did not originate locally in switching center 2, cancels the establishment of a connection to a translator such as 209 (10). Instead, a connection is established between call information register and converter 1005 and cut in control 1024, which extends through cable 1030, through type of call detector and control 1007 and through cable 1014. Call information register and converter 1005 then forwards the data to be recorded, including the arbitrary trunk number of four-wire voice grade intertoll trunk 605, through the above-described connection, through cut in control 1024 and through cable 1018, to recorder 212 (10).

The circuit operations involved in the transfer of call information through cut in control 1024 to recorder 212, are substantially similar to those described for the tandem portion of a four-wire priority call. Cut in control 1024 again determines the sequence in which the various items of call data are forwarded to recorder 212 (10) for recording. The identification of four-wire voice grade intertoll trunk 605 by trunk identifier 210 (10) and the passing of this identification to recorder 212 (10) also occurs substantially as previously described. Answer and disconnect entries are made when called four-wire station 401 answers and, subsequently, when calling four-wire station 109 disconnects.

It is to be noted that the call data recording equipment 206 in switching center 1 will record answer and disconnect entries for this call simultaneously with the call data recording equipment of switching center 2. If it is desired to ascertain the directory number of calling four-wire station 109, it may be identified through a comparison of the call data records made in switching center 1 and switching center 2.

Although the circuit operations required for the recording of call data pertaining to a through switched call are similar to those required for the recording of data pertaining to an originating call, certain departures are made to facilitate the recognition by type of call detector and control 1007 that a call has not originated locally, so that the use of a translator, such as 209 (10) is avoided. Further operational departures are made in substituting the arbitrary number of four-wire voice grade intertoll trunk 605 for the equipment location of a calling station.

The call information received by call information register 902 from four-wire incoming register 813 is stored in control digit register 922 (17), called office code register 2101, four-wire class of service register 2102, incoming trunk frame number register 2103, called station numericals register 2104, and incoming trunk number register 2501, as previously described. The class of trunk indication, the control digit and the called office code, are then forwarded from call information register 902 to translator 906, as previously described.

A circuit is completed in translator 906 for the operation of route relay R2 (21), as previously described for the originating portion of a four-wire voice grade interoffice call. Trunk hunting and switching control 907, utilizing the information provided by the operation of route relay R2 (21), examines the trunks, such as four-wire voice grade intertoll trunk 605 (23) and four-wire voice grade intertoll trunk 2406, which comprise the direct trunk group to switching center 3. It is assumed that all trunks within this trunk group are busy. Therefore, a signal is sent from all-trunk busy timing circuit 1802 to route advance control 918 (22) causing the operation of relay RAV1 (22). Relay RAV1 (22), in operating, completes a circuit, not shown, for the operation of relay GS1 (22) in route advance control 918 (22). A circuit is then completed for the operation of route relay R3 (21) extending from ground through a make contact of relay GS1 (22), over lead 2210, through a make contact of route relay R2 (21), through the winding of route relay R3 (21) and through the winding of route series relay MBS (17) to battery.

Trunk hunting and switch control 907 (18, 19, 23) utilizing the information provided through the operation of route relay R3 (21), examines the trunks, such as four-wire voice grade intertoll trunk 2301 and four-wire voice grade intertoll trunk 2408, which comprise the alternate trunk group to switching center 3. It is assumed that all the trunks within the alternate trunk group are busy. Therefore, a second signal is sent from all-trunk busy timing circuit 1802 to route advance control 918 (22), thereby operating relay RAV1 (22) for a second time. The second operation of relay RAV1 (22) completes a circuit, not shown, for the operation of relay GS2 (22) in route advance control 918 (22).

It has been assumed that this call is entitled to spillover. As an indication of this type of treatment, relay IS0 (22) is operated over a circuit extending from battery through the winding of relay IS0 (22) over cross-connection 2215 and through call treatment translator 2201 to ground. Relay IS0 (22) establishes obvious circuits for the operation of screening relays S1 (22), S4 (22), S7 (22), and S6 (22).

The previously described operation of relay GS2 (22) completes a circuit for the operation of route relay R6 (21) which may be partially traced from ground through a make contact of relay GS2 (22), over lead 2211, through a make contact of relay R3 (21), through a make contact of relay S7 (22), through the winding of route relay R6 (21) and through the winding of route series relay MBT9 (21) to battery. Relay MBT9 is also operated over the above circuit, and its function will be described later herein in connection with the recording of call data for a through switched call.

Trunk hunting and switch control 907 (18, 19, 23), utilizing the information provided through the operation of route relay R6 (21), examines the trunks, such as four-wire voice grade intertoll trunk 2304 and four-wire voice grade intertoll trunk 2408, which comprise a spillover trunk group to a commercial switching center which may be used to switch calls to switching center 3. It is assumed that four-wire voice grade intertoll trunk 2304 is idle and that four-wire trunk link frame and connector 00 (29) is not in use by another marker at this time. A connection is then established, in a manner similar to that previously described for the tandem portion of the priority special grade inter-office call, from marker 201 to four-wire voice grade intertoll trunk 2304.

The remaining switching operations performed in switching center 2 to complete the tandem portion of this spillover call occur in a manner substantially the same as the operations performed in completing the tandem portion of a four-wire priority special grade interoffice call.

Relay MBT9 (21), in operating, completed a circuit for the operation of relay AMA (22) in AMA control 972 (22), extending from ground through a make contact of relay MBT9 (21) and through the winding of relay AMA (22) to battery. Relay R6 (21), in operating, completed a circuit for the operation of relay OSG0 (22) in sender control 920 (22), which extends from ground through a break contact of relay GS3 (22), through a make contact of relay R6 (21) and through the winding of relay OSG0 (22) to battery. Relay OSG0 (22), in operating, completes an obvious circuit for the operation of relay SON (22).

As previously described for the tandem portion of the four-wire priority special grade call, relay TAN (17) was operated over a circuit extending from battery through its winding to ground in four-wire incoming register 813. The operation of relays TAN (17) and SON (22), establish a circuit for the operation of relay TOG (22), as previously described. The previously described operations of relays AMA (22) in AMA control 972 (22) and TOG (22) in class-of-call and linkage control 927 (22) complete a circuit for the operation of relays TAM (22) and TOG3 (22) in AMA control 972 (22), extending from ground through a make contact of relay AMA (22), through a make contact of relay TOG (22) and through the windings of relays TAM (22) and TOG3 (22), respectively, to battery. A connection is now established, as previously described, from sender control 920 to four-wire sender 806.

Transverter 207 is now connected, as previously described, through transverter connector 211 to four-wire sender 806. The various items of call information pertaining to the tandem portion of this spillover call are forwarded through this connection.

Relay TOG3 (22), in operating, places ground on lead 2802. This ground is extended through a make contact of relay AMA (22) in AMA control 972 (28), over lead 2802, through cable 979, through sender control 920 (28), through cable 977, through four-wire sender connector 807 (31) and through cable 808 (31) to four-wire sender 806 (31).

As previously described, four-wire sender 806 (31) places ground on lead 3103 which is forwarded through cable 1008 (31), through transverter connector 211 (31), through cable 1009, through cable 1011, over lead 3501 and through the winding of relay 4W (35) to battery, thereby operating relay 4W (35). Four-wire sender 806 (31) then forwards the signal placed on lead 2802 by the operation of relay TOG3 (22) in AMA control 972 (28), from ground in four-wire sender 806 (31), through cable 3102, through cable 1008, through transverter connector 211 (31), through cable 1009, through cable 1011, over lead 3304, through a make contact of relay 4W (35) and through the winding of four-wire tandem relay 4WT (33), thereby operating relay 4WT (33). The operation of relay 4WT (33) is an indication that the call for which data is to be recorded did not originate locally and that the call is being switched in four-wire network 108.

Relay TAM (22) in AMA control 972 (25), in operating, initiates the transfer of the information stored in incoming trunk number register 2501 through cable 2503 to calling station equipment location register 2801.

It is assumed that the arbitrary number assigned to four-wire voice grade intertoll trunk 605 is 187. Therefore, relays HN0 (25), HN1 (25), T1 (25), T7 (25), U0 (25) and U7 (25) in incoming trunk number register 2501 will be operated, as described in the patent to Busch et al. Ground is now applied through a make contact of relay TAM (22), through a make contact of relay HN0 (25) to lead 2504; through a make contact of relay HN1 (25) to lead 2505; through a make contact of relay T1 to lead 2506; through a make contact of relay T7 (25) to lead 2507; through a make contact of relay U0 (25) to lead 2508; and through a make contact of relay U7 (25) to lead 2509. These leads extend through cable 2503 to calling station equipment location register 2801.

The patent to Busch describes the operation of ground transfer lead relay GTL2 (22) in AMA control 972 (22) as the result of the operation of relay AMA (22). Leads 2504, 2505, 2506, 2507, 2508, and 2509 are extended through make contacts of relay GTL2 (22), over leads 2805, 2806, 2807, 2808, 2809, and 2810, respectively, through cable 2815, through cable 946, through cable 948, through four-wire sender connector 807 (31) and through cable 808 to four-wire sender 806 (31). Ground is then forwarded, on similar leads, from four-wire sender 806 (31) through cable 3102, through cable 1008, through cable 1009, through cable 1010, through cable 3106 and over leads 3207, 3208, 3209, 3210, 3211, and 3212, respectively, through make contacts of relay 4WT (33) and over leads 3213, 3214, 3215, 3216, 3217, and 3218, respectively, to cut-in control 1024 (32).

The above-described leads 2805 through 2810 are used on locally originated calls to transfer the equipment location of a calling station from calling station equipment location register 2801 through a selected sender such as 806 to a transverter such as 207, as described in the patent to Busch and the patent to Cahill et al. However, in this embodiment of the present invention, information indicating the arbitrary trunk number assigned to the trunk over which a through-switched call enters a tandem switching center is forwarded over these leads in place of the equipment location of a calling station.

As previously described, the circuit for the operation of a transverter preference relay, such as 4TVP00 (36), extends through a break contact of relay DNK1 (31). As further described previously, a transverter preference relay, such as 4TVP00 (36), initiates the establishment of a connection from transverter 207 (36) to a translator such as four-wire translator 209 (36). However, relay DNK1 (31) is operated for a tandem type of call over a circuit extending from battery, through the winding of relay DNK1 (31) and through a make contact of previously operated relay 4WT (33) to ground. Therefore, no connection is established from transverter 207 (36) to a translator, such as four-wire translator 209 (36).

Since no translator is used, there will be no directory number information stored in directory number register 1004 (36) and, therefore, no directory number information will be passed through cable 1016 (36) as was previously done in the originating portion of a four-wire call.

Type-of-call detector and control 1007 (32, 33, 34, 35) has detected a four-wire tandem type of call, canceled the use of a translator and diverted the leads 3207, 3208, 3209, 3210, 3211, and 3212, which normally extend through cable 1025 (34) to a translator, directly to leads 3213, 3214, 3215, 3216, 3217, and 3218, respectively, which normally are used to forward directory number information from directory number register 1004 (36) to cut-in control 1024 (32, 34). The arbitrary trunk number 187 of four-wire voice grade intertoll trunk 605 has, in this manner, been substituted for the translated directory number of a calling station.

As previously described and as further described in the patent to Cahill et al., the information stored in call information register and converter 1005 and the call data forwarded directly from four-wire sender 806 are sequentially passed by cut-in control 1024 and forwarded for recording to recorder 212.

*Four-Wire Interoffice Call Terminating Portion: Priority—Voice Grade*

The above-mentioned patents to A. J. Busch and to A. J. Busch et al. disclose circuit operations for the completion of a terminating portion of an interoffice call. Frequent reference thereto will be made herein below.

It is now assumed that FIGS. 5 through 10 represent switching center 3. It is further assumed that a call originated by four-wire station 109 of switching center 1 to four-wire station 401 of switching center 3 has been switched by switching center 1 to four-wire voice grade intertoll trunk 605, through which the call enters switching center 3. It is also assumed that a control digit is forwarded from switching center 1 to switching center 3 indicative of an urgent call requiring priority treatment.

In a manner substantially similar to that described in the patent to A. J. Busch et al., four-wire voice grade intertoll trunk 605 is seized as a result of the originating portion of this call at switching center 1. A connection is established, as previously described for the tandem portion of a four-wire interoffice call, from four-wire voice grade intertoll trunk 605 to a selected four-wire incoming register such as 813. This connection extends through cable 625, through a crosspoint for four-wire incoming register link 816 and through cable 827 to four-wire incoming register 813. The control digit, the directory number of called four-wire station 401, the class of trunk, and the number of the trunk link frame on which four-wire voice grade intertoll trunk 605 appears are now received and stored by four-wire incoming register 813.

A connection is established from four-wire incoming register 813 to marker 201 (9), in a manner similar to that previously described, over which information stored in four-wire incoming register 813 is forwarded to call information register 902 of marker 201. A four-wire network indication is also forwarded, as previously described, from four-wire incoming register 813 to network detector and control 901.

The class of trunk indication and the control digit are forwarded from call information register 902 to translator 906 where they are combined and translated to indicate the type of call treatment to be provided for this call. The office code is also transferred from call information register 902 to translator 906.

As a result of the above-mentioned translations, translator 906 indicates that the call in progress is a locally terminating call entitled to priority treatment which is directed to a station served by four-wire network 108. This information is passed from translator 906 to number group control 926 through cable 945, to sender control 920, through cable 944, to priority control 205 (9), through cable 964, and to class of call and linkage control 927 through cable 951.

As previously described for the tandem portion of a four-wire interoffice call, call information register 902 forwards a class of trunk indication to class of call and linkage control 927 through cable 940. As a result of the class of trunk indication from call information register 902 and the local terminating call indication from translator 906, class of call and linkage control 927 forwards a signal to number group control 926 through cable 952 indicating that the use of a number group circuit such as 818 is required for the translation of the numericals of the called station directory number into the equipment location of the called station.

Number group control 926 then combines the four-wire terminating call indication received from translator 906 with the number group required indication received from class of call and linkage control 927 and initiates the establishment of a connection from call information register 902 to four-wire number group circuit 818. An initial control connection is established from number group control 926 through cable 954 and over lead 956 to four-wire number group connector 817, which is used to select a proper four-wire number group circuit, such as 818. The actual translation connection is then established from call information register 902 through cable 936, through cable 967, through four-wire number group connector 817 and through cable 831 to four-wire number group circuit 818.

The circuit operations involved in the transfer of the directory number of a called station, such as 401, from a marker, such as 201, to a number group circuit, such as 818; the translation thereof into the equipment location of the called station; and the return of this equipment location information from a number group circuit, such as 818, to a marker, such as 201, is fully described in the patent to Busch and will not be detailed herein. The equipment location of called four-wire station 401 is received and stored in call information register 902.

As described in the aforementioned patent to Busch, a connection is now established from marker 201 to the appearance 626 of four-wire station 401 on four-wire line link frame and connector 19 (6) over which a test is made of called four-wire station 401 for a busy condition.

Four-wire voice grade intertoll trunk 605 is permanently associated through cable 627 with an individual appearance on four-wire switchboard 611. Associated with this appearance at switchboard 611 are three lamps for signalling the operator at the switchboard. A first lamp is provided to indicate a call directed to the operator; a second lamp is provided to indicate that a called station desires the services of the operator; and a third lamp is provided to indicate that the assistance of an operator is required to complete a priority call.

The priority call indication, forwarded by translator 906 to priority control 205 (9), is forwarded to four-wire voice grade intertoll trunk 605 through cable 968, through cable 969, through cable 939, through cable 933, through four-wire trunk link frame and connector 00 (6), and through cable 628. The above traced connection will be used to forward all control signals originated from priority control 205 (9) to four-wire voice grade intertoll trunk 605.

Called Station Busy

It is now assumed, for purposes of description, that called four-wire station 401 is presently in use for another call. Therefore, the above-mentioned line busy test performed by marker 201 (9) will result in the detection of a busy line. This information is forwarded by priority control circuit 205 (9) through the above traced signaling connection to four-wire voice grade intertoll trunk 605.

In response to the line busy signal received by four-wire voice grade intertoll trunk 605 from priority control 205 (9), a signal is initiated from four-wire voice grade intertoll trunk 605 through cable 627 to cause the priority lamp at four-wire switchboard 611 to be operated, thereby indicating that the assistance of an operator is required in completing a priority call. As a further result of the line busy signal, four-wire voice grade intertoll trunk 605 establishes a connection from its appearance on four-wire switchboard 611, through cable 627 and over four-wire voice grade intertoll trunk 605 to the calling customer at four-wire station 109 in switching center 1.

In a manner well known to one skilled in the art an operator at four-wire switchboard 611 may then ascertain from the calling customer at four-wire station 109 the directory number of the desired four-wire called station such at 401, may verify that the called station is busy, may monitor the call for which the called station is being used and may request the customer using four-wire station 401 to disconnect so as to receive the waiting urgent call.

Figure 27:
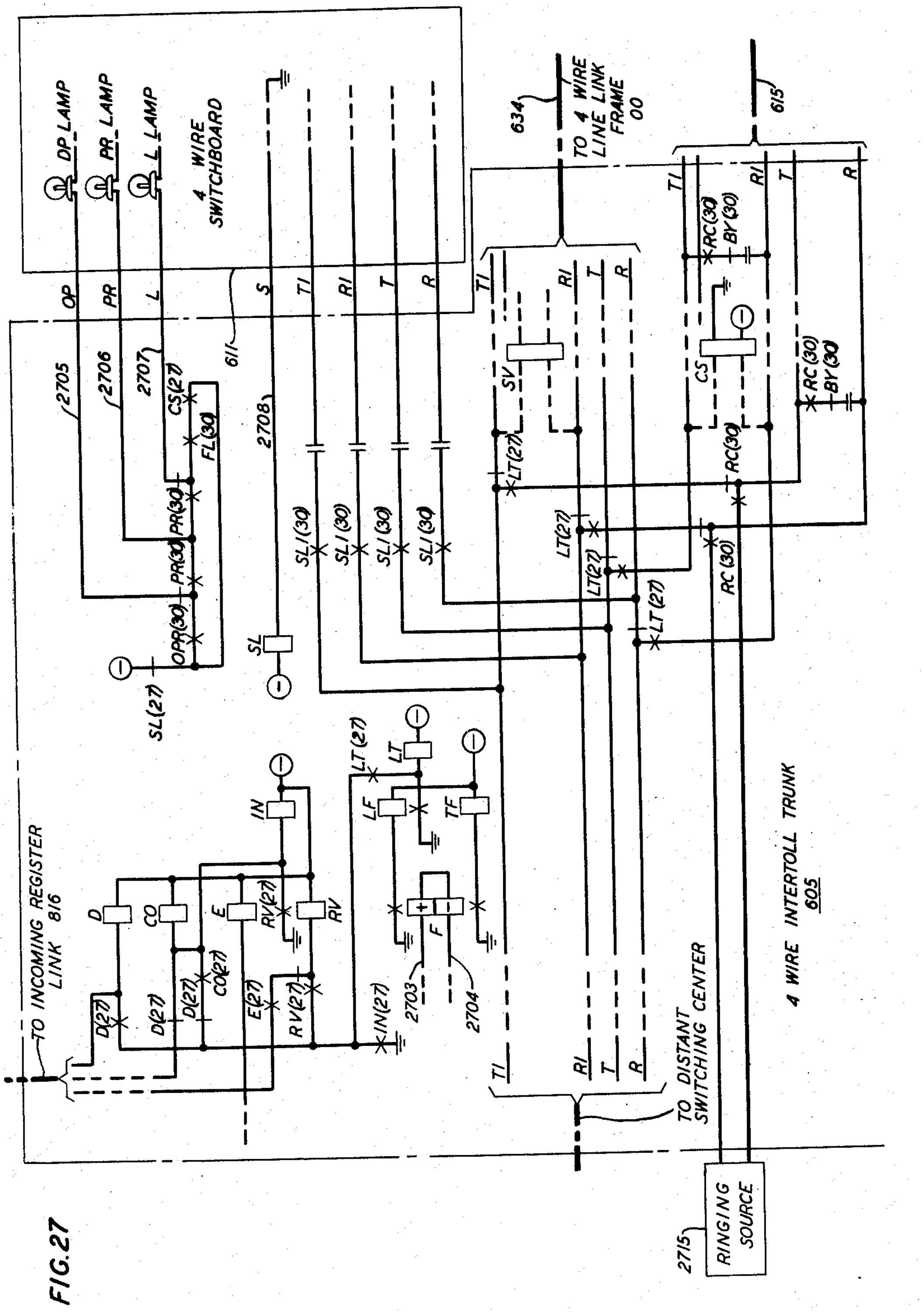
Figure 28:
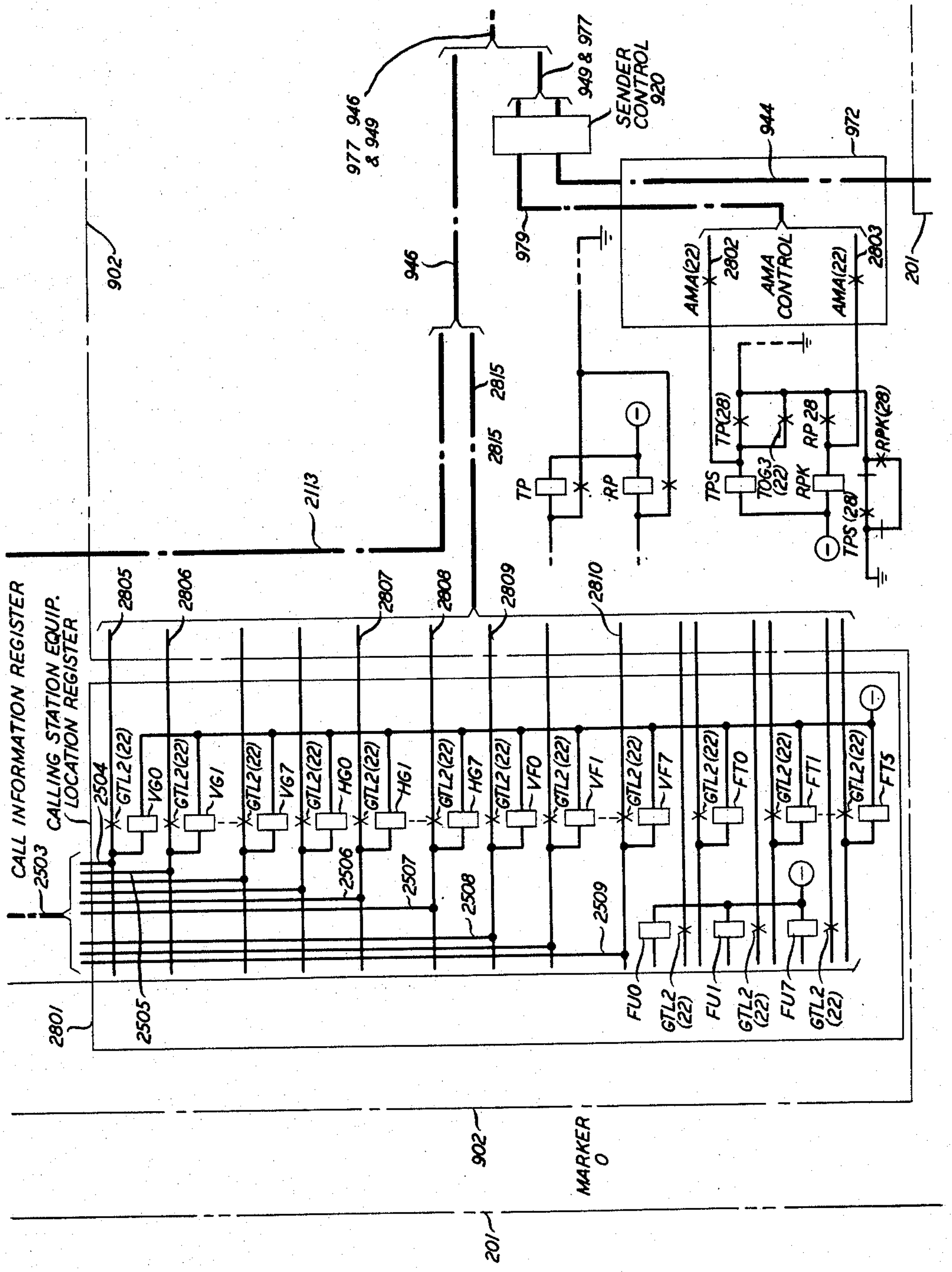
Figure 29:
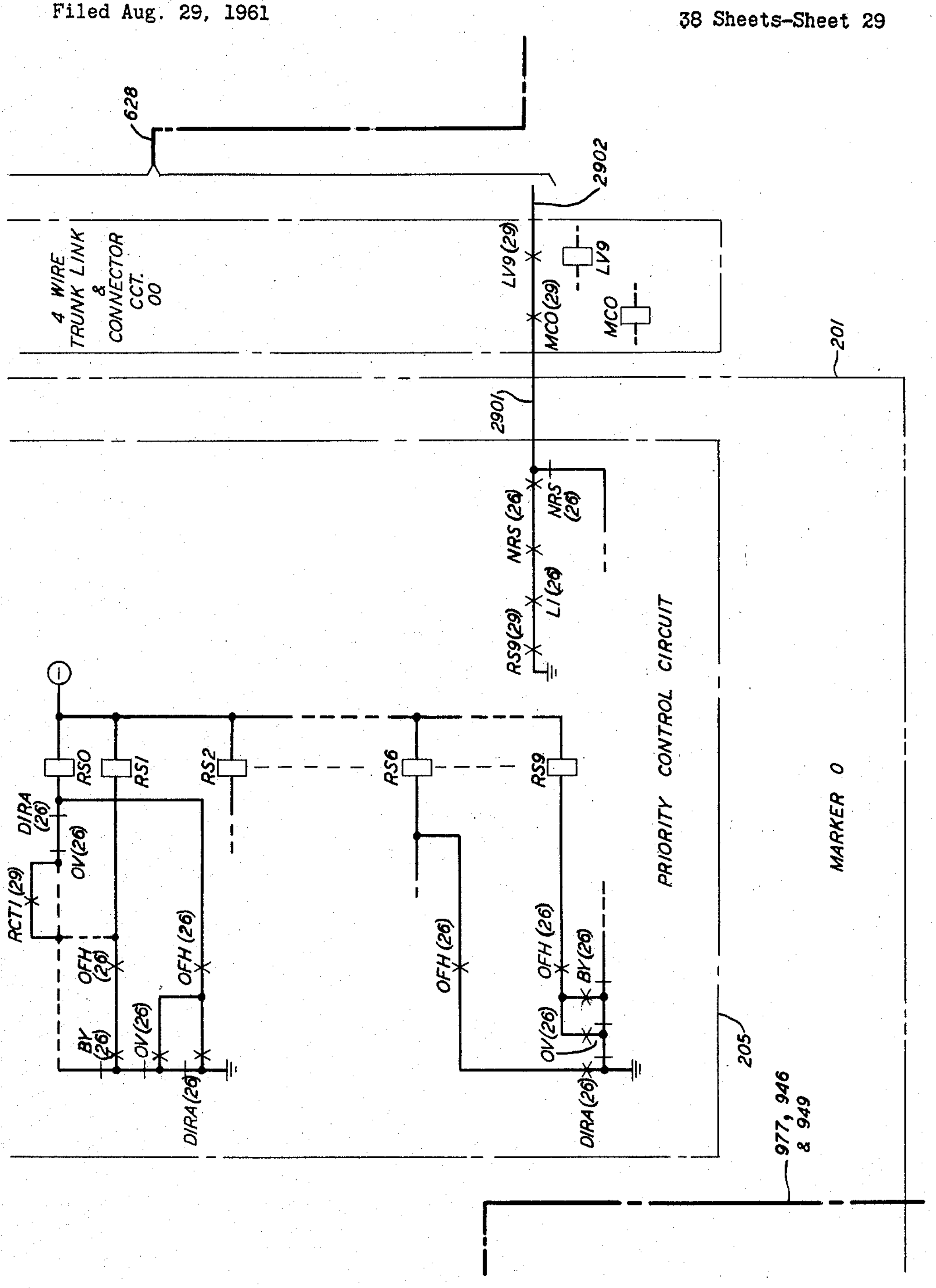
Figure 30:
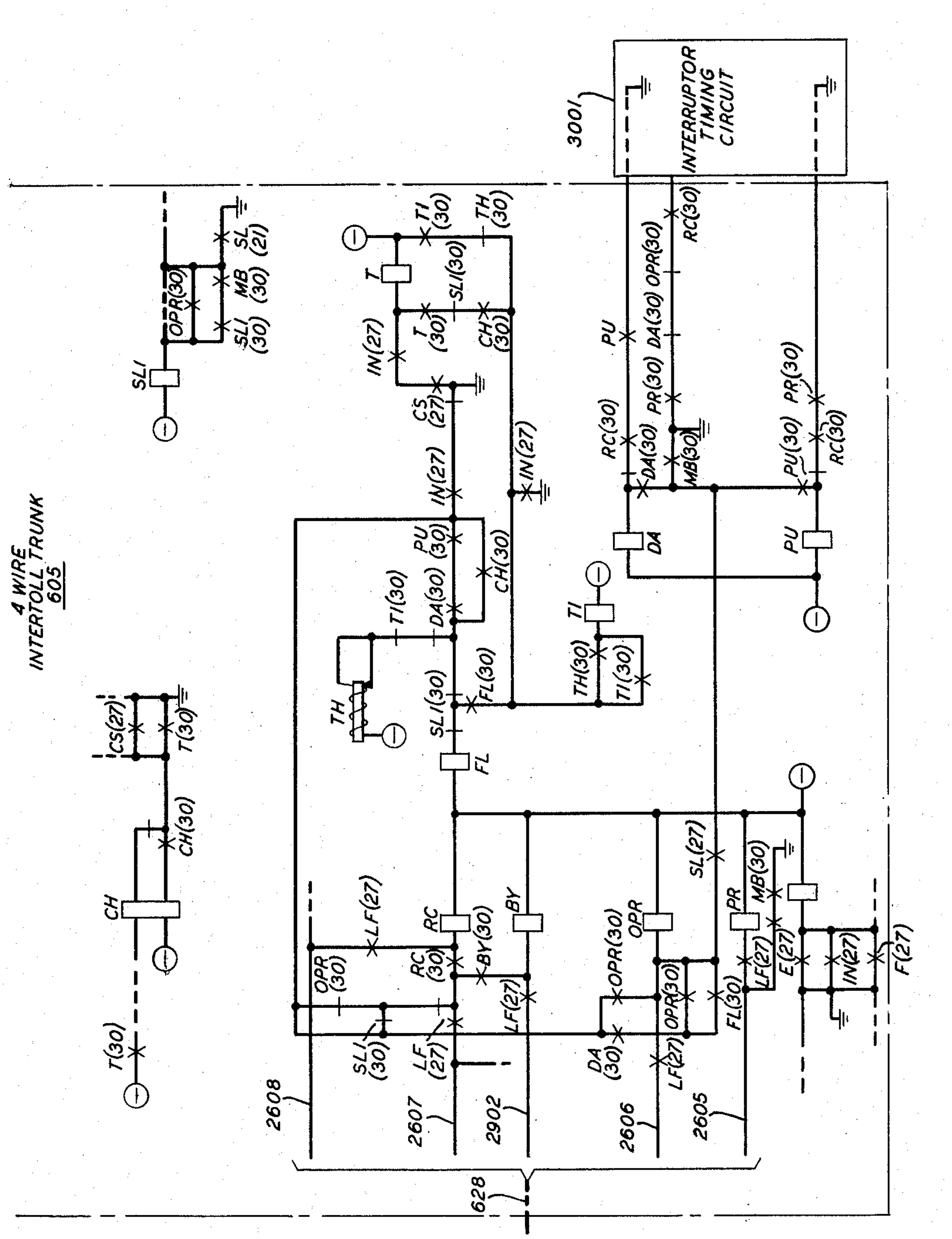
Figure 31:
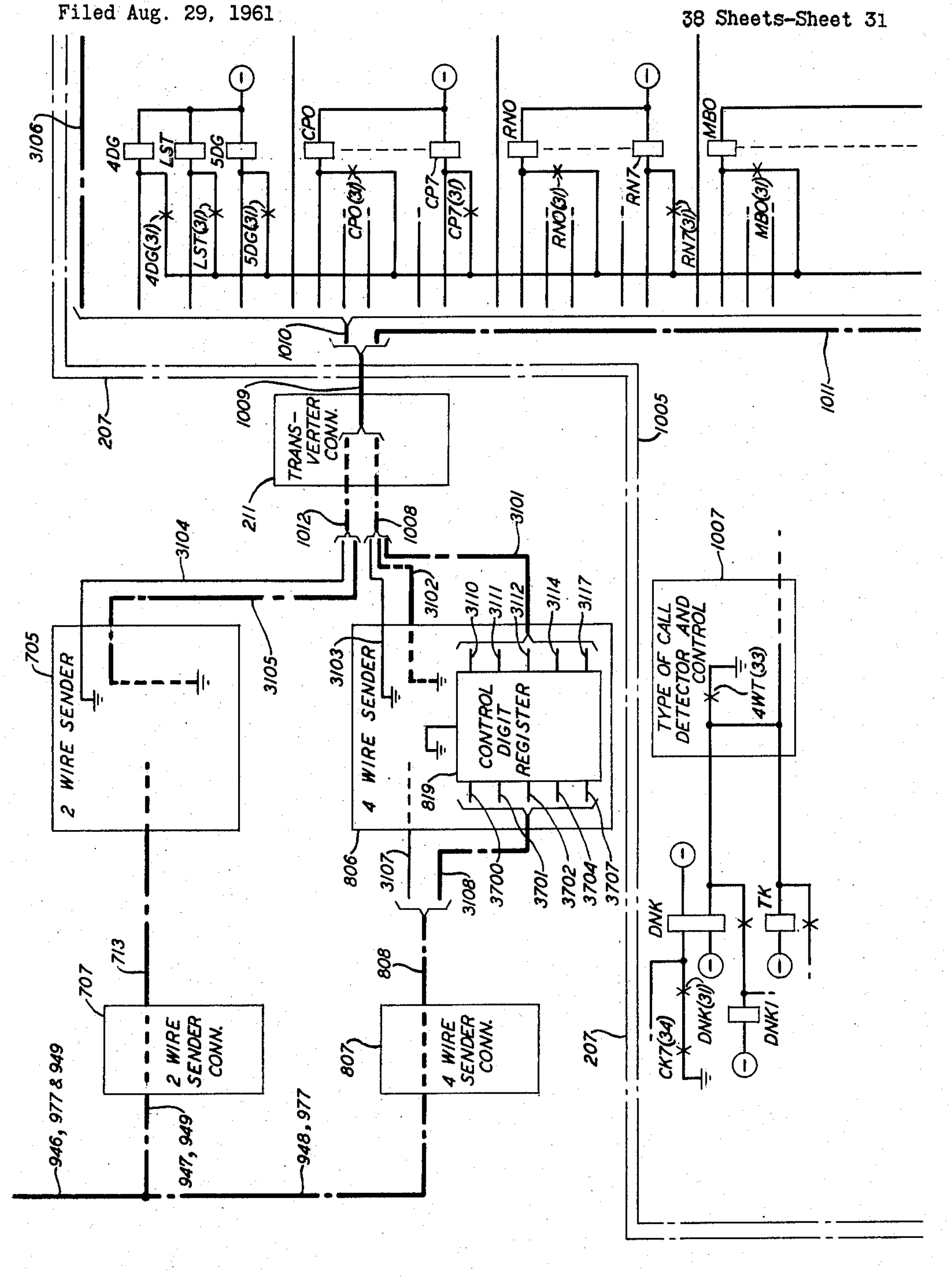

The intertoll trunk 605, portions of which are detailed in FIGS. 27 and 30, operates in a manner substantially similar to the incoming trunk described in the patent to Busch et al. when used in the terminating portion of an interoffice call. A detailed description of the seizure of four-wire voice grade intertoll trunk 605 will therefore not be included herein.

The patent to Busch et al. further describes the circuit operations for establishing a connection from an incoming trunk to an incoming register through an incoming register link. Therefore, the circuit operation details in the establishment of a connection from four-wire voice grade intertoll trunk 605 to four-wire incoming register 813 will not be described herein. The receipt and registration by four-wire incoming register 813 of the previously mentioned arbitrary trunk number, trunk class indication, trunk frame number and called station directory number are also fully described in the patent to Busch et al. It is therefore assumed that this priority call has progressed, as previously described for a tandem priority call, through the establishment of a connection from four-wire incoming register 813 to call information register 902 and network detector and control 901, and that the pertinent call information has been stored therein.

The class of trunk indication is forwarded, as previously described, from four-wire class of service register 2102 through cable 2107 to call treatment translator 2201. The control digit is forwarded, as previously described, from control digit register 922 (21) to call treatment translator 2201. A translation performed by call treatment translator 2201 results in the operation of relay P (22) over a circuit extending from battery through the winding of relay P (22), over cross-connection 2216 and through call treatment translator 2201 to ground.

The operation of relay P (22) establishes circuits for the operation of screening relays S1 (22), S3 (22), S8 (22), and S5 (22), which extend from battery through the windings of the respective relays and through make contacts of relay P (22) to ground. A further circuit is established through the operation of relay PR1 (26) in priority control circuit 205 (26), which extends from battery through the winding of relay PR1 (26), over lead 2217 and through a make contact of relay P (22) to ground.

The office code of the directory number of called four-wire station 401, is forwarded, as previously described, from called office code digit register 2101 to four-wire office code translator 2106. A translation is performed, as previously described, by four-wire office code translator 2106 which results in ground being placed on one-out-of-one thousand outputs of four-wire office code translator 2106. Since the office code passed to four-wire office code translator 2106 is the office code of switching center 3, this ground will be extended over lead 2116, which is associated with calls terminating locally in switching center 3. A circuit is thereby completed for the operation of relay LPB (21), which extends from battery through the winding of relay LPB, over lead 2116, through four-wire office code translator 2106, over lead 1706 and through a make contact of relay 4W (17) to ground.

It is to be noted that relay LPB (21) is associated with local terminating calls directed to four-wire stations in switching center 3, and that relay LPA (17) is associated with locally terminating calls directed to two-wire stations served by switching center 3. Therefore, the operation of relay LPB (21) provides an indication that the call in progress is a four-wire locally terminating call.

Relay TAN (17) has been operated in call information register 902 (17), as previously described for the tandem portion of a four-wire interoffice call. The operation of relay TAN (17) in call information register 902 (17), and the operation of relay LPB (21) in translator 906 (21), complete a circuit for the operation of terminating call relay TER (22) in class of call and linkage control 927 (22). This circuit may be traced from battery through the winding of relay TER (22), through a make contact of relay TAN (17) and through a make contact of relay LPB (21) to ground.

Relay LPB (21) in operating, establishes a circuit for the operation of relay NSS1 (20) in number group control 926 (20), which extends from ground through a make contact of relay LPB (21) and through the winding of relay NSS1 (20) to battery.

The operation of relay NSS1 (20) provides an indication that the use of a four-wire number group circuit, such as 818 (20) is required to translate the directory number of called four-wire station 401, as received and stored in called station numericals register 2104, into the equipment location of the line link frame appearance 626 of called four-wire station 401. The patent to Busch fully describes the seizure of an appropriate number group circuit, the translation therein of a directory number into an equipment location and the return of the result of this translation to a marker. Details of these operations will therefore not be given herein. However, a brief description of operations pertinent to this invention is given below.

Relay TER (22) in operating, completes a circuit for the operation of relay FLG (22), which extends from ground through a make contact of relay TER (22) through a break contact of relay LK1 (22) and through the winding of relay FLG (22) to battery. Relay FLG (22), in operating, completes an obvious circuit for the operation of relays SNG1 (20) and SNG2 (20) in number group control 926 (20).

As described in the Busch patent, the operation of relays SNG1 (20) and SNG2 (20) initiate the establishment of a connection from a marker to a number group circuit. A circuit is completed for the operation of marker preference relay MP0 (20) in four-wire number group connector 817 (20), which extends from battery through a make contact of relay TLC1 (23), through a make contact of relay TFK1 (23), through a make contact of relay SNG2 (20), through called station numericals register 2104, over lead 2117, through a make contact of relay NSS1 (20) and through the winding of relay MP0 (20) in four-wire number group connector 817 (20) to ground.

The operation of relay MP0 (20) in four-wire number group connector 817 (20) initiates circuit operations in four-wire number group connector 817 (20) which are fully described in the Busch patent, and which establish a connection from called station numericals register 2104 through cable 2115, through cable 2007, through four-wire number group connector 817 (20) and through cable 2008 to four-wire number group circuit 818 (20).

As described in the patent to Busch, the hundreds, tens, and units digits of the called station numericals are forwarded through this connection from called station numericals register 2104 to four-wire number group circuit 818 (20). This information is then translated by four-wire number group circuit 818 (20) into the equipment location of called four-wire station 401 and returned through cable 2009, through four-wire number group connector 817 (20), through cable 2010 and through cable 2005 to called station equipment location register 2105, in which it is stored.

A connection is now established from marker 201 to the appearance 626 of four-wire station 401 on four-wire line link frame and connector 19 (6). The circuit operations required for the establishment of this connection are fully described in the patent to Busch. As further described in the Busch patent, a test is made by marker 201 of four-wire station 401 through its appearance 626 to ascertain whether or not four-wire station 401 is busy. It is assumed that four-wire station 401 is presently in use for another call, and, therefore, as described in the Busch patent, relay LB (26) in priority control circuit 205 (26) will be operated.

The operation of relay LB (26) completes a circuit for the operation of relay BY (26), which may be partially traced from ground through a make contact of relay LB (26), through a make contact of relay TER (22) and through the winding of relay BY (26) to battery. The operation of relay BY (26) completes a circuit for the operation of relay DIRA (26), which extends from ground through a make contact of relay 4W (17), through a make contact of relay TER (22) through a make contact of relay PRI (26), through a make contact of relay BY (26) and through the winding of relay DIRA (26) to battery. An obvious circuit has been completed for the operation of relay NRS (26) from ground through a make contact of relay 4W (17) and through the winding of relay NRS (26) to battery. A further circuit is completed through the operation of relay BY (26) for the operation of relay OFH (26) extending from ground through a make contact of relay BY (26) and through the winding of relay OFH (26) to battery.

A connection has been established from marker 201 (9) to four-wire voice grade intertoll trunk 605, under the control of trunk hunting and switch control 907, as described in the patent to Busch et al. The information required by trunk hunting and switch control 907 to select and connect to four-wire trunk link frame 00 (6), on which four-wire voice grade intertoll trunk 605 appears, is supplied by incoming trunk frame number register 2103, which received the numerical designation of four-wire trunk link frame 00 (6), as previously described, from four-wire incoming register 813. The circuit operation details of the establishment of this connection are fully described in the patents to Busch, and Busch et al. This connection extends from four-wire voice grade intertoll trunk 605, through cable 628, through four-wire trunk link frame and connector 00 (6), through cable 933, through cable 939 and through cable 911 to trunk hunting and switch control 907.

Four-wire trunk link frame and connector 00 (26 and 29) contains marker connector relays, such as MC0 (29), and connector relays, such as LV9 (29), the operations of which are fully described in the Busch patent. The above-mentioned connection from four-wire voice grade intertoll trunk 605 to trunk hunting and switch control 907 extends through make contacts of these relays. A further connection is established, through the operation of these connector relays, from four-wire voice grade intertoll trunk 605 to priority control 205 (9) extending through cable 933, through cable 939, through cable 969 and through cable 968. This connection includes leads such as 2601, 2602, 2603, 2604 and 2901, which are used to forward signals, indicating the results of various tests made by marker 201 of the called station 401, from priority control 205 (26 and 29) to intertoll trunk 605 (30).

The patent to Busch, et al. describes the circuit operations which occur in a trunk upon the establishment of the above-mentioned connection thereto from a marker. Briefly, the upper or lower winding of relay F (27) is operated from the marker 201. The energizing of the upper winding of relay F (27) is an indication that the call in progress will terminate locally, and the energization of the lower winding of relay F (27) is an indication that the call in progress will not terminate locally, but will be switched through the switching center on a tandem basis. Since the instant call does terminate locally, the upper winding of relay F (27) will be energized, and the contacts associated therewith will operate.

A circuit is then completed for the operation of relay LF (27), extending from ground through a make contact of relay F (27) and through the winding of relay LF (27) to battery. Relay LF (27), in operating, completes an obvious circuit for the operation of relay LT (27), which is held operated through its own make contact and through a make contact of relay IN (27) to ground. The operations of relays D (27), C0 (27), E (27), RV (27) and IN (27) are fully described in the patent to Busch, et al. Relay MB (30) operates as a result of any off normal condition in intertoll trunk 605 (30), such as the operation of relay E (27), F (27) or IN (27).

A circuit has now been completed for the operation of relay OPR (30) in intertoll trunk 605 (30). This circuit extends from battery through the winding of relay OPR (30), through a make contact of relay LF (27) over lead 2606, through cable 628, over lead 2606 through a make contact of relay LV9 (29), through a make contact of relay MC0 (29), over lead 2602 and through a make contact of relay DIRA (26) to ground. A circuit has also been established for the operation of relay PR (30) which extends from battery through its winding, through a make contact of relay LF (27), over lead 2605, through cable 628, over lead 2605, through a make contact of relay LV9 (29) through a make contact of relay MC0 (29), over lead 2601 and through a make contact of relay PRI (26) to ground.

The operation of relays OPR (30) and PR (30) completes a circuit for the application of battery to PR lamp (27) in four-wire switchboard 611 (27). This circuit extends from battery through a break contact of relay SL (27), through a make contact of relay OPR (30), through a make contact of relay PR (30) and over lead 2706 to PR lamp (27) in switchboard 611 (27). In a manner well known in the art, PR lamp (27) is lighted as a signal to the operator that her assistance is required for a call waiting on four-wire intertoll trunk 605.

In a manner also known in the telephone art, when the operator at four-wire switchboard 611 (27) answers the above-described signal, ground is placed on the sleeve lead 2708 extending from the jack (not shown) associated with four-wire intertoll trunk 605 (27). This ground is extended over sleeve lead 2708 through the winding of relay SL (27) to battery, thereby operating relay SL (27). Relay SL (27), in operating, removes battery from lead 2706, thus extinguishing the PR lamp (27) at four-wire switchboard 611 (27). The operation of relay SL (27) also completes a circuit for the operation of relay SL1 (30), extending from ground through a make contact of relay SL (27), through a make contact of relay OPR (30) and through the winding of relay SL1 (30) to battery.

The operation of relay SL1 (30) cuts through four leads, T1 (27), R1 (27), T (27) and R (27), which comprise the four-wire talking path of four-wire intertoll trunk 605 (27), to four-wire switchboard 611 (27).

The operator at four-wire switchboard 611 (27) is now able to converse with the customer at calling four-wire station 109 in switching center 1, and to determine the station he desires to reach. As previously described, the operator may now assist in the completion of this urgent call.

Called Station Fails to Answer

It is now assumed that called four-wire station 401 is not being used for another call, and therefore that a line idle condition was detected by marker 201 when the line busy test was made.

A connection is then established, in a manner similar to that described in the patent to Busch for an incoming call, from the appearance 626 of called four-wire station 401 on four-wire line link frame 19 (6) to the appearance 615 of four-wire voice grade intertoll trunk 605 on four-wire trunk link frame 00 (6) through link 604. As further described in the Busch patent and in a manner well known in the art, four-wire station 401 is signaled that a call is directed thereto.

The circuit operations following the establishment of the connection from an incoming trunk to a called station are fully described in the patent to Busch and will not be detailed herein. In brief, however, the marker 201 is released as well as the other equipment used for completing the call such as four-wire incoming register 813 and four-wire incoming register link 816. The control of the call is assumed by the incoming trunk, such as four-wire voice grade intertoll trunk 605.

In a manner well known in the telephone art, a timing circuit is provided for four-wire voice grade intertoll trunk 605 (30) which is enabled upon the commencement of signaling to called four-wire station 401. If four-wire station 401 responds to the signals and answers the waiting call this circuit is disabled. If, however, no response is forthcoming from four-wire station 401 within a predetermined length of time, four-wire voice grade intertoll trunk 605 initiates a signal, as described for the line busy condition, through cable 627 to four-wire switchboard 611 which causes the priority lamp at the switchboard position to be lighted.

As previously described, the talking circuit from calling four-wire station 109 is connected by four-wire voice grade intertoll trunk 605 through cable 627 to the trunk appearance on four-wire switchboard 611. An operator upon answering a priority call may then assist in the completion of this priority call by locating the desired person to whom the call is directed.

It is now assumed that, as a result of the previously described line busy test performed by marker 201, line idle relay LI (26) is operated. The circuit operations required for the operation of relay LI (26) are fully described in the patent to Busch and will not be detailed herein. However, relay RCT1 (29) was operated and held operated as fully described in the patent to Busch.

Since station 401 was found idle by marker 201, relays BY (26) and DIRA (26) have not been operated. However, relay NRS (26) is operated from ground through a make contact of relay 4W (17) and through the winding of relays NRS (26) to battery. As an indication that the called line was found to be idle, relay RS0 (29) is now operated over a circuit, which may be partially traced from battery through its winding, through a break contact of relay DIRA (26), through a break contact of relay 0V (26), through a make contact of relay RCT1 (29), through a break contact of relay BY (26), through a break contact of relay 0V (26) and through break contact of relay DIRA (26) to ground.

A circuit is now completed for the operation of relay RC (30) in four-wire intertoll trunk 605 (30). This circuit extends from battery through the winding of relay RC (30), through a make contact of relay LF (27), over lead 2608, through cable 628, over lead 2608, through a make contact of relay LV9 (29), through a make contact of relay MC0 (29), over lead 2604, through a break contact of relay TOG (22), through a break contact of relay SOG (22), through the upper winding of relay RCK (26), through the lower winding of relay RCK (26), through a make contact of relay LI (26), through a make contact of relay FLG (22), through a make contact of relay NRS (26) and through a make contact of relay RS0 (20) to ground. As described in the Busch patent, the resistance of the windings of relay RCK (26) is such that relay RC (30) cannot operate, but relay RCK (26) does operate if the circuit is properly closed, and closes an obvious circuit for operating relay RCK1 (26). With relay RCK1 (26) operated, a shunt is closed around the lower winding of relay RCK (26) through a make contact of relay RCK1 (26) thereby reducing the resistance in series with the winding of relay RC (30) sufficiently to permit relay RC (30) to operate. Relay RC (30) is then held operated over a circuit extending from battery through its winding, through a make contact of relay RC (30), through a make contact of relay LF (27), over lead 2607, through cable 628, over lead 2607, through a make contact of relay LV9 (29), through a make contact of relay MC0 (29), over lead 2603, through a make contact of relay LI (26) and through a make contact of relay TER (22) to ground.

Upon the operation of relay RC (30), marker 201 is released, ringing is applied to called four-wire station 401 from ringing source 2715 and the control of the call is assumed by four-wire intertoll trunk 605. These operations are fully described in the patent of Busch et al.

As a further consequence of the operation of relay RC (30), interrupter timing circuit 3001 is enabled over a circuit extending from ground through a make contact of relay PR (30), through a break contact of relay DA (30), through a break contact of relay OPR (30) and through a make contact of relay RC (30).

Interrupter timing circuit 3001 comprises a timing circuit which is enabled when ringing is applied to a called station, and disabled when the called station answers. Such timing circuits are well known in the telephone art and no details will therefore be given herein.

As described in the patent to Busch et al., the release of marker 201 releases relay F (27) and relay LF (27). Ringing control relay RC (30) is now held operated over a circuit extending from battery through its winding, through a make contact of relay RC (30), through a break contact of relay LF (27), through a break contact of relay SL1 (30), through a make contact of relay IN (27) and through a break contact of relay CS (27) to ground.

Upon enablement, interrupter timing circuit 3001 extends ground through a make contact of relay PR (30), through a make contact of relay RC (30), through a break contact of relay PU (30) and through the winding of relay PU (30) to battery, thereby operating relay PU (30). When a predetermined length of time has passed since the operation of relay RC (30), ground is extended by interrupter timing circuit 3001 through a make contact of relay PU (30) through a make contact of relay RC (30), through a break contact of relay DA (30) and through the winding of relay DA (30) to battery, thereby operating "don't answer" relay DA (30).

The operation of relay DA (30) completes a circuit for the operation of relay OPR (30), which extends from battery through its winding, through a make contact of relay DA (30), through a make contact of relay IN (27) and through a break contact of relay CS (27) to ground.

As previously described for the called station busy condition, the operation of relay OPR (30) places battery on lead 2706, thereby light PR lamp (27) at four-wire switchboard 611 (27). Ground is again applied to lead 2708 when the operator responds to the PR lamp indication, thereby operating relay SL (27). Relay SL (27), in operating, completes an obvious circuit for the operation of relay SL1 (30). Relay SL1 (30), in operating, releases the previously described holding circuit for relay RC (30), thereby removing ringing from called station 401 and cuts through the four leads, T1 (27), R1 (27), T (27), and R (27), which comprise the talking circuit of four-wire intertoll trunk 605 (27), to an associated jack appearance at switchboard 611 (27).

The operator is now able to converse with the customer at calling four-wire station 109 and to assist in the completion of his urgent call as previously described.

CALLED STATION FLASH

It is now assumed that a connection has been established from four-wire voice grade intertoll trunk 605 to four-wire station 401, thereby completing the connection from calling four-wire station 109, in switching center 1 to called four-wire station 401 in switching center 3. It is further assumed that the person answering the call at four-wire station 401 informs the customer who initiated the call at four-wire station 109 that the person to whom the call was directed may be reached at four-wire station 402. The calling customer at station 109 now requests that he be transferred to station 402 in order to reach the person to whom his call was directed.

The person answering the call at four-wire station 401 now depresses the switch hook of his instrument, thereby signaling four-wire voice grade intertoll trunk 605 that the assistance of an operator is required. In response, four-wire voice grade intertoll trunk 605 initiates a signal through cable 627, which causes the priority lamp at four-wire switchboard 611 to be lighted.

In a manner well known in the art, the operator may now initiate a call from four-wire switchboard 611 to the desired four-wire station 402. Upon the establishment of a connection from four-wire switchboard 611 to four-wire station 402, the operator may connect the switchboard appearance of four-wire voice grade intertoll trunk 605 to four-wire station 402 by means of a switchboard cord circuit, thereby completing the priority call to the person to whom it was directed.

It is now assumed that this call has been completed in a normal manner as described in the patent to Busch et al. to four-wire station 401. It is further assumed that, upon talking to the person answering the four-wire station 401, the customer at calling station 109 requests to be transferred to another station, such as 402. The person at four-wire station 401 momentarily depresses the station switch hook thus releasing relay CS (27).

The operation of relay CS (27) is described in the patent to Busch et al. The operating circuit of relay CS (27) extends from ground, through its upper winding, over the tip side of the connection to four-wire station 401, through make contacts of the switch hook (not shown) of four-wire station 401, back through the ring side of the connection to station 401 and through the lower winding of relay CS (27) to battery. The momentary opening of the switch hook contacts at four-wire station 401, therefore, momentarily releases relay CS (27).

The operation of relay CH (30) is fully described in the patent to Busch and will not be detailed herein. However, relay CH (30) is operated, as described in the Busch patent, following the operation of relay CS (27) in response to an answer indication from called four-wire station 401.

The above-described momentary depression of the switch hook at four-wire station 401 momentarily releases relay CS (27), thereby completing a circuit for the operation of flash relay FL (30). This circuit extends from battery through the winding of relay FL (30), through a break contact of relay SL1 (30) through a break contact of relay FL (30) through a make contact of relay CH (30) through a make contact of relay IN (27) and through a break contact of relay CS (27) to ground.

When the customer at four-wire station 401 allows the switch hook of this instrument to return to normal, relay CS (27) again operates over the station loop. However, relay FL (30) is held operated over a circuit extending from battery through its winding, through a break contact of relay SL1 (30), through a make contact of relay FL (30) and through a make contact of relay IN (27).

A circuit is now completed for the application of battery to lead 2706, extending from battery through a break contact of relay SL (27) through a make contact of relay CS (27) through a make contact of relay FL (30) through a make contact of relay PR (30) and over lead 2706 to the PR lamp (27) at four-wire switchboard 611 (27).

As previously described, when the operator at four-wire switchboard 611 (27) responds to the indication given by the PR lamp (27), relay SL (27) is operated over lead 2708. Relay SL (27), in operating, completes a circuit for the operation of relay SL1 (30), thereby cutting through the talking circuit of four-wire intertoll trunk 605 (27); extinguishing the PR lamp (27); releasing relay FL (30); and completing a circuit for the operation of relay OPR (30), which extends from battery through the winding of relay OPR (30), through a make contact of relay SL (27) and through a make contact of relay MB (30) to ground.

The operator at four-wire switchboard 611 (27) may now ascertain verbally the station to which the customer at the calling four-wire station 109 desires to be transferred, and may effect his transfer thereto through four-wire switchboard 611 (27) as previously described.

DISCONNECTION

If the customer at called four-wire station 401 disconnects first, relay CS (27) releases, permitting relay TH (30) to heat over a circuit extending from battery through the winding of thermal relay TH (30), through a break contact of relay T1 (30), through a break contact of relay DA (30), through a make contact of relay CH (30), through a make contact of relay IN (27) and through a break contact of relay CS (27) to ground. After approximately a 0.8 second delay, relay TH (30) operates, thereby operating relay T1 (30) over a circuit extending from battery through the winding of relay T1 (30) and through a make contact of relay IN (27) to ground. Relay T1 (30) is held operated through its own make contact and through a make contact of relay IN (27) to ground. Relay T1 (30), in operating, further de-energizes relay TH (30), which cools and, in approximately two seconds, releases, thereby shunting the winding of relay T (30).

Relay T (30) was operated as a result of the initial operation of relay CS (27) when an answer signal was received from called four-wire station 401. When the winding of relay T (30) is shunted, as described above, relay T (30) is released. The release of relay T (30) initiates the circuit operations required for a called station disconnect, as described in the patents to Busch and Busch et al. The purpose of delaying the release of relay T (30) under the control of relays TH (30) and T1 (30) is to prevent a momentary switch hook flash, which is used to signal an operator at four-wire switchboard 611 (27), from being forwarded to the originating switching center 1 as a disconnect signal.

If the calling four-wire station 109 disconnects first, the talking circuits are released in a manner substantially similar to that described in the Busch, and Busch et al. patents.

*Non-Priority Called Station Flash*

It is assumed that a non-priority call has been directed to four-wire station 401 and that the customer at four-wire station 401 desires to signal an operator.

The circuit operations for a non-priority call occur in a manner substantially similar to that described for the priority call, with the exception that relay PR (30) is not operated. When relay FL (30) is operated, as a result of the above-described momentary release of relay CS (27), and relay CS (27) then is reoperated, a circuit is completed to light the L lamp (27) at four-wire switchboard 611. This circuit extends from battery through a break contact of relay SL (27), through a make contact of relay CS (27), through a make contact of relay FL (30), through a break contact of relay PR (30) and over lead 2707 to L lamp (27) in four-wire switchboard 611 (27). L lamp (27) in lighting indicates that the assistance of an operator is required in completing a non-priority call.

The circuit operations which occur subsequent to the response of an operator to the L lamp (27) indication are substantially similar to those previously described for a priority call.

CROSSOVER CALL ORIGINATING PORTION

It is now assumed that a call is originated by two-wire station 102 which is directed to two-wire station 403. It is further assumed that traffic which is originated by two-wire stations in switching center 1, and which is directed to two-wire stations served by switching center 3 utilizes four-wire trunks.

The originating portion of this crossover call comprises two definite stages; first, an originating outgoing stage in two-wire network 101 and, second, an originating tandem stage in four-wire network 108.

The outgoing stage in two-wire network 101 of switching center 1 involves circuit operations substantially similar to those described for a subscriber outgoing connection in the patent to A. J. Busch. These circuit operations include the establishment of a dial tone connection from a two-wire station, such as 102 (5), to a two-wire originating register, such as 508; the forwarding of dialed call information from two-wire station 102 (5) to two-wire originating register 508, the release of the dial tone connection; the establishment of a connection from two-wire originating register 508, to the marker 201 (9); and the forwarding of call information from two-wire originating register 508 to marker 201.

As previously described for the originating portion of a four-wire interoffice call, a type of network indication is also forwarded from a two-wire originating register, such as 508, to marker 201 (9). The type of network indication, which in this case would be a two-wire indication, is forwarded through cable 515, through originating register marker connector 125 (9), through cable 919 and through cable 973 to network detector and control 901. The above-described call information is forwarded from two-wire originating register 508 through cable 515, through originating register marker connector 125 (9), through cable 919, through cable 921 and through cable 905 to call information register 902. The call information received and stored in call information register 902 is similar to that stored therein for the previously described four-wire interoffice call.

The class of service of two-wire station 102 (5) and the called office code included in the directory number of two-wire station 403 are forwarded to translator 906, and translated thereby to provide the information required by trunk hunting and switch control 907 in selecting a trunk suitable for the completion of this call. Further information is provided by the translation performed by translator 906 which indicates the type of sender required for use with the selected type of trunk. This information is forwarded to sender control 920 through cable 944, as previously described for a four-wire call. An indication as to the necessity of making a record of call data pertaining to this call is forwarded from translator 906 through cable 965 to AMA control 972, as previously described for the four-wire call.

Trunk hunting and switch control 907 proceeds, as described in the originating portion of the four-wire interoffice call, to select a suitable trunk, which, for a crossover call, is a two-wire to four-wire intertrain trunk, such as 106 (5). Two-wire to four-wire intertrain trunk 106 (5) appears on two-wire trunk link frame 00 (5) and also on four-wire line link frame 00 (6). The two appearances, 518 and 528, are connected within the trunk circuit through a hybrid in a manner well known to one skilled in the art.

A connection is established from trunk hunting and switch control 907 to two-wire to four-wire intertrain trunk 106 (5) through two-wire trunk link frame and connector 00 (5). This connection is established under the control of network detector and control 901 in a manner similar to that described for the originating portion of a four-wire interoffice call.

The remaining circuit operations for the completion of the outgoing stage of the originating portion of this crossover call are completed in a manner substantially similar to the circuit operations required to complete a subscriber outgoing connection as described in the patent to Busch. A suitable sender, such as two-wire sender 705, is selected by sender control 920; call information is forwarded to the selected sender 705 from marker 201 (9); a connection is established from two-wire sender 705 through two-wire sender link 712 to two-wire to four-wire intertrain trunk 106 (5); a connection is established from two-wire station 102 (5) to two-wire to four-wire intertain trunk 106 (5) through link 516; the marker tests this connection, tests the conductors of two-wire to four-wire intertrain trunk 106 (5), signals two-wire sender 705 to advance and releases; and two-wire sender 705 then awaits a signal from four-wire network 108 (6, 8) that it is ready to receive call information signals.

Also included in the outgoing stage of the originating portion of this crossover call is the recording of call data for those calls which require such a record. The circuit operations required for the recording of call data pertaining to a crossover call are substantially similar to those described in the patent to Cahill et al.

As previously described for the four-wire interoffice call, a sender, such as 705, forwards a signal through transverter connector 211 (10) to type of call detector and control 1007 in transverter 207 (10), which indicates the network, two-wire 101 or four-wire 108, in which the call in progress is being switched. Since the sender 705 being used for the completion of this stage of the call is in two-wire network 101 (5, 7), it will forward a two-wire network indication to type of call detector and control 1007. This two-wire indication signals type of call detector and control 1007 that the call in progress is to be handled by transverter 207 (10) in a standard manner. The standard manner of handling a call by a transverter is that described in the patent to Cahill et al.

As two-wire sender 705 awaits a signal from four-wire network 108 (6, 8) indicating that it is ready to receive call information pertaining to the call in progress, the tandem stage of the originating portion of this crossover call is entered. As previously described for the tandem portion of the four-wire interoffice call, two-wire to four-wire intertrain trunk 106 (5) initiates the establishment of a connection through four-wire incoming register link 816 to a four-wire incoming register, such as 813. Four-wire incoming register 813 then returns a signal through four-wire incoming register link 816, through two-wire to four-wire intertrain trunk 106 (5) and through two-wire sender link 712 to two-wire sender 705 that it is ready to receive call information from two-wire sender 705.

As further described for the tandem portion of a four-wire interoffice call, call information is forwarded from a sender, such as 705, over the above-described connection to an incoming register, such as four-wire incoming register 813.

The remaining circuit operations required for the completion of the tandem stage of the originating portion of this crossover call occur in a manner substantially similar to those described for the tandem portion of a four-wire interoffice call. A connection is established, under the control of marker 201 (9), from the appearance 528, of two-wire to four-wire intertrain trunk 106 (5) on four-wire line link frame and connector 00 (6), to the trunk link frame appearance 615 of a selected four-wire intertoll trunk, such as 605, through a link such as 631; a four-wire sender, such as 806, is selected, and a connection established from it to the selected four-wire intertoll trunk 605; the marker 201 (9) tests the connection made through link 631, tests the conductors of four-wire intertoll trunk 605 which are assumed to extend to switching center 3, signals four-wire sender 806 to advance and releases itself; and four-wire sender 806 awaits a signal from switching center 3 that it is ready to receive the call information stored in four-wire sender 806.

Although the circuit operations involved in the establishment of the first stage of this originating portion of a crossover call are substantially similar to those described in the Busch patent, a brief description is given hereinbelow of certain advantageous departures from the Busch disclosure.

Upon the establishment of the aforementioned connection from two-wire originating register 508 to marker 201 a circuit is completed for the operation of relay 2W (17) in network detector and control 901 (17), which extends from ground at two-wire originating register 508, through cable 515, through originating register marker connector 125 (9), through cable 919, through cable 973 (9, 17) over lead 1709 and through the winding of relay 2W (17) to battery. The contacts of relay 2W (17) are used for calls originated by two-wire stations such as 102 in a manner similar to the previously described use of the contacts of relay 4W (17) for calls originating from four-wire stations such as 109.

Relay 2W (17) directs translator 906 (17, 21, 22) by enabling two-wire office code translator 1703, and not enabling four-wire office code translator 2106. This is accomplished by extending ground through a make contact of relay 2W (17) over lead 1710 and through two-wire office code translator 1703 to an output lead, such as 1711, which is designated by the translation performed by two-wire office code translator 1703. No ground is supplied to four-wire office code translator 2106 unless relay 4W (17) is operated.

The circuit operations in translator 906 (17, 21, 22) are substantially the same as those described for a four-wire call. The class of service of two-wire station 102 is forwarded from two-wire class of service register 1701 through cable 1712 to two-wire class of service translator 1702. As a result of the translation performed by two-wire class of service translator 1702, one or more screening relays, S9 (17) through S12 (17), are operated. It is assumed that this call did not originate from a coin station, and that it does require a call data record. A circuit is therefore completed, as described in the Busch patent, for the operation of relays S9 (17) and S11 (17), which represent, respectively, a non-coin station and a station requiring records to be made of outgoing calls originating therefrom. The operation of relays S9 (17) and S11 (17) completes a circuit for the operation of route relay R16 (17) and route series relay MBS (17), which extends from battery (21) through the winding of relay MBS (17), through a make contact of relay S11 (17), through the winding of relay R16 (17), through a make contact of relay S9 (17), through a make contact of relay 0R (17), over lead 1711, through two-wire office code translator 1703, over lead 1710 and through a make contact of relay 2W (17) to ground. Relay 0R (17) was previously operated in a manner similar to that described for its operation in the originating portion of the four-wire interoffice call.

The operation of route relay R16 (17) provides information required by trunk hunting and switch control 907 (18, 19, 23) and sender control 920 (22) in selecting and connecting to an appropriate trunk and sender, respectively. Obvious circuits are completed by the operation of relay R16 (17) for the operation of trunk hunting control relays FC16 (18), TB4 (18), and TG2 (18). These relays provide the information required by trunk hunting and switch control 907 (18, 19, 23) in selecting a two-wire to four-wire intertrain trunk such as 106 (19). A further obvious circuit is completed by the operation of relay R16 (17) for the operation of relay 0SG1 (22) in sender control 920 (22) which provides the information required by sender control 920 in selecting a two-wire sender such as 705.

The operations of trunk hunting and switch control 907 (18, 19, 23) are directed by network detector and control 901 (17, 23), through the previously described operation of relay 2W (17), in the selection of and connection to a two-wire trunk link frame, such as 00 (23), on which an idle two-wire to four-wire intertrain trunk, such as 106 (23), appears.

The establishment of a connection from marker 201 to two-wire line link frame 00 (5) on which two-wire station 102 appears is accomplished in a manner similar to that described for the selection and connection to a four-wire line link frame, except that network detector and control 901 (13) directs line switch control 916 (13) to connect to two-wire line link frame 00 (13) rather than four-wire line link frame 00 (13). This is accomplished when the calling station equipment location is passed from calling station equipment location register 2301 (13) through operated contacts of relay 2W (17) in network detector and control 901 (13) to operate the line link frame identification relays in line switch control 916 (13). Make contacts of relay 2W (17) channel the tens digit indication, 0, of the number of two-wire line link frame 00 (5) on which the calling line 102 (5) appears, through the winding of frame tens identification relay FTT0 (13), which is associated with two-wire line link frame 00 (5, 13) thereby operating relay FTT0 (13) and identifying two-wire line link frame 00 (13) for connection thereto by marker 201 (13).

The remaining circuit operations for completing this first stage in the originating portion of a crossover call occur in a manner substantially similar to that described in the Busch patent for a subscriber outgoing connection.

*Call Data Record for Crossover Call Originating Portion*

The previously described operation of relay MBS (17) provides an indication to AMA control 972 (22) that a record must be made of data pertaining to this call. An obvious circuit is completed for the operation of relay AMA (22) in AMA control 972 (22). The circuit operations in a marker such as 201 (9), a sender connector such as 707 and a sender such as 705 which follow the operation of relay AMA (22) are fully described in the patent to Busch.

As previously described for the recording of call data pertaining to a four-wire call, a connection is now established from two-wire sender 705 (31) to transverter 207 (31, 33, 35) over which call data indications and a type of network indication is forwarded. The type of network indication is forwarded by two-wire sender 705 (31) from ground over lead 3104, through cable 1012, through transverter connector 211 (31), through cable 1009, through cable 1011, over lead 3504 and through the winding of relay 2W (35) to battery, thereby operating relay 2W (35) in type of call detector and control 1007 (35). Other call information indications are forwarded, as described in the patent to Cahill et al., from two-wire sender 705 (31) through cable 3105, through cable 1012, through transverter connector 211 (31), through cable 1009 and through cable 1010 to call information register and converter 1005 (31, 32, 33, 34, 35) in transverter 207.

As previously described, and as further described in the patent to Busch, a station party indication is forwarded from marker 201 (28) to a sender such as two-wire sender 705 (31). This indication of a tip or a ring party was used on a four-wire call by type of call detector and control 1007 (33) to differentiate between a locally terminating four-wire call and through-switched four-wire call. However, on a two-wire call, since two-wire stations may represent actual tip or ring parties, the party indication is used to register the party designation of the calling station as described in the patent to Cahill et al.

It is assumed that calling two-wire station 102 (5) is a private line and therefore will return a ring party test, as described in the Busch patent. This ring party indication is forwarded from marker 201 (28) to two-wire sender 705 (31) as described in the Busch patent, and forwarded from two-wire sender 705 (31) through cable 3105, through cable 1012, through transverter connector 211 (31) through cable 1009, through cable 1011, over lead 3301, through a make contact of relay 2W (35) and through the winding of relay RP (33) to battery, thereby operating ring party relay RP (33).

The operation of relay 2W (35) completes an obvious circuit for the operation of relay 4L0C (33). Relay 4L0C (33), in operating, cuts through leads from cable 3202 to operate two-out-of-five of the relays VG0 (32) through VG7 (32) and, if indicated, relay VG10 (32), as described in the patent to Cahill et al.

Since relay DNK1 (31) has not, as yet, been operated, a translation will be made of the equipment location of calling station 102 by a two-wire translator, such as 208 (36), into the directory number of two-wire station 102. This translation and the subsequent circuit operations of transverter 207, transverter connector 211, two-wire sender 705, recorder 212, trunk identifier 210, and two-wire to four-wire intertrain trunk 106 occur in a manner substantially similar to that described in the patent to Cahill et al. and no further detailed description of these operations will be given herein.

*Crossover Call Terminating Portion*

It is now assumed that the two stages of the originating portion of this crossover call from two-wire station 102 to two-wire station 403 has been completed, and that a sender in switching center 1 is awaiting a signal from an incoming register in switching center 3 indicating that it is ready to receive the call information stored in the sender. FIGS. 5 through 10 are now assumed to represent switching center 3.

The terminating portion of a crossover call also involves two separate switching stages. The first stage concerns the establishment of a tandem connection in four-wire network 108 (6, 8) of switching center 3 from an incoming four-wire intertoll trunk such as 605 to a four-wire to two-wire intertrain trunk such as 607. The second stage concerns the establishment of a terminating connection in two-wire network 101 (5, 7) of switching center 3 from four-wire to two-wire intertrain trunk 607 to the called two-wire station 403 (5).

The first stage of the terminating portion of this crossover call occurs in a manner substantially similar to that described for the tandem portion of a four-wire interoffice call. A four-wire incoming register such as 813 is connected through the four-wire incoming register link 816 to the incoming four-wire intertoll trunk 605 and, upon receiving and registering the call information from the attached sender in switching center 1, four-wire incoming register 813 initiates the establishment of a connection to marker 201 (9).

Marker 201 (9) erceives and stores the call information stored in four-wire incoming register 813 in addition to a four-wire network indication. In response to the four-wire network indication received from four-wire incoming register 813, network detector and control 901 directs marker 201 (9) in utilizing the call information received from four-wire incoming register 813 and stored in call information register 902 to select a four-wire to two-wire intertrain trunk, such as 607, to connect a four-wire sender such as 806 to the selected four-wire to two-wire intertrain trunk 607 and to connect the appearance 634 of four-wire intertoll trunk 605 on four-wire line link frame 00 (6) to the appearance 629 of four-wire to two-wire intertrain trunk 607 on four-wire trunk link frame 01 (6) through a link such as 630. These circuit operations occur in a manner similar to that previously described for the tandem portion of a four-wire interoffice call.

Four-wire to two-wire intertrain trunk 607 appears on four-wire trunk link frame 01 (6) as well as on two-wire trunk link frame 01 (5). The two-wire and four-wire appearances 519 and 629 respectively, are connected within the circuit of trunk 607 in a manner substantially similar to that described for two-wire to four-wire intertrain trunk 106 (5).

After completing certain tests of the established connections, marker 201 (9) is released and the control of the call is assumed by four-wire sender 806 as it awaits a signal from two-wire network 101 (5, 7) indicating that an incoming register therein is ready to receive the call information.

When four-wire sender 806 is ready to forward the called information to an incoming register such as 703 in two-wire network 101 (5, 7) the second stage of the terminating portion of this crossover call is entered. The terminating connection from four-wire to two-wire intertrain trunk 607 to the called two-wire station 403 (5) is established in a manner substantially similar to that described for an incoming call in the patent to Busch.

As described for the terminating portion of a four-wire interoffice call, four-wire to two-wire intertrain trunk 607 initiates the establishment of a connection to an incoming register such as two-wire incoming register 703 through two-wire incoming register link 709. In response to a signal from two-wire incoming register 703, four-wire sender 806 forwards call information signals through four-wire to two-wire intertrain trunk 607 to two-wire incoming register 703.

A connection is then established from two-wire incoming register 703 to marker 201 (9), and the call information received by two-wire incoming register 703 in addition to a locally generated two-wire network indication is forwarded over this connection to marker 201 (9). In response to the two-wire network indication received from two-wire incoming register 703, network detector and control 901 directs marker 201 (9) in utilizing the call information received and stored by call information register 902 to establish the terminating connection from the appearance 519 of four-wire to two-wire intertrain trunk 607 on two-wire trunk link frame 01 (5) to the appearance 520 of two-wire station 403 (5) on two-wire line link frame 00 (5) through a link such as 523. The circuit operations involved in the establishment of this connection are substantially similar to those described in patent to Busch and will not be described herein.

DIAL TONE CONNECTION

The patent to Busch describes the establishment of the previously mentioned dial tone connection from a calling station to an originating register. This description includes the establishment of a connection from a calling station, such as two-wire station 102 (5), through a line link marker connector, such as two-wire line link marker connector 708, to a marker, such as 201 (9). Information concerning the calling station is then forwarded through this connection to the marker. In this embodiment of the present invention an additional signal is forwarded from a line link marker connector, such as 708, which indicates the network, two-wire 101 (5, 7) or four-wire 108 (6, 8) which serves the calling station.

The patent to Busch describes the circuit operations required for the selection of a suitable originating register. This selection is made in a manner similar to that previously described for the selection of a trunk suitable for the completion of a particular type of call. In response to the type of network indication received from a line link marker connector, such as 708, network detector and control 901 directs marker 201 (9) in selecting and connecting to an originating register, such as two-wire originating regitser 508, which is in the same network as the calling station.

Network detector and control 901 further directs marker 201 (9) in establishing a connection from the appearance 522 of two-wire originating register 508 on two-wire trunk link frame 01 (5) to the appearance 517 of two-wire station 102 (5) on two-wire line link frame 00 (5). This connection is established in a manner similar to that described in the Busch patent.

Had the dial tone request originated from a four-wire station, such as 109 (6), a four-wire indication would have been received by network detector and control 901 from four-wire line link marker connector 801. Network detector and control 901 would then direct marker 201 (9) in selecting an appropriate four-wire originating register, such as 803, and establishing a connection from the appearance 603 of four-wire originating register 803 on four-wire trunk link frame 00 (6) to the appearance 602 of four-wire station 109 (6) on four-wire line link frame and connector 19 (6) through a link such as 604.

The type of network signal forwarded from four-wire line link marker connector 801 to network detector and control 901 extends from ground (not shown) in four-wire line link marker connector 801 through cable 802, through cable 903 (9, 17), through cable 1750, over lead 1708 and through the winding of relay 4W (17) to battery, thereby operating relay 4W (17).

Other information, as described in the patent to Busch, is forwarded from the appearance 602 of four-wire station 109 (6) through four-wire trunk line frame and connector 19 (6), over cable 601, through four-wire line link marker connector 801, through cable 802, through cable 904 and through cable 905 to call information register 902. This information includes the type of originating register, dial pulse or multifrequency, which is required to register signals originated from four-wire station 109 (6) and other pertinent call information.

Assuming that four-wire station 109 (6) is equipped to transmit dial pulse signals, a circuit will be completed over the above-described connection for the operation of relay D (17) in call information register 902. Relay D (17), in operating, extends ground through its own make contact, through a make contact of relay 4W (17), over lead 1713 and through the winding of route relay R10 (21) to battery, thereby operating route relay R10 (21).

Route relay R10 (21), in operating, provides trunk hunting and switch control 907 (18, 19, 23) with the information required to select and connect to a suitable dial pulse four-wire originating register, such as 803 (23). This information is passed to trunk hunting and switch control 907 (18, 19, 23) through the operation over obvious circuits of trunk hunting control relays FC10 (18), TB1 (18), and TG18 (18). The circuit operations following the operation of these relays is similar to that previously described in any of the previously described calls for the selection of a suitable trunk.

In a manner similar to that described for the previous types of calls, make contacts of relay 4W (17) are utilized to direct the marker 201 (23) in connecting to four-wire trunk link frame 00 (23) and four-wire line link frame 19 (13). The dial tone connection is then established under the control of marker 201 (9) from four-wire originating register 803 to four-wire station 109 (6) through link 604. The establishment of this connection, the forwarding of information pertaining to four-wire station 109 (6) to four-wire originating register 803 from and through marker 201 (9), and the release of marker 201 (9) occur in a manner similar to that described in the patent to Busch.

A two-wire dial tone connection is established in a manner similar to the above-described four-wire dial tone connection with the exception that relay 2W (17) in network detector and control 901 (17) is operated as a result of a two-wire network signal from a two-wire line link marker connector, such as 708, instead of relay 4W (17), as in the above-described four-wire dial tone connection.

Intraoffice Calls

The circuit operations required for the completion of an intraoffice call in this embodiment of the present invention are substantially similar to those described for a similar call in the patent to Busch. When a two-wire station, such as 102 (5), originates a call to another two-wire station, such as 104 (5), both of which are served by the same switching network, a two-wire network indication is received by marker 201 (9) from the two-wire originating register, such as 508, which is selected for the dial tone connection. In response to this two-wire network indication, network detector and control 901 directs marker 201 (9) in selecting a two-wire intraoffice trunk, such as 509, and establishes connections from the called two-wire station 104 (5) and the calling two-wire station 102 (5) to the two appearances 521 and 524 of two-wire intraoffice trunk 509 on two-wire trunk link frame 01 (5) through links, such as 525 and 523, respectively. The remaining details of circuit operation are substantially similar to those described in the patent to Busch for an intraoffice call.

A call originated by a four-wire station, such as 109 (6), which is directed to a four-wire station, such as 111 (6), both of which are served by the same switching center, is completed in a manner similar to that for the above-described two-wire intraoffice call. Network detector and control 901 of marker 201 (9) receives a four-wire network indication from the four-wire originating register, such as 803, which is selected for the dial tone connection. Network detector and control 901 then directs marker 201 (9) in selecting a four-wire intraoffice trunk, such as 608, and establishing connections from the called four-wire station 111 (6) and the calling four-wire station 109 (6), to the two appearances 632 and 633 of four-wire intraoffice trunk 608 through links, such as 604 and 631, respectively.

CONCLUSION

In discussing this illustrative embodiment of the present invention, certain details were considered obvious to one skilled in the art or were described in the aforementioned patents to A. J. Busch, Busch et al. and Cahill et al. These details were, therefore, omitted to more clearly disclose the present invention without direct reference to a vast amount of switching circuitry. Although several of the features of this invention have been described in relation to four-wire traffic, the application of these features to two-wire traffic is well within the ability of one skilled in the art through reference to the teachings of this disclosure and, therefore, is to be considered as included herein.

The embodiment described herein is merely illustrative of the many applications of the principles of the invention. Numerous other arrangements may be devised by those skilled in the art without departing from the spirit and scope of the invention.

What is claimed is:

1. In a call data recording telephone system, a switching center comprising a first switching network serving a plurality of uniquely identifiable two-wire stations and a plurality of uniquely identifiable two-wire trunks and comprising means for selectively interconnecting said two-wire stations and said two-wire trunks; a second switching network serving a plurality of uniquely identifiable four-wire stations and a plurality of uniquely identifiable four-wire trunks and comprising means for selectively interconnecting said four-wire stations and said four-wire trunks, each of said networks comprising means for providing call information signals including signals indicating the identity of the one of said two-wire stations, four-wire stations, and four-wire trunks which requested a call connection; recording means; and a recorder controller comprising register means for registering said call information signals, detection means selectively responsive to said registered call information for controlling said recording means to record data pertaining to a call for which a call connection is requested by one of said two-wire stations and including identification of said one of said two-wire stations, data pertaining to a call for which a call connection is requested by one of said four-wire stations and including identification of said one of said four-wire stations, and data pertaining to a call for which a call connection is requested by one of said four-wire trunks, which connection extends to another of said four-wire trunks and including identification of said requesting one of said four-wire trunks.

2. In a call data telephone recording system, a switching center comprising a first switching network serving a plurality of uniquely identifiable two-wire stations and a plurality of uniquely identifiable two-wire trunks and comprising means for selectively interconnecting said two-wire stations and said two-wire trunks; a second switching network serving a plurality of uniquely identifiable four-wire stations and a plurality of uniquely identifiable four-wire trunks and comprising means for selectively interconnecting said four-wire stations and said four-wire trunks; first translation means for ascertaining from a two-wire station identification a directory number corresponding thereto; second translation means for ascertaining from a four-wire station identification a directory number corresponding thereto, each of said networks comprising means for providing call information signals including signals indicating through which of said switching networks a call connection is established and the identification of the one of said two-wire and four-wire stations which requested said call connection; recording means; and a recorder controller comprising register means for registering said call information signals, detecting means selectively responsive to said registered information for controlling said translation means to ascertain the directory number of said call requesting one of said two-wire and four-wire stations and for controlling said recording means to record data pertaining to said call for which said call connection is established including said ascertained directory number.

3. A switching system comprising a plurality of interconnectable stations, call information signalling means at a calling one of said stations for generating an urgent call completion signal which indicates that the completion of a specific call identified by other call information signals originated therefrom and associated with said urgent call completion signal is urgent, means for ascertaining when all possible connections between said one of said stations and a called one of said stations are busy and means responsive to said urgent call completion signal and controlled by said ascertaining means for holding said specific call until one of said connections becomes idle and for establishing one of said connections when it becomes idle.

4. A switching system comprising first and second switching centers connectable by alternate trunk groups each of which comprises a plurality of trunks, said first switching center serving a first group of stations and said second switching center serving a second group of stations, means at one of said stations of said first group for generating a signal which indicates that the completion of a call originated therefrom to one of said stations of said second group is urgent, said first switching center comprising means for ascertaining when all of said trunks within said trunk groups are busy, means responsive to said urgent call completion signal and controlled by said ascertaining means for determining when one of said trunks within any of said trunk groups becomes idle and means enabled by said determining means for establishing a connection to an idle one of said trunks.

5. A switching system as defined in claim 4 wherein each of said stations is assigned one of a plurality of classes of service and said first switching center further comprises means for registering said urgent call completion signal, means controlled by said registering means and the class of service assigned to said one of said stations of said first group for deciding if said one of said stations of said first group is permitted to originate an urgent call, and means responsive to said deciding means for downgrading said urgent call completion signal to a normal call completion signal if said one of said stations of said first group is not permitted to originate an urgent call.

6. A switching system comprising a plurality of stations interconnectable by a first and second group of trunks, said stations comprising means for the origination of a first and a second type of traffic, said second type of traffic requiring the use of said second group of trunks; call information signal means at one of said stations for generating signals which indicate which of said types of traffic is to be transmitted during a specific call originated therefrom and that the completion of said call is urgent; and means responsive to a signal indicating a call during which said second type of traffic will be transmitted and whose completion is urgent for ascertaining when all of said second group of trunks are busy, for holding said call until one of said second group of trunks becomes idle and for establishing a connection between said station and one of said second group of trunks when it becomes idle.

7. A switching system comprising first and second switching centers connectable by a trunk combination comprising a plurality of alternate trunk groups each of which comprises a plurality of trunks; said first switching center comprising means for ascertaining when all of said trunks within said trunk combination are busy, means automatically responsive to said ascertaining means for determining automatically when any one of said trunks of said trunk combination becomes idle and means automatically enabled by said determining means for establishing a connection to an idle one of said trunks within said trunk combination.

8. A switching system comprising first and second switching centers connectable by a trunk combination comprising a plurality of alternate trunk groups each of which comprises a plurality of trunks; said first switching center comprising means for registering a code designation; means controlled by said registering means for ascertaining said trunk combination from a registered code designation indicative of said second switching center; means controlled by said ascertaining means for attempting to locate an idle trunk within said trunk combination, for effecting a connection thereto when located and for generating an all-trunks-busy signal if all of said trunks within said trunk combination are busy; monitoring means associated with said registering means for monitoring said trunk groups within said trunk combination and for generating a trunk-idle signal upon detecting an idle trunk therein; means responsive to said all-trunks-busy signal for establishing a monitoring connection between said monitoring means and said trunk groups; and means for releasing said ascertaining and said locating means when said monitoring connection is established, said registering means responsive to said trunk-idle signal to control said ascertaining means and said locating and connection effecting means to effect a connection to an idle trunk within said trunk combination, and means responsive to the effecting of said connection for releasing said monitoring connection.

9. A switching system in accordance with claim 8 further comprising means for timing the duration of said monitoring connection and for generating a time-elapsed signal when said monitoring connection has been established for a predetermined length of time; said registering means responsive to said time-elapsed signal to control said ascertaining means and said locating and connection effecting means to attempt to locate an idle trunk within said trunk combination and effect a connection thereto.

10. A switching system in accordance with claim 8 wherein said first switching center further comprises a plurality of said registering means and a plurality of said monitoring means, each of said monitoring means discretely associated with one of said registering means; means for determining the number of said registering means whose associated monitoring means are connected by said monitoring connection establishing means to monitoring connections; and means responsive to said determining means for disabling said monitoring connection establishing means when said number of said registering means whose associated monitoring means are connected to monitoring connections reaches a predetermined number.

11. A telephone switching system comprising a two-wire switching network serving two-wire stations and two-wire trunks which are terminated on two-wire line switches and two-wire trunk switches and including means for connecting said two-wire station and two-wire trunk terminations and means for generating a first signal indicating that a connection is to be established within said two-wire switching network; a four-wire switching network serving four-wire stations and four-wire trunks which are terminated on four-wire line switches and four-wire trunk switches and including means for connecting said four-wire station and four-wire trunk terminations and means for generating a signal indicating that a connection is to be established within said four-wire switching network; marker means common to both of said switching networks comprising first register means responsive to said signals for registering indicia identifying in which of said switching networks a connection is to be established, second register means for registering indicia representative of a called station and a calling station or trunk, translation means controlled by said first and second register means for ascertaining from said indicia the location of the terminations of trunks served by said identified switching network which are suitable for use in connecting said called station to said calling station or trunk, hunting means controlled by said translations means for selecting an idle one of said suitable trunks, and switch control means controlled by said first register means, said second register means and said hunting means for controlling said line and trunk switches and said connecting means in said identified switching network to connect the termination of said selected trunk to the termination of said calling station or trunk.

12. A switching system adapted for the automatic recording of call data comprising a two-wire switching network serving a plurality of uniquely identifiable two-wire stations; a four-wire switching network serving a plurality of uniquely identifiable four-wire stations; each of said switching networks comprising means for providing call information signals including signals indicating through which of said switching networks a call connection is established and the identity of the one of said two-wire and four-wire stations which requested said call connection; recording means; and a recorder controller comprising register means for registering said call information signals and detection means selectively responsive to said registered information for controlling said recording means to record data pertaining to the call for which said call connection is established, said data including indicia representative of said identity of said call connection requesting one of said two-wire and four-wire stations.

13. A switching system comprising first and second switching centers connectable by a trunk combination comprising a plurality of alternate trunk groups each of which comprises a plurality of trunks; said first switching center comprising means for ascertaining when all of said trunks within said trunk combination are busy, means for receiving an urgent call completion signal, means responsive to said receiving means for registering said signal, means responsive to said ascertaining means only when said urgent call completion signal is registered in said registering means for determining when any one of said trunks of said trunk combination becomes idle, and means enabled by said determining means for establishing a connection to an idle one of said trunks within said trunk combination.

14. A switching system serving a plurality of interconnectable stations comprising call information signaling means at a calling one of said stations for generating an urgent call completion signal in association with other call information signals which identify a called station, means responsive to said other call information signals for ascertaining that said called station is busy and for generating a line-busy signal, means responsive to said urgent call completion signal and said line-busy signal for connecting said calling station to a switchboard, means responsive to said other call information signals for establishing a connection to said called station, timing means enabled responsive to establishment of said connection and disabled responsive to an answer by said called station, and means controlled by said timing means for generating a failure-to-answer signal when said called station fails to answer within a predetermined time period after establishment of said connection, said connecting means responsive to said urgent call completion signal and said failure-to-answer signal for connecting said calling station to said switchboard.

15. A switching system adapted for the automatic recording of call data comprising a switching center serving a plurality of uniquely identifiable trunks and a plurality of uniquely identifiable stations; means for selectively interconnecting said stations and trunks; means for providing call information signals including signals indicating the identity of the one of said stations and trunks which requested a call connection; means responsive to signals generated by one of said stations for providing other call information signals specifying the degree of urgency to be accorded the completion of a call originating from said one station and for specifying the type of trunk to be used for completing said call; recording means; and a recorder controller comprising register means for registering said call information signals and detection means selectively responsive to said registered information for controlling said recording means to record data pertaining to the call for which said requested call connection is established; said data including indicia representative of said identity of said call connection requesting one of said stations and trunks, of said specified degree of urgency and of said specified type of trunk.

References Cited in the file of this patent

UNITED STATES PATENTS

| | | |
|---|---|---|
| 2,465,359 | Deakin | Mar. 29, 1949 |
| 2,642,499 | Gohorel | June 16, 1953 |
| 2,764,636 | Gray | Sept. 25, 1956 |
| 2,803,706 | Althouse | Aug. 20, 1957 |
| 2,807,670 | Brandstetter et al. | Sept. 24, 1957 |
| 2,857,467 | Molnar | Oct. 21, 1958 |
| 2,876,286 | Oberman | Mar. 3, 1959 |
| 2,879,338 | Joel | Mar. 24, 1959 |
| 2,916,554 | Pharis | Dec. 8, 1959 |
| 2,935,571 | Pharis et al. | May 3, 1960 |
| 2,943,155 | Rockwell | June 28, 1960 |